US008286159B2

(12) United States Patent
Shapiro

(10) Patent No.: US 8,286,159 B2
(45) Date of Patent: Oct. 9, 2012

(54) METHOD AND APPARATUS FOR GRYPHING A DATA STORAGE MEDIUM

(76) Inventor: Alan Joshua Shapiro, Chappaqua, NY (US)

( * ) Notice: Subject to any disclaimer, the term of this patent is extended or adjusted under 35 U.S.C. 154(b) by 1238 days.

(21) Appl. No.: 11/428,374

(22) Filed: Jun. 30, 2006

(65) Prior Publication Data
US 2007/0150890 A1 Jun. 28, 2007

Related U.S. Application Data

(60) Provisional application No. 60/753,635, filed on Dec. 22, 2005, provisional application No. 60/747,201, filed on May 14, 2006.

(51) Int. Cl.
G06F 9/445 (2006.01)
(52) U.S. Cl. ...................................... 717/177
(58) Field of Classification Search .......... 717/173–178; 709/200, 202, 223–225; 705/1, 14, 26; 707/1, 707/204, 10, 104.1; 713/1, 100
See application file for complete search history.

(56) References Cited

U.S. PATENT DOCUMENTS

| 4,481,606 | A | 11/1984 | Nozawa et al. |
| 5,196,970 | A | 3/1993 | Seko et al. |
| 5,515,524 | A | 5/1996 | Lynch et al. |
| 5,708,798 | A | 1/1998 | Lynch et al. |
| 5,768,566 | A | 6/1998 | Harikrishnan et al. |
| 5,794,052 | A | 8/1998 | Harding |
| 5,825,651 | A | 10/1998 | Gupta et al. |
| 5,835,777 | A | 11/1998 | Staelin |
| 5,842,024 | A | 11/1998 | Choye et al. |
| 5,991,543 | A | 11/1999 | Amberg et al. |
| 5,995,757 | A | 11/1999 | Amberg et al. |
| 6,006,035 | A | 12/1999 | Nabahi |
| 6,026,439 | A | 2/2000 | Chowdhury et al. |
| 6,080,207 | A | 6/2000 | Kroening et al. |
| 6,117,187 | A | 9/2000 | Staelin |
| 6,131,192 | A | 10/2000 | Henry |
| 6,182,275 | B1 | 1/2001 | Beelitz et al. |
| 6,209,094 | B1 | 3/2001 | Levine et al. |
| 6,243,766 | B1 * | 6/2001 | Sliger et al. ...................... 710/2 |

(Continued)

OTHER PUBLICATIONS

Microsoft Computer Dictionary, 5th Ed, 2002, p. 276.*

Primary Examiner — Tuan Anh Vu
(74) Attorney, Agent, or Firm — Charles A. Lemaire; Jonathan M. Rixen; Lemaire Patent Law Firm, P.L.L.C.

(57) ABSTRACT

An apparatus and method for obtaining a storage medium with a deeply customizable set of installed content. Soft assets (e.g., programs, songs, videos, etc.) that form the content are selected from among a much larger set of preinstalled soft assets previously stored on storage media, such as disk drives. In some embodiments, based on a user's selections, the non-selected assets are permanently erased from a storage medium, while the remaining assets are available as installed (wherein substantially no further processing is required to install them). In some embodiments, a new device uses the storage medium to provide its user with a fully functional device without the need to separately install the soft assets from a plurality of sources (e.g., from program-distribution CDROMS and the like). Some embodiments include the storage medium having the soft assets installed, and including a program that elicits selections from a user and erases non-selected assets.

27 Claims, 19 Drawing Sheets

U.S. PATENT DOCUMENTS

| | | | |
|---|---|---|---|
| 6,247,024 | B1 | 6/2001 | Kincaid |
| 6,247,126 | B1 | 6/2001 | Beelitz et al. |
| 6,247,128 | B1 | 6/2001 | Fisher et al. |
| 6,269,343 | B1 * | 7/2001 | Pallakoff .................. 705/26 |
| 6,327,706 | B1 | 12/2001 | Amberg et al. |
| 6,347,371 | B1 | 2/2002 | Beelitz et al. |
| 6,385,766 | B1 | 5/2002 | Doran, Jr. et al. |
| 6,405,362 | B1 | 6/2002 | Shih et al. |
| 6,418,554 | B1 | 7/2002 | Delo et al. |
| 6,442,754 | B1 | 8/2002 | Curtis |
| 6,477,703 | B1 | 11/2002 | Smith et al. |
| 6,490,723 | B1 | 12/2002 | Bearden et al. |
| 6,496,875 | B2 | 12/2002 | Cheng et al. |
| 6,501,491 | B1 | 12/2002 | Brown et al. |
| 6,512,526 | B1 * | 1/2003 | McGlothlin et al. .......... 715/762 |
| 6,523,166 | B1 | 2/2003 | Mishra et al. |
| 6,543,047 | B1 * | 4/2003 | Vrhel et al. ................... 717/121 |
| 6,550,061 | B1 | 4/2003 | Bearden et al. |
| 6,550,062 | B2 | 4/2003 | Barajas et al. |
| 6,564,369 | B1 | 5/2003 | Hove et al. |
| 6,598,223 | B1 | 7/2003 | Vrhel, Jr. et al. |
| 6,604,238 | B1 | 8/2003 | Lim et al. |
| 6,615,405 | B1 | 9/2003 | Goldman et al. |
| 6,615,406 | B1 | 9/2003 | Amberg et al. |
| 6,668,289 | B2 | 12/2003 | Cheng et al. |
| 6,681,266 | B2 | 1/2004 | Ayyagari |
| 6,681,391 | B1 | 1/2004 | Marino et al. |
| 6,687,902 | B1 | 2/2004 | Curtis et al. |
| 6,691,253 | B1 | 2/2004 | Gillenwater et al. |
| 6,711,798 | B2 | 3/2004 | Sanders et al. |
| 6,718,373 | B1 | 4/2004 | Bearden et al. |
| 6,721,946 | B1 | 4/2004 | Fogarty et al. |
| 6,745,239 | B1 | 6/2004 | Hubbard |
| 6,751,795 | B1 | 6/2004 | Nakamura |
| 6,757,783 | B2 | 6/2004 | Koh |
| 6,760,708 | B1 | 7/2004 | Hubbard et al. |
| 6,765,595 | B2 | 7/2004 | Lee et al. |
| 6,772,192 | B1 | 8/2004 | Fulton et al. |
| 6,807,665 | B2 | 10/2004 | Evans et al. |
| 6,823,376 | B1 * | 11/2004 | George et al. .................. 709/221 |
| 6,868,496 | B2 | 3/2005 | Sales et al. |
| 6,874,092 | B1 | 3/2005 | Motoyama et al. |
| 6,874,143 | B1 | 3/2005 | Murray et al. |
| 6,889,232 | B2 * | 5/2005 | Pudipeddi et al. ............ 707/200 |
| 6,907,604 | B1 | 6/2005 | Macnair, Jr. et al. |
| 6,938,250 | B2 | 8/2005 | Cohen et al. |
| 6,944,867 | B2 | 9/2005 | Cheston et al. |
| 6,947,954 | B2 | 9/2005 | Cohen et al. |
| 6,948,166 | B2 | 9/2005 | Barfield et al. |
| 6,961,773 | B2 | 11/2005 | Hartman et al. |
| 6,993,642 | B2 * | 1/2006 | Burkhardt et al. ................. 713/1 |
| 7,017,144 | B2 | 3/2006 | Cohen et al. |
| 7,092,949 | B2 | 8/2006 | Ohgake |
| 7,143,067 | B1 | 11/2006 | Cheston et al. |
| 7,260,845 | B2 * | 8/2007 | Kedma et al. ................... 726/23 |
| 2002/0083430 | A1 | 6/2002 | Kusuda et al. |
| 2002/0087965 | A1 | 7/2002 | Lin |
| 2002/0092014 | A1 | 7/2002 | Shibusawa et al. |
| 2002/0095672 | A1 | 7/2002 | Evans et al. |
| 2002/0108033 | A1 | 8/2002 | Kroening |
| 2002/0129351 | A1 | 9/2002 | Bedos et al. |
| 2002/0147972 | A1 | 10/2002 | Olmeda et al. |
| 2002/0188941 | A1 | 12/2002 | Cicciarelli et al. |
| 2003/0037326 | A1 * | 2/2003 | Burkhardt et al. ............ 717/178 |
| 2003/0041324 | A1 | 2/2003 | Anderson et al. |
| 2003/0046678 | A1 | 3/2003 | Boxall et al. |
| 2003/0056207 | A1 | 3/2003 | Fischer et al. |
| 2003/0110241 | A1 | 6/2003 | Cheng, Jr. et al. |
| 2003/0135851 | A1 | 7/2003 | Dickey et al. |
| 2003/0158926 | A1 | 8/2003 | Kroening |
| 2003/0163807 | A1 | 8/2003 | Drake et al. |
| 2003/0188305 | A1 | 10/2003 | Morimoto |
| 2003/0188306 | A1 | 10/2003 | Harris et al. |
| 2003/0192031 | A1 | 10/2003 | Srinivasan et al. |
| 2003/0217359 | A1 | 11/2003 | Ohi et al. |
| 2004/0015536 | A1 | 1/2004 | Cohen et al. |
| 2004/0015956 | A1 | 1/2004 | Barfield et al. |
| 2004/0025155 | A1 | 2/2004 | Sedlack et al. |
| 2004/0060045 | A1 | 3/2004 | Hind et al. |
| 2004/0088697 | A1 | 5/2004 | Schwartz et al. |
| 2004/0123284 | A1 | 6/2004 | Bryant et al. |
| 2004/0139430 | A1 | 7/2004 | Eatough et al. |
| 2004/0154015 | A1 | 8/2004 | Hirai |
| 2004/0250265 | A1 | 12/2004 | Suzuki et al. |
| 2005/0055688 | A1 | 3/2005 | Barajas et al. |
| 2005/0125524 | A1 * | 6/2005 | Chandrasekhar et al. .... 709/223 |
| 2005/0193389 | A1 | 9/2005 | Murphy et al. |
| 2005/0222916 | A1 | 10/2005 | Ohbitsu |
| 2005/0289513 | A1 | 12/2005 | Chen et al. |
| 2006/0048129 | A1 | 3/2006 | Napier et al. |
| 2006/0048139 | A1 | 3/2006 | Nakamura |
| 2006/0053419 | A1 | 3/2006 | Barfield et al. |
| 2006/0069754 | A1 | 3/2006 | Buck et al. |
| 2006/0265706 | A1 | 11/2006 | Isaacson et al. |
| 2007/0028231 | A1 | 2/2007 | Kelso et al. |

* cited by examiner

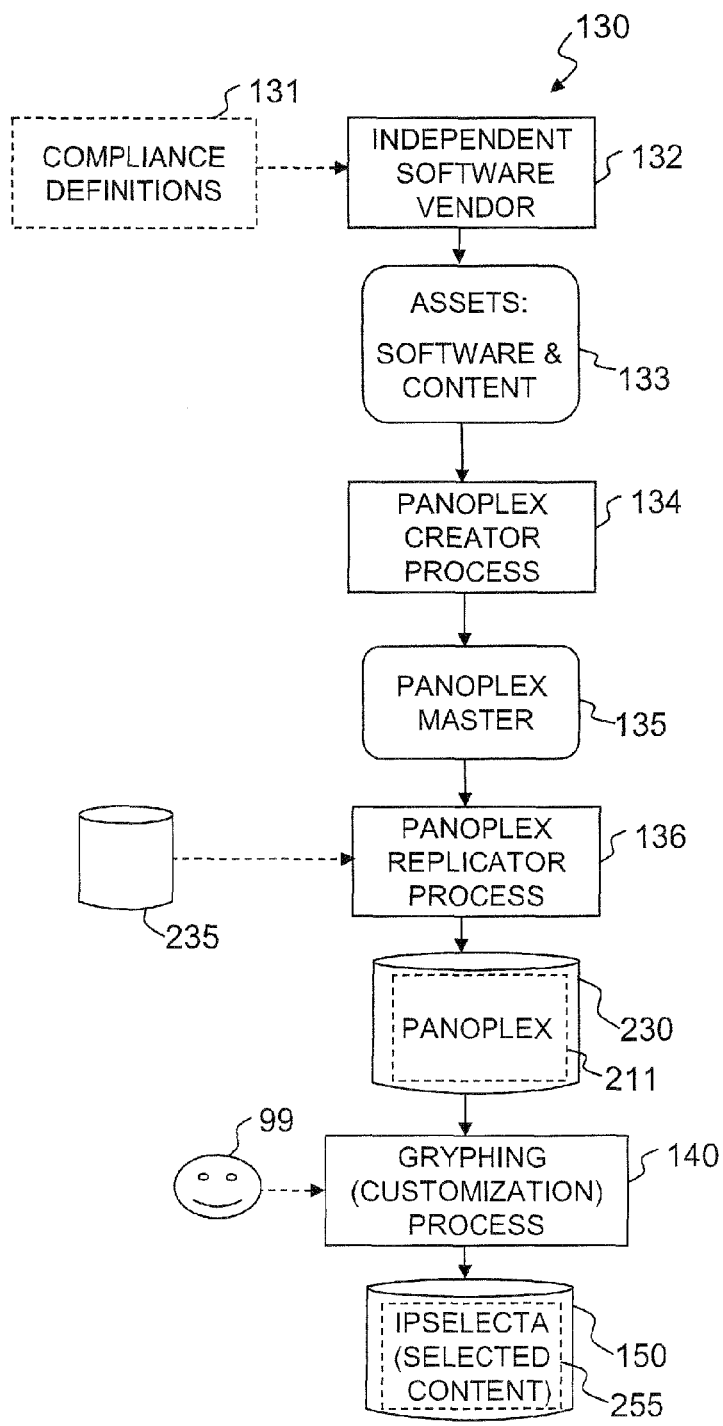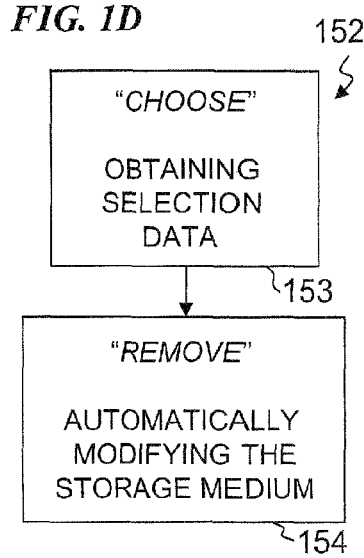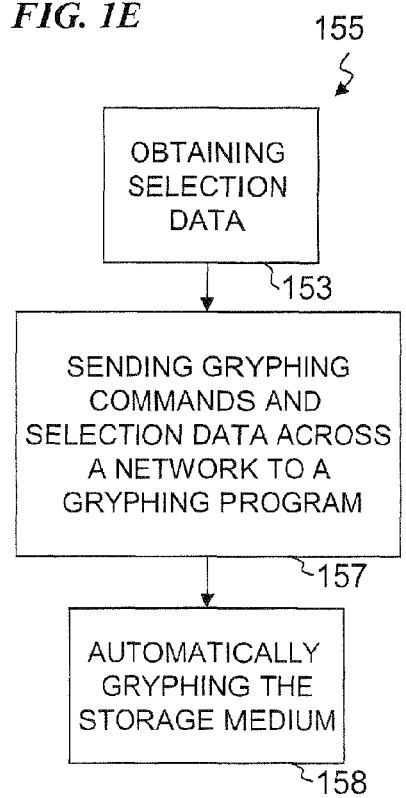

*FIG. 2A*
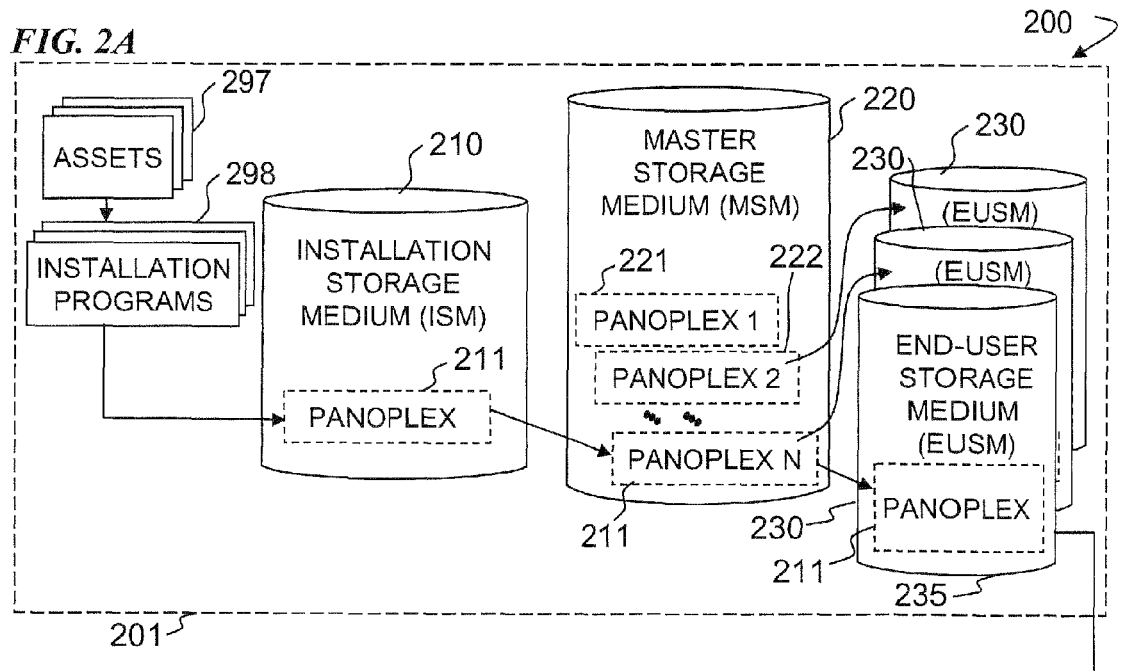
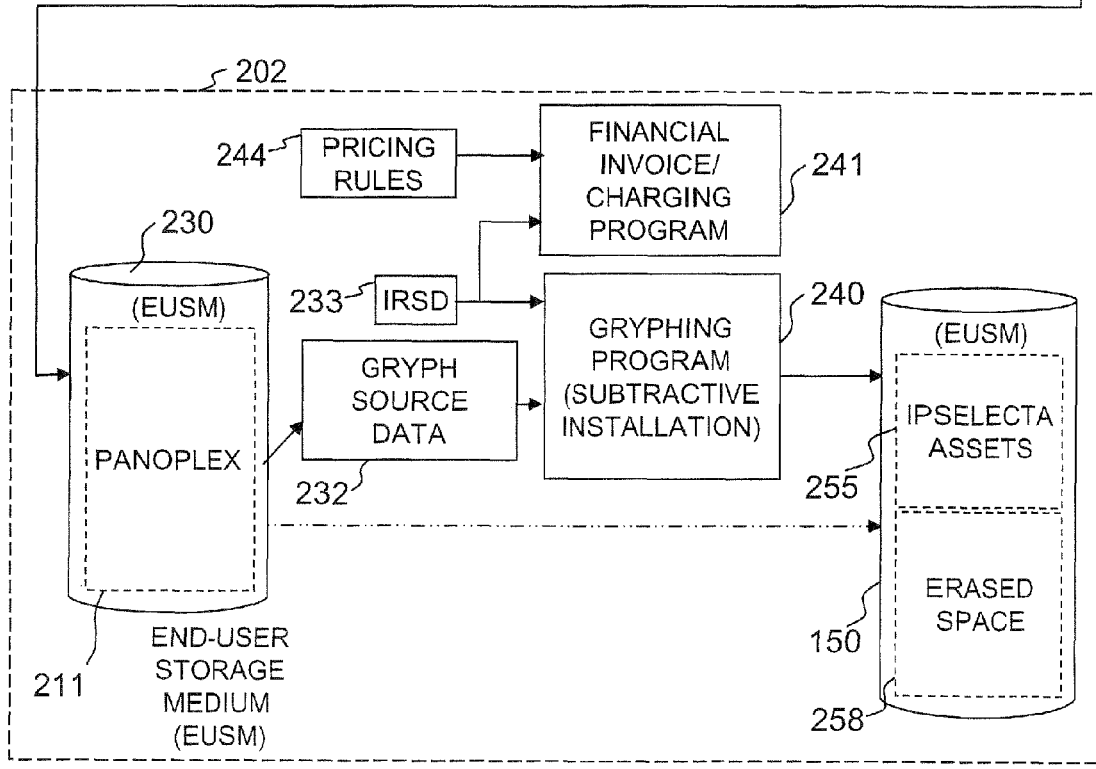

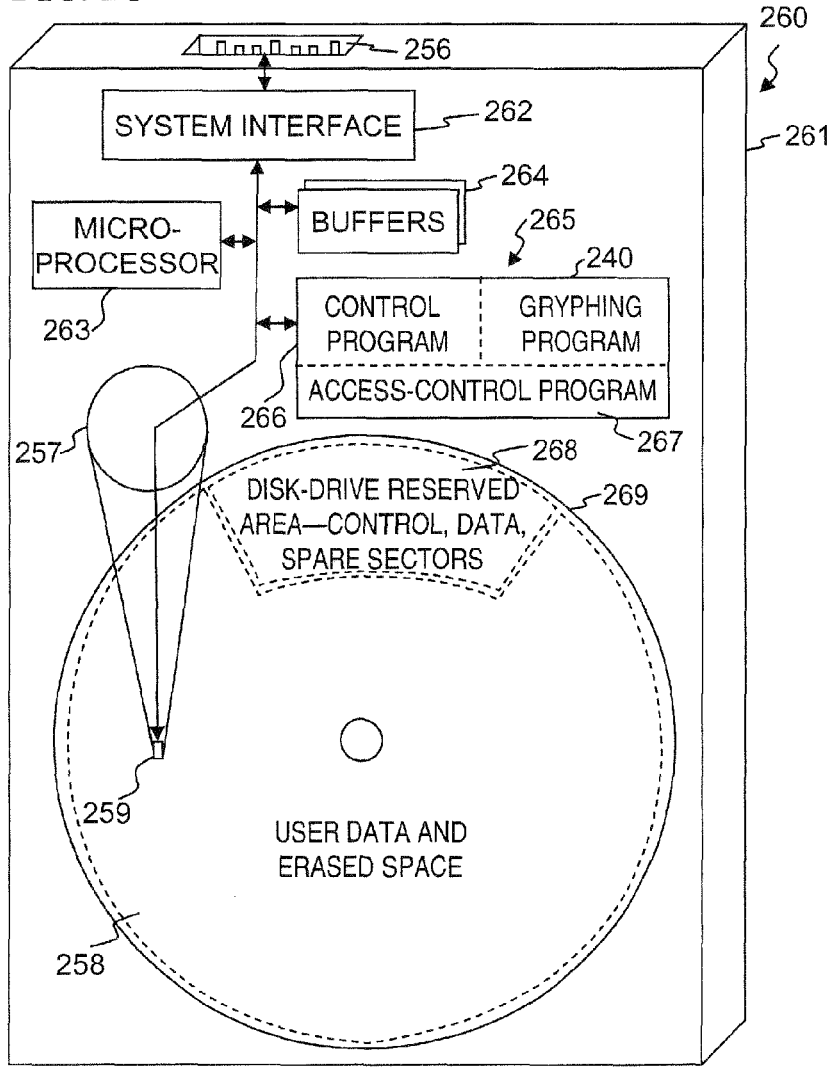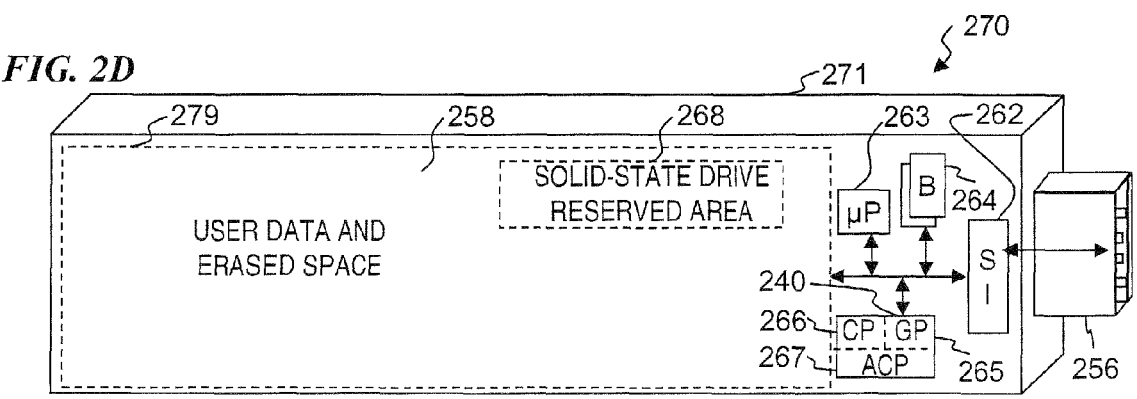

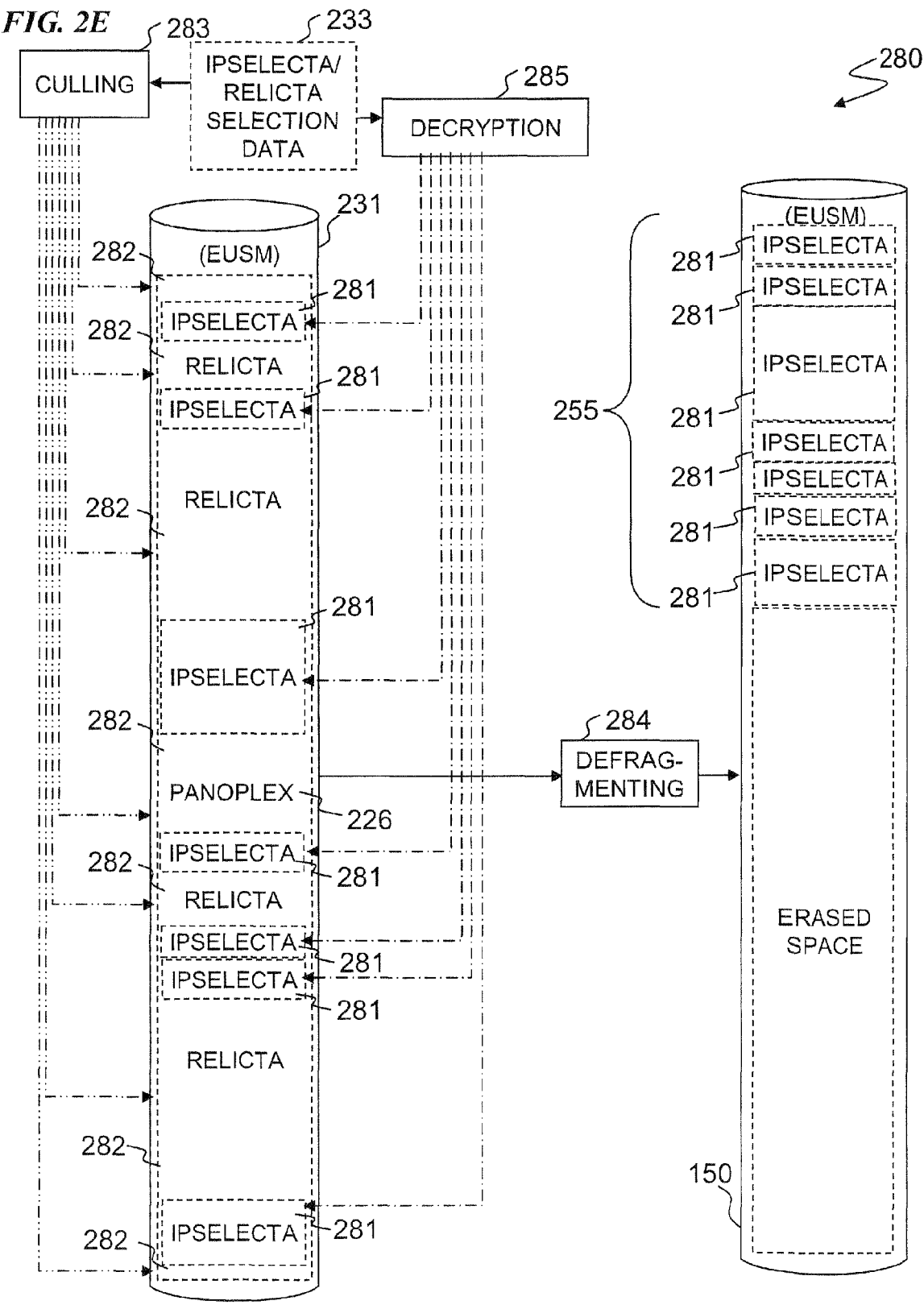

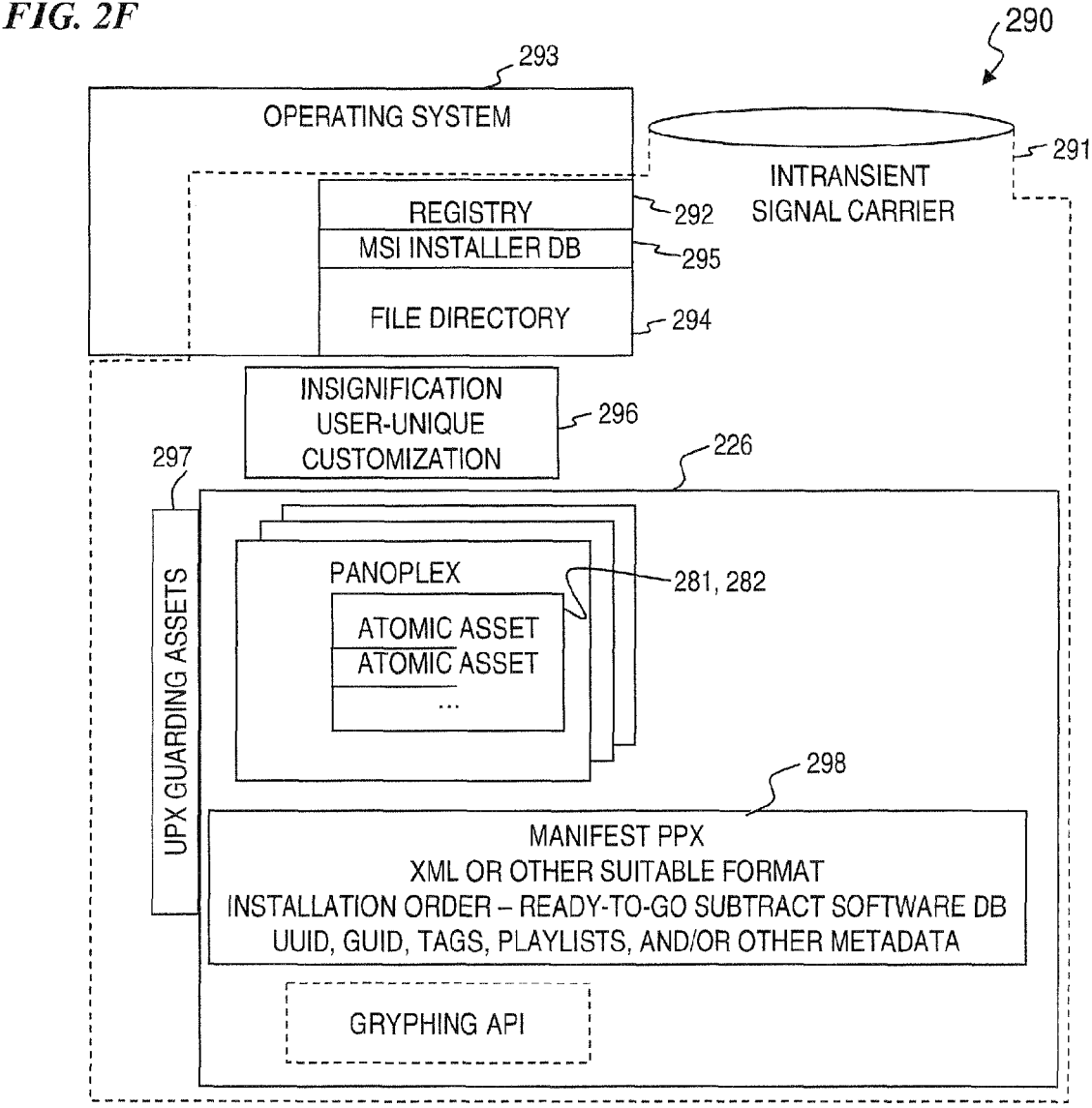
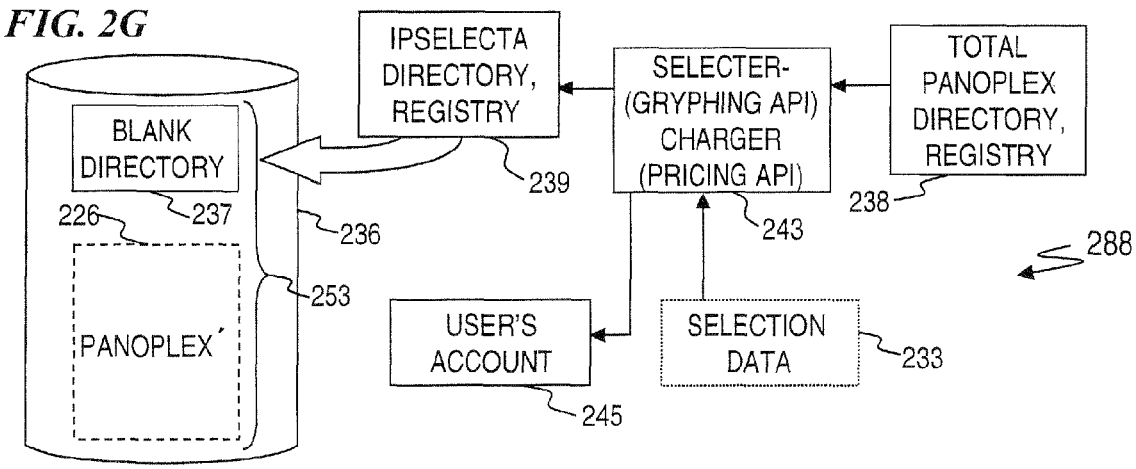

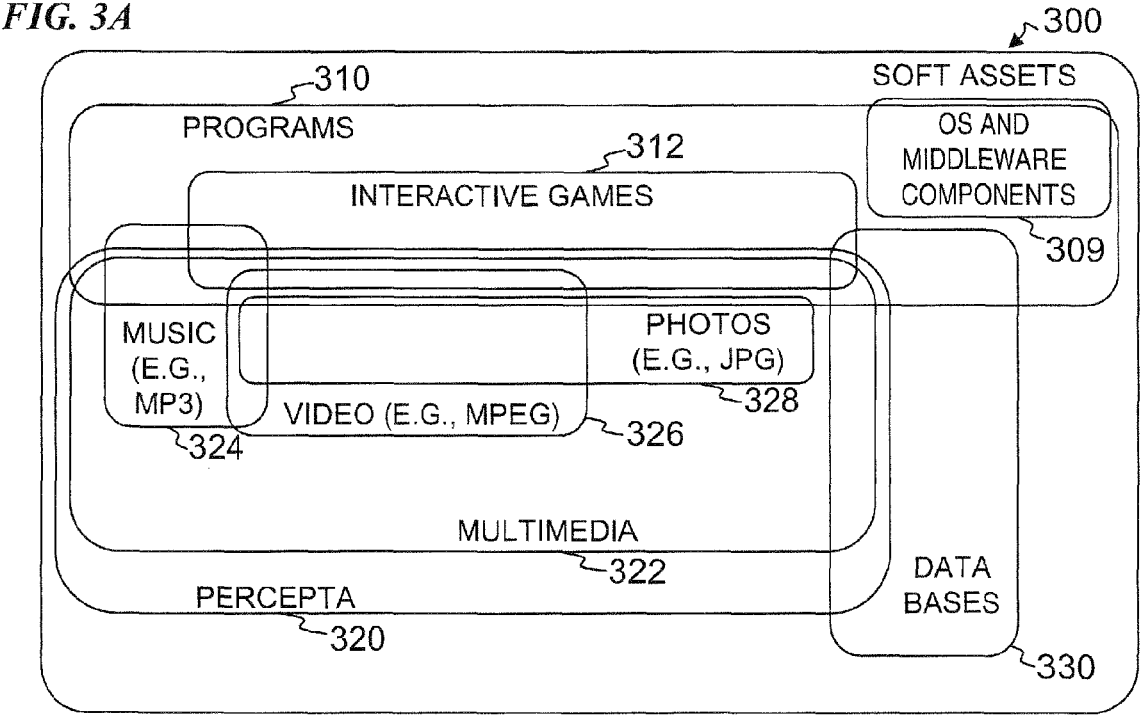
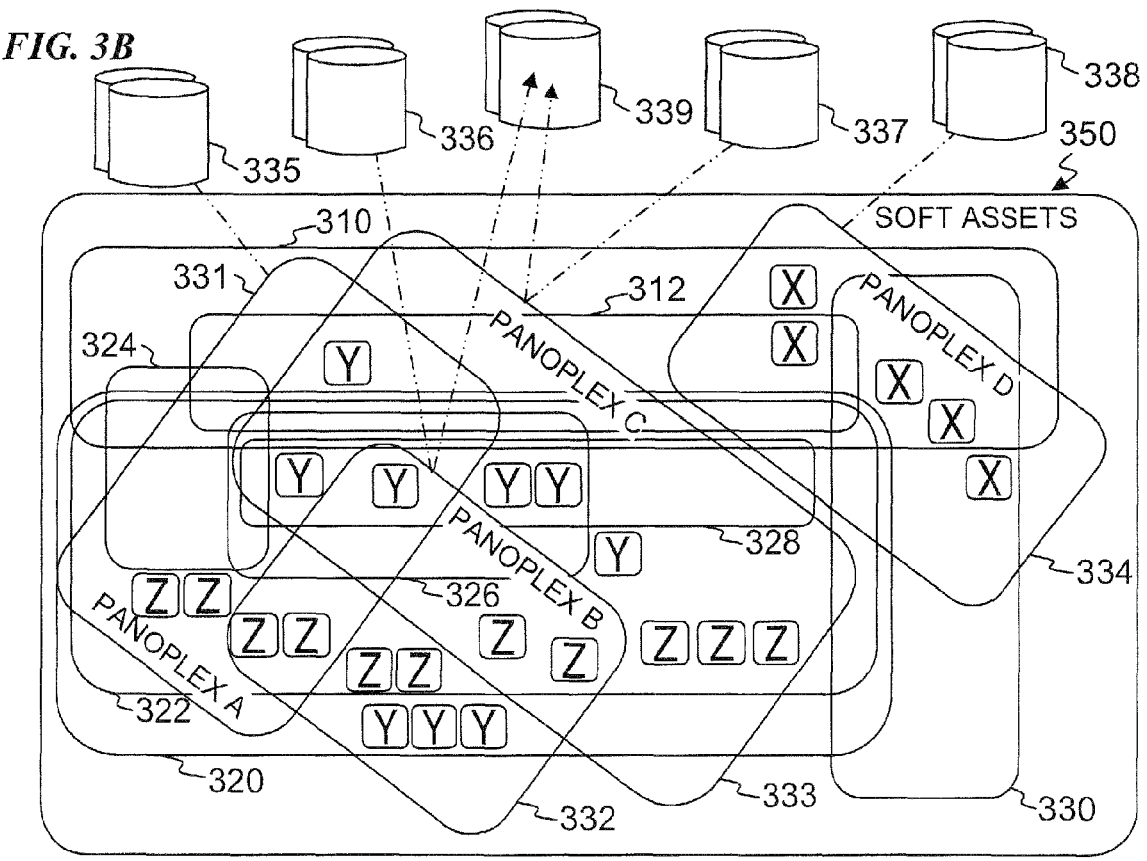

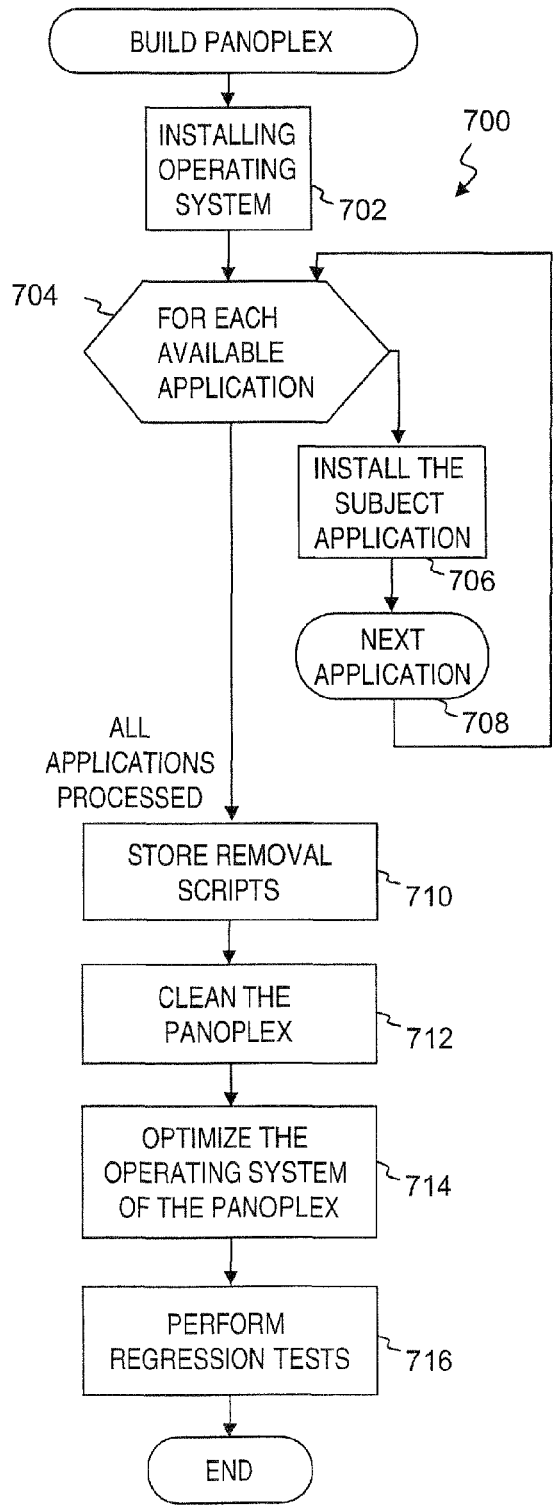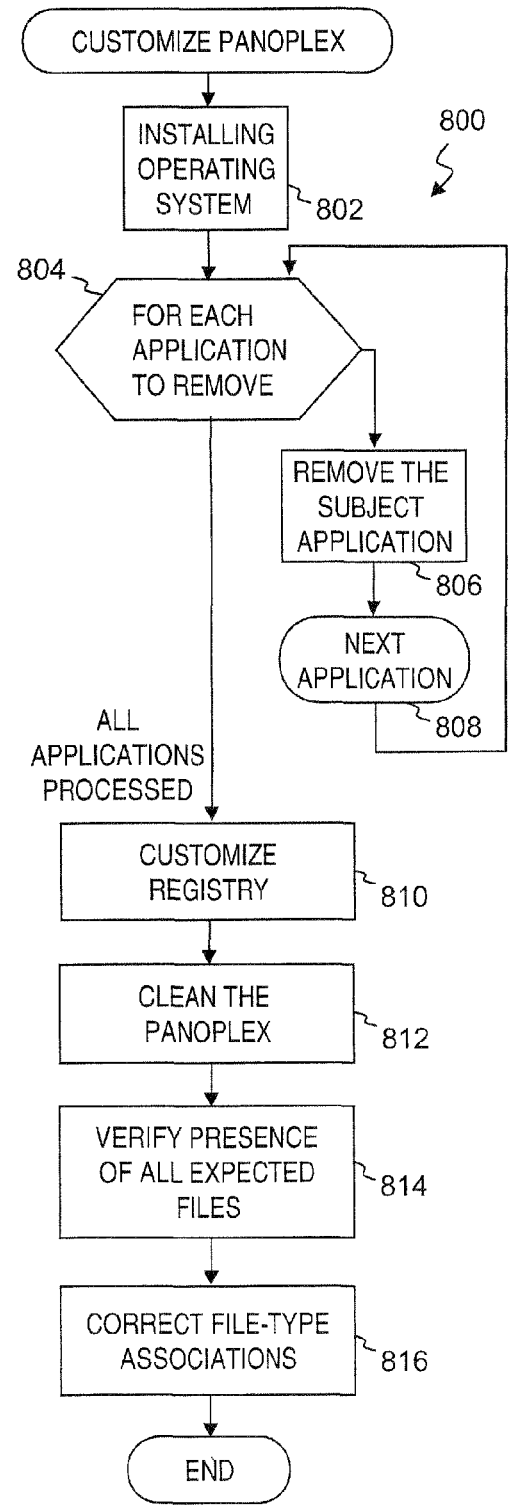

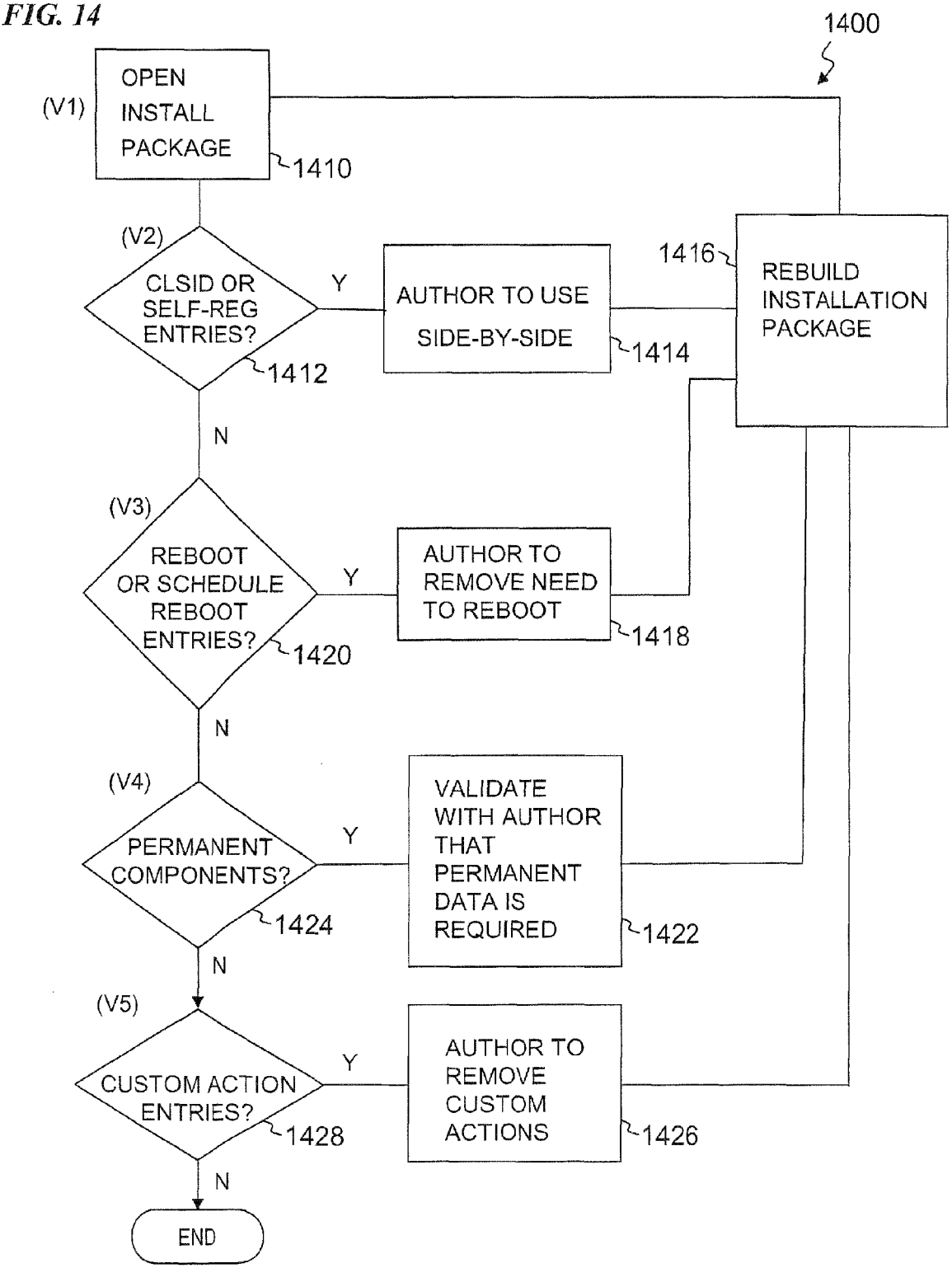

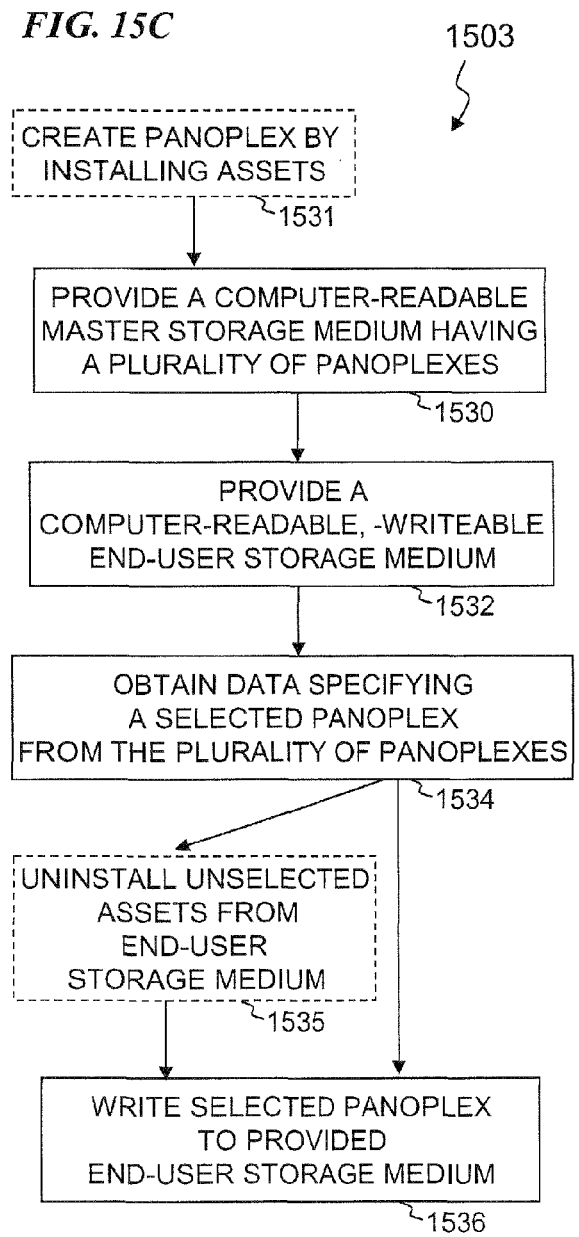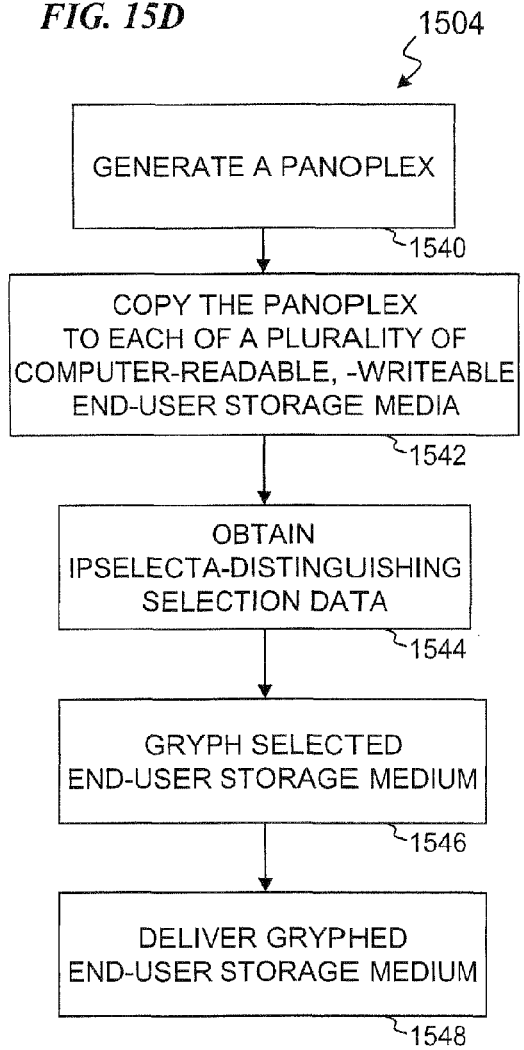

METHOD AND APPARATUS FOR GRYPHING A DATA STORAGE MEDIUM

CROSS-REFERENCE TO RELATED APPLICATIONS

This invention claims priority to U.S. Provisional Patent Application 60/753,635 filed Dec. 22, 2005 entitled "RAPID DISPENSING OF STORED DIGITAL CONTENT", and U.S. Provisional Patent Application 60/747,201 filed May 14, 2006 entitled "APPARATUS AND METHOD FOR SELECTIVELY DISPENSING SOFT ASSETS VIA SUBTRACTIVE INSTALLATION", which are both hereby incorporated by reference in their entirety.

This application is related to:

U.S. patent application Ser. No. 11/428,346 filed on even date herewith and entitled "APPARATUS AND METHOD FOR SUBTRACTIVE INSTALLATION" (which issued as U.S. Pat. No. 7,398,524 on Jul. 28, 2008);

U.S. patent application Ser. No. 11/428,352 filed on even date herewith and entitled "APPARATUS AND METHOD FOR SELECTIVELY DISPENSING SOFT ASSETS" (now abandoned);

U.S. patent application Ser. No. 11/428,359 filed on even date herewith and entitled "METHOD AND APPARATUS FOR REPLICATING A PANOPLEX ONTO A STORAGE MEDIUM FROM A MASTER" (which issued as U.S. Pat. No. 7,712,094 on May 4, 2010);

U.S. patent application Ser. No. 11/428,369 filed on even date herewith and entitled "METHOD AND APPARATUS FOR PANOPLEX GENERATION AND GRYPHING" (now abandoned); and U.S. patent application Ser. No. 11/428,376 filed on even date herewith and entitled "METHOD AND APPARATUS FOR DISPENSING ON A DATA-STORAGE MEDIUM CUSTOMIZED CONTENT COMPRISING SELECTED ASSETS"; which are all hereby incorporated by reference in their entirety.

FIELD OF THE INVENTION

The present invention relates generally to a fast customization of stored data (soft assets) on personal electronics and computers, and more specifically to methods, computer-program products, and apparatus for selecting or purchasing soft assets and delivering the custom-selected set of soft assets as pre-installed on the personal electronics and computers through erasing all non-selected assets.

BACKGROUND OF THE INVENTION

General-purpose computers play a material role in just about every facet of life in industrialized societies. Computers assume a wide range of roles, from home entertainment center to communications device to business tool to research workhorse to the very engines driving an information-based economy, among many others. However, computers are strange beasts. For what other expensive product aimed at the general public is pretty much useless out-of-the-box and dysfunctional by design?

The problem with general-purpose computers is that they are just that: general purpose. To serve well in any of their very specific roles, a general-purpose computer must be loaded, customized, and configured to achieve the specific purposes of the individual or organization buying the computer. The first of these annoying tasks is done most often by an end-user (who is likely to be afraid of computers, let alone have any expertise in computer configuration) by sequentially installing into the computer a set of soft assets, that is, information and content including computer operating systems, programs, data, and percepta, whether in digital, analog, or other form. The second of these tasks is accomplished by the user entering user-specific data in response to questions and prompts that come up as the software is entered. The third of these tasks is typically taken care of by software, in particular, the associated program installation wizard, as it is installed.

As used herein, "percepta" are soft assets that, by convention, depict qualities, in contrast to "data" representing quantities. Percepta typically represent simple or complex sensory stimuli, of fixed or variable duration. Percepta are generally structured as individually selectable items of self-describing content or organized sets of one or more files. In some embodiments, percepta include digital representations of information, while in other embodiments, analog or other types of representations are used. Examples of percepta include still images (including paintings, drawings, and photographs), motion-picture and sound files depicting cinema and video, e-books, radio programs, music, ring tones, virtual-reality simulations, computer games, and fonts. In some embodiments, percepta may include representations of other senses, including touch, taste, motion, smell, proximity, temperature, and direction.

Several factors make appropriate customization by the end-user inconvenient and problematic. First, end-user choices are unfortunately limited by the characteristics of existing content-distribution channels. Content is obtained by uploading from physical storage, for example, from an optical-storage disk (e.g., a CD, DVD or HD-DVD) that is part of a "shrink-wrap" boxed product, or alternatively, downloading content from a network. Therefore, content choice is highly constrained, for example, by the limited physical shelf space available at a retailer and the related cost and profitability of inventory, or by the magnitude of the aggregate content and the bandwidth capacity of the network connection, if downloading.

Second, such customization is simply time-consuming. To customize a computer, the end-user accumulates content, such as computer programs, for installation in the computer. The installation of each acquired set of content is generally additive to, and independent of, the installation of other content. Thus, the user acquires content, installs content, acquires additional content, installs the additional content, and so on, until the computer attains a desired state of functionality. A fresh new computer can easily amount to a couple of days' drudgery while a user customizes it with even the most basic set of programs and content. Even with special-purpose computers such as MP3 or other audio players, digital personal video recorders, cellular telephones, personal digital assistants (PDAs), digital watches, and the like, the user must acquire content and perhaps acquire programs or other assets to customize the functionality of the user's special-purpose computer and make it personally and professionally useful.

Third, customization by the end-user can destabilize the overall operation of the computer. Over a quarter of all application failures are traceable to installation and configuration problems. Oftentimes, installation of a computer program includes installation of multiple requisite assets, such as fonts and required program elements that may be shared among programs. Such required program elements include code libraries (e.g., sets of software routines). In the Microsoft-Windows family of operating systems, these libraries are called dynamic link libraries or "DLLs". DLLs are periodically released by their makers in various versions, and these versions may vary in unpredictable and undocumented ways in their behavior. Thus, if installation of a new program installs a new DLL that overwrites and replaces a previous version of the same DLL on which a previously installed program depended, the proper functioning of that previously installed program is jeopardized.

Without careful attention to the preexisting resources on a computer, installation of a new program can cause intermittent instability and malfunction in previously installed programs, conditions that can be nearly impossible to diagnose and remedy. This "flaky" and annoying phenomenon is so common in computers that it has been nicknamed, "DLL Hell."

Finally, customization of a computer by the end-user can be complicated, confusing, and demanding. Modern operating-system complexity exceeds the technical skills of all but a limited cadre of specially trained and certified individuals. Installation of computer programs calls for the end-user to select from a variety of settings and choices and provide sundry information. Such information can include choosing which components out of a number available are to be installed and selecting an appropriate storage region within the computer in which to install the program. While most installation systems provide guidance to the user in making such decisions, the instructions offered might be obscure or ambiguous, and error codes unintelligible to a layperson.

Frequently, the installation process must pause for the user to indicate a choice. A user is occasionally required to read and affirm a lengthy end-user licensing agreement. Other times, a user might need to separately enter a long, abstract code string, the user's name and address, or other information for validation and activation of every program. In some embodiments, the installation routine will mandate the user to shutdown and restart the computer, adding further delay. Each such action required of the end user represents undue complexity, an inconvenient delay and annoyance, and a potential source of error during the installation process.

The problem with computers is that, once customized for their intended use, they are as unique as are their respective users. While some manufacturers of computers provide some choices for customers, the choices are limited and rudimentary. For example, a manufacturer might give the customer a limited choice of operating system: (i) Microsoft Windows XP Home, (ii) Microsoft Windows XP Professional, or (iii) none. The manufacturer might also give the customer an equally limited choice of office suite software: (i) Microsoft Office Standard, (ii) Microsoft Office Professional, (iii) Microsoft Office Small Business, or (iv) none.

This generalized approach does not give a user access to the actual, specific products that they seek. Nothing currently offered by computer manufacturers even begins to address the necessary level of customization one sees with computers in actual productive use. Despite some offerings to the customer, limited to the lowest common denominator capable of supporting high-volume sales, customization of computers is still largely seen as the unaided responsibility of the purchaser.

Even the limited software routinely added to a new computer constitutes a production bottleneck. Major Electronic Contract Manufacturing (ECM), Electronics Manufacturing Services (EMS), or Original Design Manufacturer (ODM) companies operate facilities throughout the world. At the ECM, hardware assembly, for example of a desktop computer, can take approximately fifteen minutes. Then, with the personal computer running for the entire software-load process, the operating system and other software are loaded, adding another ninety minutes or more to the manufacturing time. Manufacturers typically limit the choices available to select, since a random set of soft assets takes too long to install economically. They then leave it to the user to install and configure any soft assets not available in their limited choices.

Introduction to the Build-to-Order (BTO) Environment

A number of patents describe attempts to improve the customization of software on computers, sometimes referred to as a build-to-order process. Such a process typically uses "additive installation" wherein software packages are successively loaded and/or installed on a disk drive. For example, U.S. Pat. No. 6,080,207 "System and method of creating and delivering software" issued to Kroening, et al. on Jun. 27, 2000, and is incorporated herein by reference. Kroening et al. describe a computerized method for generating a custom software configuration for a hard drive of a computer system according to a desired software configuration defined by a purchasing customer. The system and method utilize an image builder for creating a disk image of the desired software configuration and transferring the image to a storage device. The storage device is connected to an image server that transfers the disk image (e.g., of a baseline software configuration) directly to the hard drive during a manufacturing and assembly process of the computer system. Once the computer system is assembled, the image server broadcasts additional data (e.g., of changes corresponding to the difference between the baseline software configuration and the desired software configuration) to the computer system via a wired or wireless connection.

As another example, U.S. Pat. No. 6,385,766 "Method and apparatus for windows-based installation for installing software on build-to-order computer systems" issued to Doran, Jr., et al., on May 7, 2002, and is incorporated herein by reference. Doran Jr. et al. describe a method for automated installation of software into a computer system including loading an operating system (OS). The OS is provided with a hook for initiating a windows-based install of prescribed software packages during an operating-system setup. At least one prescribed software package and a corresponding windows-based software package installer are loaded onto the computer system. The operating-system setup is then executed. Lastly, the windows-based install of the prescribed software package is initiated in response to the hook, the windows-based install being carried out according to the corresponding software package installer.

Introduction to Install and Uninstall Processes

Other patents describe ways of installing and/or uninstalling software. For example, see U.S. Pat. No. 5,768,566 "Method and facility for uninstalling a computer program package" issued to Harikrishnan, et al. on Jun. 16, 1998, which is incorporated herein by reference. Harikrishnan et al. describe a computer program product having a facility for uninstalling itself. The facility only backs up a minimal set of files that may be affected by an installation of the computer program product. The facility dynamically adapts to different possible installations so as to only store compressed backup copies for the particular installation that is to be used. The facility leverages a number of installation files to determine what files to back up. When a program is uninstalled, the backed-up files are restored in an attempt to return the computer system to a state that existed before the program was installed, such that the backed-up files are again on the system in their original form.

U.S. Pat. No. 6,006,035 "Method and system for custom computer software installation" issued to Nabahi on Dec. 21, 1999 and is incorporated herein by reference. Nabahi describes a method for custom computer-software (additive) installation using a standard rule-based installation engine. Custom installation parameters are translated into a simplified script-language file by a system administrator. A software package is installed onto a client (end user's) computer using the installation engine, which is executed using commands stored in a rule-based instruction file. The rule-based instruction file (script) has been configured by the provider of the application software package, or created according to custom installation parameters by a system administrator, to control software installation by the rule-based installation engine. The script controls a sequence of installation events including (1) a file-copying event wherein files from the software package are copied to the client computer, and (2) an operating-system-modification event wherein operating-system parameters on the client computer are modified to allow execution of the software package.

U.S. Pat. No. 6,026,439 "File transfers using playlists" issued to Chowdhury, et al. on Feb. 15, 2000 and is incorporated herein by reference. Chowdhury, et al. describe a method for transferring data from memory to a file decoder for further processing, for example, a video file is decoded for presentation on a display device. A plurality of control functions are provided for access by a user or a user system in controlling the identity, sequence and flow of file transfers in order to optimize transfer efficiency in a data-transfer transaction.

U.S. Pat. No. 6,442,754 "System, method, and program for checking dependencies of installed software components during installation or uninstallation of software" issued to Curtis on Aug. 27, 2002 and is incorporated herein by reference. Curtis describes a method for installing a program onto a computer having an operating system. Dependency objects indicate a dependent component on which the program to install depends. The program processes the dependency objects before installing the program and determines an operating-system command that is capable of determining whether the dependent component is installed in the computer. The program then executes the operating-system command. An indication is made as to which dependent components have been determined to be not installed. This Curtis patent notes "An installer program is a software program that enables a programmer to write specific code to install a given application program onto the drives of a computer in a way that enables the given application pro ram to work correctly with the computer's environment, including its operating system. There are several types of installers—Java installers and operating system specific installers, e.g., Microsoft Windows installers, and International Business Machines (IBM') OS/2 and AIX operating system installers, etc. . . . A registry is a central repository for all possible information for the computer such as hardware configurations and software settings, etc. The registry maintains information on installed components. A programmer or user can access the registry to determine information about installed products, based upon what the user/programmer placed into the registry or what information is useful to the user . . . . Moreover, each operating system provides different techniques to track installed programs and their dependencies. A dependency indicates a program that another program needs in order support all functions. A depending program is a program that requires the installation of a dependent program to implement all the depending programs features and functions."

U.S. Pat. No. 6,944,867 entitled "Method for providing a single preloaded software image with an ability to support multiple hardware configurations and multiple types of computer systems" issued to Cheston et al. on Sep. 13, 2005, and is incorporated herein by reference. Cheston et al. describe a hard disk drive of a computer system that is loaded with a preloaded image including an operating system, a number of application programs, and a device-driver installation routine, all of which are not dependent on the hardware configuration of the computer system. A hidden partition of the hard disk drive is also loaded with a number of device drivers, which are dependent upon the hardware configuration. During the first boot only of the preloaded image, the device drivers are installed by the device-driver installation routine.

U.S. patent application Ser. No. 10/264,670 (Publication Number 2003-0110241) "System, method, and computer program product for uninstalling computer software" filed by Cheng, Jr., et al. on Oct. 4, 2002 is incorporated herein by reference. Cheng, Jr., et al. describe a method to update client computers of various end users with software updates for software products installed on the client computers. The system includes a service-provider computer, a number of client computers and software-vendor computers communicating on a network. The service-provider computer stores information in an update database about the software updates of the diverse software vendors, identifying the software products for which updates are available, their location on the network at the various software-vendor computer systems, information for identifying the software products stored in the client computers, and information for determining which products have software updates available. The client computers connect to the service-provider computer and obtain a current version of portions of the database. The client computer determines from the database which products have updates available. User-selected updates are downloaded from the software vendors' computers and installed on the client computer. Payment for the software updates is mediated by the service-provider computer. Authentication of the user ensures only registered users obtain software updates. Authentication of the software updates ensures that the software updates are virus free and uncorrupted. Changes to the client computer during installation are monitored and archived, allowing the updates to be subsequently removed by the user.

The above-described prior art, individually and in combination, fails to provide manufacturers and users with an adequate platform to specify and provide mass-produced customized digital appliances. These patents do not provide ways to quickly, economically, and reliably provide a particular user with installed versions of just those soft assets selected according to the user's desires from a large set of all available soft assets.

What is needed is an enabling technology for fast, scalable, automated dispensing of a customized set of digital software and other content into an information-processing device, in a non-intimidating manner that makes such assets immediately available for use.

BRIEF SUMMARY OF THE INVENTION

In some embodiments, the present invention provides a method, article of manufacture, computer program product, and/or apparatus useful for "sideloading" soft assets into a finished device. Sideloading (unlike other processes such as downloading software from the internet, or uploading soft assets from a CDROM) involves quickly generating a storage medium having therein a deeply customized, user-specified set of installed soft assets. Coupling the storage medium, loaded with installed soft assets (i.e., the software), to an information-processing device (i.e., the hardware) makes the device operational (i.e., the hardware and software when co-functionally joined together are substantially ready-to-use). Sideloading provides the benefits of an expert-optimized, user-customized installation of a uniquely selected set of soft assets needed to make the hardware operational, without the cost and time previously required to additively install such a set of assets. In various embodiments, different portions of the sideloading process are done either before or after the storage medium is coupled to the device.

In some embodiments, sideloading is made possible by "subtractive installation." Subtractive installation presents a user with a large superset of soft assets (a set of maximum complexity) from which to choose. The user chooses which assets are to be kept and non-chosen assets are removed. "Gryphing" is the term used herein as a process to remove from a storage medium, which initially had a vast array of previously installed soft assets, those assets not part of the chosen set of assets to keep (or equivalently, to remove those assets that are part of the set chosen to remove).

Gryphing involves culling assets, erasing data and/or uninstalling programs from a directory, registry, and/or other areas of digital storage. With gryphing, a user chooses a subset of the soft assets for purchase. The user pays only for the software and other soft assets she or he desires, and all other soft assets (those not selected) are culled by the gryphing process. A typical user would not be able to afford to buy all of the soft assets included in the superset, but benefits from the ability to choose, from the wide variety available, just those assets he or she wants to buy. The vendor benefits from the additional sales achieved by the availability of the wide variety of soft assets.

With subtractive installation, erasing the non-selected assets is generally much faster than installing the selected assets in the conventional manner (called additive installation). Further, storage space previously used for the culled portions is made available for storing other data. Further, since the manufacturer can use experts to create the initial set of assets to be preinstalled on the storage medium and to design an optimal method for uninstalling non-selected assets, interoperability problems and configuration conflicts can largely be eliminated.

In some embodiments, the present invention provides for receiving and installing a user-customized order for an information-processing appliance that is to have user-selected computer programs or other soft assets, and, based on the user-customized order, uninstalling unselected items from a storage medium that previously held a selected superset of available assets. In some embodiments selection information may be transmitted to a central server and gryphing information transmitted from a central server. In some embodiments, a monetary amount is charged to the user's account based on the selection information.

In some embodiments, sideloading provides a fully customized and operational processing device (also called an information-processing appliance) by operatively coupling a user-customizable storage medium to the information-processing device. The device, for example, could be a personal computer, server, MP3 player, cell phone, digital video recorder, personal digital assistant, game console, vehicle (e.g., an automobile having one or more processors that control the automobile's operation, provide a database for its GPS guidance, preloaded entertainment, and model-specific maintenance documentation and diagnostics), refrigerator, industrial tool, cash register, weapon, or the like.

In some embodiments, the customized storage medium is formed by subtractive installation of soft assets, wherein the storage medium is preloaded with a superset of soft assets for possible purchase and/or distribution (a collection of available content called a "panoplex"), and is then gryphed to remove non-selected soft assets (creating erased space that can then be used for other data) and to retain selected assets (which are thereby substantially ready to use without substantial effort or additional input from the end user). The panoplex functions as at least a part of a dispenser (an automated machine that can provide or deliver, when spurred by human operator, something already stored in it) in that it is a virtual container so designed that its contents can be used only in prescribed amounts.

To better understand gryphing, it is helpful to understand the gryphing context: the panoplex—what is gryphed; instantiation—(creating a particular from the general master) the duplication of the storage device holding the panoplex; eligation—the selection from the panoplex; ipselecta—the chosen set remaining after gryphing; and relicta—the part of the panoplex that is gryphed and removed.

Panoplexes are designed from a collection of digital assets and a master of each is created. That master is duplicated onto the individual storage media that serve as components to the digital devices that are capable of processing such assets. An eligation is made from that panoplex. A relicta list is developed from the eligation of the particular panoplex. The relicta list guides the gryphing API to erase the assets in the relicta list leaving precisely the ipselecta available to the user of the device.

A technical objective of a panoplex is to provide a collection of pre-installed assets that will operate within the same computer system and may be arbitrarily uninstalled without creating system instability. Therefore, computer-program assets are best required to be "well-behaved" for panoplex inclusion. Well-behaved in this context includes three phases of the program—installation, operation, and un-installation or removal. As will be seen, one good way for achieving good behavior is to provide means for program isolation. When a program is installed, it should not alter or erase other previously installed programs' files or settings. Likewise, it should not modify shared resources. During operation, it should likewise not tamper with other programs' resources. And on removal, the uninstall procedure should restore the system state to that prior to the installation of the program. The above material was discussed in Appendix E of the Applicant's U.S. Provisional Patent Application 60/753,635 cited above.

Some embodiments include vetting to screen, certify and validate software applications, in order to avoid system instabilities arising from unauthorized changes to shared resources (this was discussed in Appendix B page 2 paragraph 3 of Applicant's U.S. Provisional Patent Application 60/753, 635 cited above). In some embodiments, the present invention eliminates the need to manually monitor the system during its preparation and also eliminates the possibility of conflicting software applications. In some embodiments, the computer system is prepared with the superset of software applications that are erased to produce the final set of software applications that will be used. Conflicts are eliminated when the superset of software applications is created because a screening method is applied before a software application is added to the superset. This screening process is described in this invention as a validation that all the software applications in the superset do not conflict with each other. The superset of software is not simply a collection or bundle of software applications that have all been added or installed onto a computer system. The superset is a set of software applications that have been validated to not conflict with each other. Software applications that are candidates for addition to the superset go through a validation process that ensures that there are no conflicts.

Thus, the panoplex is a collection of pre-installed soft assets that can operate within the same computer system or percepter and may be arbitrarily uninstalled without creating system instability.

Installation makes the product available for the customer on the customer's computer. Products delivered as an image on a CD cannot be used without an installation step. The installation step uses a program that makes the necessary changes to the customer's computer, after which the customer can use the product. Uninstalling a product is the reverse of installation. The customer's computer is configured by removing files and other data, the result of which is that the customer can no longer use the product. The uninstall routine erases the certain elements associated with the asset and may restore the state of other configuration files generally within the registry by removing meta information associated with that asset.

Percepters are generally closed systems whose functionality cannot be altered by their users. Many consumer-electronic devices are now percepters. Percepters can be relatively simple, single-purpose machines, like an Internet radio or CD player. Enhanced traditional consumer-electronic devices like a flat-panel television with a hard drive or more complex mutations of product categories are also percepters.

In a Windows-type embodiment, the present invention can use "software vetting," a new method for screening, certifying and validating software applications enabling arbitrary installation and removal without incurring system instabilities arising from unauthorized changes to shared resources. This vetting technique may be used with additive, subtractive, or other software installation processes. Vetting optionally includes introduction of taggants into the software to log installation and removal operations.

The digital assets most likely to be installed in new personal computers are programs. In some embodiments, to become functional and thus usable, they must be transformed from a haplos state of elements including an installation routine, to simplex, whereby the soft assets are engaged and intertwined with the operating system. Furthermore, programs can be referred to as the entities themselves, as a program like Adobe Acrobat, or as a feature such as Adobe Acrobat Reader, or as a component, i.e., the smallest unit of actual resources necessary to provide a given function managed by the installer program. In this specification, a digital asset can refer to a program, feature, or component.

In some embodiments, the present invention provides a storage medium with a panoplex stored thereon. The panoplex provides the superset of soft assets from which a customizable subset may be selected. In some embodiments, the storage medium in that initial state is considered to be an intermediate workpiece; one that has been partially processed according to the present invention to copy the superset of assets onto the storage medium, but which needs further processing to remove those assets not selected for retention and/or to enable for use those assets selected for retention. Alternatively, in some embodiments, such a combination might be an end product itself.

In other embodiments, the customized storage medium is formed, at least in part, by additive installation of soft assets (e.g., software programs, control algorithms, music, video, still images, databases, and the like) to the storage medium by copying sets of files and modifying operating-system parameters. In some embodiments, additive installation is used after the subtractive installation described above, for programs or other soft assets that happen not to be in the original panoplex and for user-specific information.

In some embodiments, sideloading using subtractive installation provides user-selected content dispensed from a storage medium into which a superset (a "panoplex") of available content had previously been replicated. A non-selected portion of the available content is subsequently removed by gryphing, leaving the selected content available and/or installed on the storage medium. Selected content is, in effect, "installed" by removal of non-selected content, as the gryphed storage medium is functionally equivalent to a storage medium to which selected soft assets have been properly incrementally installed in a manner that optimizes compatibility and/or the order of installation.

Optionally, other selected content is then incrementally installed to the gryphed storage medium. The gryphed storage medium (for example, an optical disk or disk drive (ODD), magnetic disk drive, or solid-state memory (e.g., FLASH or holographic memory)) is incorporated within a device (for example, a computer, music player, video player, cell phone or hybrid cell-phone that also plays stored music) that can appropriately operate and process such content (such as computer programs, music or video), making the selected content available to an end-user of the device. Such optimal coupling of customized content with a suitably operational device creates an information-processing appliance with appliance-like ease-of-use.

In some embodiments, the present invention provides a method that includes generating a panoplex that includes a universe of separately selectable installed soft assets, copying the panoplex to each one of a plurality of information-processor-usable, end-user storage media, obtaining a first set of selection data that distinguishes "ipselecta" (i.e., a first subset of the plurality of installed soft assets that are to be retained) from "relicta" (i.e., a second subset of the plurality of installed soft assets that are not to be retained, to be relinquished, or let go), gryphing a selected first end-user storage medium (culling, erasing and/or uninstalling the relicta from the end-user storage medium as specified by the selection data), and delivering the gryphed end-user storage medium (e.g., delivering it to an end user). In some embodiments, the method also performs one or more authorization functions that enable operability of the ipselecta on the storage medium, and/or one or more exclusion functions that help ensure that the relicta remain erased, unavailable and/or inoperable.

In some embodiments, a charging mechanism charges or debits an account of the user for the retained content (e.g., an exchange of money for the retained assets), based on the selection data. In some embodiments, gryphing also includes checking whether this particular user is authorized to receive certain of the selected assets, and gryphing may require a specific authorization code (or the like) to be provided in order to unlock those certain ones of the selected assets. In some embodiments, unless a specific authorization code were provided, certain assets would be excluded from the list presented to, or selectable by, the user of the superset of assets from which she or he could select. This could be useful in military or police situations if an officer is to be provided a weapon having a wide variety of software-enabled capabilities from which to select, but certain ones of those functions require specific permission or authorization from superiors based on the situation before they could be selected (e.g., an exchange of authorization for the retained assets).

Thus, the ipselecta are individually user-determined notional bundles of content. In some embodiments, the first end-user storage medium is selected, based on a fit to the first set of selection data (e.g., from a first customer's choices), from among a plurality of different storage media, each of which has a different one or more panoplexes stored thereon.

In some embodiments, the list of selections shown to a particular user may be limited based on a criteria determined by the seller or provider (e.g., a retail outlet having a special sale that excludes certain assets otherwise available on the panoplex, or a corporation that limits, or requires management authorizations for, the selections available to its employees of certain departments or ranks or divisions) or by the purchaser (e.g., someone who only wishes to see selections from hip-hop, blues, or jazz).

In some embodiments, a second storage medium is selected, based on a second set of selection data from a second customer's choices. The second storage medium is then gryphed to obtain a different ipselecta for the second customer's device. The present invention thus provides a method to flexibly and dynamically dispense software and/or multimedia in a wide variety of such notional bundles or suites that the users choose, rather than in a limited choice of pre-packaged bundles proposed by the vendor.

In some embodiments, a single device will connect to a plurality of storage media, each containing a portion of the ipselecta (e.g., a personal computer with two or more disk drives, or a music play having an internal disk drive plus a socket for a removable flash drive) and the device operates to provide availability of the soft assets on all the attached media. In some embodiments, the dispensing computer operates to gryph a plurality of storage media substantially simultaneously (e.g., to gryph a plurality of disk drives that will connect to a personal computer for one user, or to gryph different disk drives or different media to form ipselecta for a plurality of different users getting different devices).

In some embodiments, the generating of the panoplex includes providing a computer system having an operating system and an installation storage medium, and using the operating system and/or other software to install a plurality of soft assets onto the installation storage medium to initially create a master panoplex. This one-time master-panoplex creation allows experts at the manufacturer or a supplier to select an optimal order and internal storage configuration for installation. They can also determine, adjust, and fix interdependencies and other installation problems among a large number of potentially desired programs and/or other soft assets.

The panoplex can vary by operating system and file system, device type and media file type, storage media and copying methods (e.g., fixed, removable, hard disk drive, FLASH, and/or optical), the number of panoplexes installed per device, the sequencing and staging of steps, the location and party undertaking the steps, the degree of method refinement, various combinations of panoplexes, stub installs (installs of software that facilitate activation of already copied software and/or downloads of software and/or upgrades, compliance checking (whether each soft assets complies with a standard that helps ensure interoperability and functionality of various combinations of software), and/or whether the installation of the soft assets is part of manufacturing new devices (such as new personal computers, cell phones, or music players), manufacturing of upgrade devices (such as disk drives or FLASH memories that can be attached to existing personal computers, cell phones, or music players to upgrade their capabilities), or upgrade done at a retail establishment (such as erasing, formatting and reloading of a storage medium in an existing computer).

The panoplex can be copied en masse to a storage medium that is later gryphed to obtain a user-selected subset of soft assets customized to the choosing of a particular end-user. Each purchaser of a device (e.g., computer hardware) can pick-and-choose any subset of the soft assets (e.g., software needed to make the hardware useful) to purchase and/or otherwise retain. Some embodiments include selecting among a plurality of storage media to find one having a panoplex that includes as many of the user's choices as possible. The panoplex is then gryphed based on the customer-selected set of soft assets, such that the non-selected assets (the "relicta") are erased and/or uninstalled, and the selected assets (the "ipselecta") are delivered to the user as part of a ready-to-use "new" device. The resulting devices using that storage medium are more reliable than if each end-user were to randomly select an order of installation and additively install a corresponding set of soft assets, and are much more quickly generated than if the manufacturer or end user were to individually install the selected subset of assets even if that were done in an optimal order.

In some embodiments, two or more panoplexes are stored on a master storage medium. A first selected panoplex is copied from the master storage medium onto each of a first plurality of end-user storage media, and a second selected panoplex is copied onto each of a second plurality of end-user storage media. In some embodiments, a selected panoplex is written to a selected plurality of end-user storage media as a last operation in a manufacturing and testing process for a disk drive or other storage medium. Normally, a set of zeros or some other blank data pattern (i.e., typically not programs or other soft assets are the last data written to the entire data area of the disk, and this last pattern is read and its data compared to the data intended to be written. In some embodiments, the writing and reading of the panoplex replaces or follows this last operation.

In some embodiments, one or more data-encryption, sequestering, or other protection methods are used to obscure and prevent access to the soft assets contained within the panoplex on the end-user storage media unless and until a gryphing program is run on each end-user storage medium. In some embodiments, a "blank" directory structure is written to a default location used by an operating system for the directory of the end-user storage medium, such that the storage medium appears to the operating system and user to be substantially blank if used as is by that operating system. In some embodiments, actual directory data for the panoplex is written elsewhere on the end-user storage medium or on an external storage device, such that the gryphing program can access the panoplex directory data, gryph it, and write it to the default location used by the operating system for its directory.

In some embodiments, a selection program presents to a user an interactive user interface that facilitates selection of the soft assets to be retained in the ipselecta. In some embodiments, a price/profit-optimization/maximization program is coupled with the selection program to effectively provide different prices for a particular soft asset based on such information as the relative "value" of the particular customer, the other assets, products and services selected for purchase, the overall price and/or profitability of all goods selected, seasonal and/or other temporal information, promotions, sales, or the relationship of a company's current achieved performance metrics to their projected objectives, and the like.

The subtractive installation "choose-and-remove" approach represents a significant paradigm shift away from the conventional additive approach to digital-content installation (that of incrementally adding desired content until all desired content is stored), to that of the present invention's gryphing technique, which is more akin to the classical sculptor's approach—"I saw the angel in the marble, and I carved until I set him free," as practiced by Michelangelo. For the present invention, the creation of the panoplex is like providing a raw block of marble (which can be carved into any desired form by removing unwanted marble chips). The culling of unselected assets to obtain a storage medium with only the desired soft assets is like carving away the unwanted marble to leave the desired statue of the angel.

BRIEF DESCRIPTION OF THE DRAWINGS

FIG. 1C is a flow diagram of a process 130 for dispensing soft assets into a storage medium 150.

FIG. 1D is a flow diagram of a gryphing process 152.

FIG. 1E is a flow diagram of a network-activated gryphing process 155.

FIG. 2A is a block diagram of a panoplex-generation and panoplex-gryphing process 200 for creating a storage medium 150 having a customized and/or user-selected set of soft assets.

FIG. 2C is a block diagram of a storage device 260 (e.g., embodied on a disk drive 261) having a self-contained gryphing program 240.

FIG. 2D is a block diagram of a storage device 270 (e.g., embodied on a solid-state drive 271) having a self-contained gryphing program 240.

FIG. 2E is a block diagram of gryphing process 280 used on a storage device 231.

FIG. 2F is a block diagram of intransient signal carrier 290 used for a storage device 231.

FIG. 2G is a block diagram of a process 288 to process a blankoplex 253 used for a storage device 236.

FIG. 3A is a Venn diagram of a set of soft assets 300.

FIG. 3B is a Venn diagram of a set of soft assets 350 selected and gryphed.

FIG. 7 is a logic flow diagram illustrating creation 700 of the panoplex of FIG. 5.

FIG. 8 is a logic flow diagram illustrating customization 800 of the panoplex of FIG. 5.

FIG. 14 is a flow diagram of a validation process 1400.

FIG. 15C is a flow diagram of a method 1503.

FIG. 15D is a flow diagram of a computer-implemented method 1504.

DETAILED DESCRIPTION OF THE INVENTION

Figure 1A:
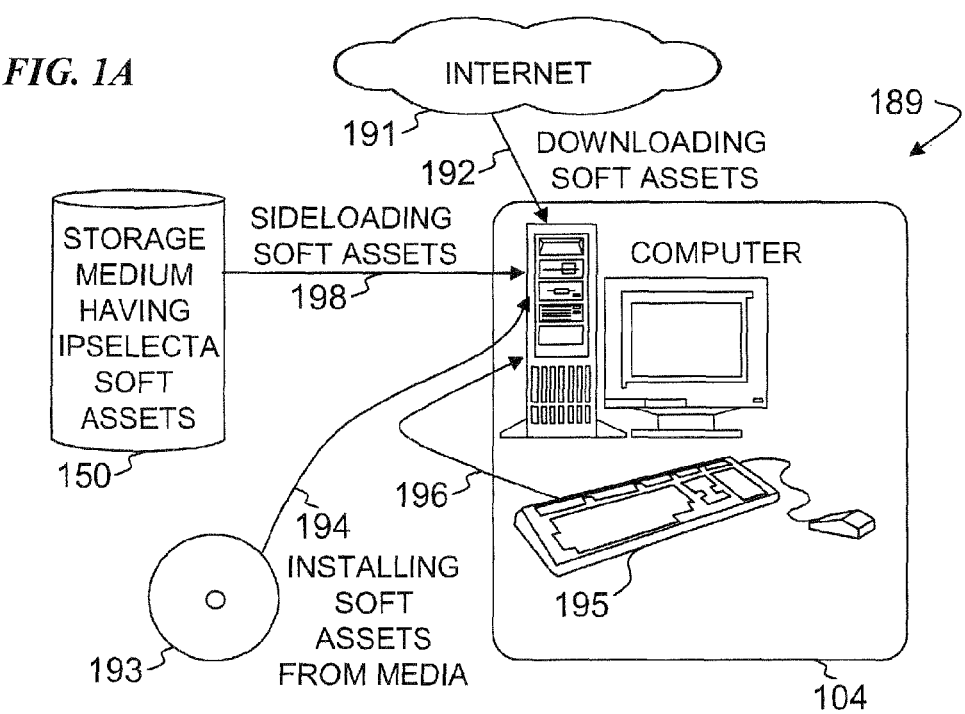
FIG. 1A is a block diagram of a sideloading process 189 for dispensing soft assets into a personal computer or similar information-processing device.

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention.

In the following detailed description of the preferred embodiments, reference is made to the accompanying drawings that form a part hereof, and in which are shown by way of illustration specific embodiments in which the invention may be practiced. It is understood that other embodiments may be utilized, and that structural, sequential, and temporal changes may be made without departing from the scope of the present invention.

The leading digit(s) of reference numbers appearing in the Figures generally corresponds to the Figure number in which that component is first introduced, such that the same reference number is used throughout to refer to an identical component that appears in multiple Figures. Trailing letters appending reference numbers generally refer to variations of embodiments regarding a component or process. Signals and connections may be referred to by the same reference number or label, and the actual meaning will be clear from its use in the context of the description.

Subtractive Installation

In the personal-computer and other industries, conventional devices (such as automobiles, mini-tower PCs, or video-cassette recorders (VCRs)) were designed based on a maximally-featured model that, when fully populated with hardware (chips, switches, DVD drives, diskette drives, fog lights, radios, read heads, and/or other parts), would provide that design for maximum feasible functionality. Lower-cost models were then derived from the top model (which provided holes and wires) by not installing certain buttons or chips that activated functions that were available only in the higher-priced model. Alternative faceplates or plugs for the holes were often provided for those lower-end models.

In contrast, one unique aspect of the present invention, subtractive installation, is that some embodiments actually install, on every device, the maximum feasible software functionality by putting a universe of selectable soft assets (the panoplex) on a flexible base (the intransient signal carrier, in some embodiments). The panoplex is designed, customized and debugged to function on a predetermined hardware base, but the panoplex of soft assets is then depopulated (at an arbitrarily fine level of granularity) to achieve the separate and individual price and functionality point desired by each the customer. Because of the ability to quickly erase data from a storage medium, fast and efficient depopulation is feasible.

Large-scale, deep customization in which particular soft assets are included on a hardware/software or device/digital-asset product (i.e., customization involving available selections numbering in the hundreds or even thousands) is substantially untenable using conventional methods of additive soft-asset installation, owing to both the time required to write the data content and the complexity of the additive-installation process and its management. For example, the interactions between various software packages that require a user to choose between different versions of the same commonly used files installed by different suites of software leads to software that is broken or intermittently unreliable, depending on the selected software combinations and order of installation.

Furthermore, using additive installation for deep customization provides little or no economies of scale, since choices made during customized prior installations cannot be used in subsequent customized installations.

Some Advantages

In contrast, some embodiments of the present invention, subtractive installation, wherein a storage medium is customized by removal of non-selected content from a superset of available content pre-stored on the storage medium, the removal of content from a storage medium (e.g., by erasing and/or uninstalling) is efficient and fast, requires little human interaction, and lends itself particularly well to automation. By using subtractive installation, substantially all the complexities of additive installation are isolated to a one-time process and relegated to experts at a manufacturer when the experts create a customized local universe of available content, referred to herein as a panoplex. A panoplex is instantiated (i.e., copied) onto multiple end-user storage media, from which different sets of extraneous content can be easily identified (e.g., from the logical NAND of the specific set of selections made by a customer with the panoplex set, in some embodiments) and then automatically culled to provide easy, automatic, and scalable customization of content.

As used herein, culling includes making the relicta data unavailable and freeing storage locations that were used for holding the relicta. In some embodiments, culling includes any suitable method including erasing directory and other entries that point to the data, erasing some or all of locations holding the data, erasing decryption keys needed to decrypt the data, encrypting the data, marking the storage locations as available for storing other data, defragmenting the storage medium, and/or the like.

"Erasing" and "uninstalling" as used herein refer to processes that cause transitions from normal operating-system-mediated data and program availability, to the loss of availability and gain of related storage space. In some embodiments, erasing manipulates the appearance of the data (e.g., by changing a small portion of a directory entry such that the operating system no longer lists that data as being present, thus "erasing" or making the data "disappear"), but the data itself (other than the changed part of the directory entry) is typically not changed. In some cases (unless a more secure operation, such as the fast-secure erase function described below, is performed), the operating system itself or a secondary program may be able to unerase such data, and undo the erase. "Concealing" and "obscuring" as used herein refer to techniques for creating storage holding selectively unavailable data and/or programs.

As used herein, erasing can include writing zeros or other data patterns to some or all of the location(s) of data, thereby displacing and/or overwriting the previous data and making that previous data unreadable and unavailable; performing an erase operation (such as are available on certain types of electrically erasable programmable read-only memory chips) that erases one or more entire blocks of data at once; setting status indicators (such as setting or clearing certain bits in at least one directory entry, and/or resetting one or more directory entries or file-allocation-table entries or cluster pointers to a "blank" state that removes name and/or pointer information and/or indicates the directory entry is available for new data) that are interpreted and enforced by operating-system software as indicating that the storage locations of the data are not readable as data or instructions; and/or other suitable methods. In some embodiments, "erasing" can include creating a directory that does not include directory information needed by an operating system to access certain particular data that is stored on a storage medium but that is intended to be considered as erased (e.g., soft assets that are to be relicta), but wherein the directory does include directory information needed by an operating system to access certain other data that is stored on a storage medium and that is to be considered as available (e.g., soft assets that are to be ipselecta).

As used herein, "uninstalling" means transitioning from a state that includes changes made by installing a program to a state that would have existed had the program not been installed. In some embodiments, uninstalling (which removes registry information—e.g., pointers to directories, library files, and or other information used by the operating system to properly execute a program—and which may or may not remove directory entries or erase other data) is different from erasing (which typically removes directory information and/or sets/clears status indicators in a directory entry but does not typically change the registry). In some embodiments, uninstalling replaces one or more library files associated with the program being uninstalled with corresponding files that existed before the program was originally installed (e.g., files installed by earlier-installed programs).

As used herein, a "new device" is one that has not been used for its intended use by its initial end user or purchaser. A new device may, however, have been used (in a manner that utilizes or simulates utilization of the device for its intended use) by the manufacturer or others in the distribution and sales chain for assembly, loading of data, testing and/or burn-in. In some embodiments, a new storage device might include a used storage device that has been reformatted to a new "blank" state.

As used herein, an information-processing appliance is any type of digital, analog, or hybrid device that processes stored information, including general-purpose computers, special-purpose computers, embedded computers, enterprise computers, servers, cell phones, wireless email processors (e.g., Blackberry™-type devices), telephone switches, electronic-planner devices, GPS and/or trip-planning devices percepters, appliances (such as refrigerators, televisions, washing machines, toasters and the like that include information-processing features), machinery, vehicles, and so on. In some embodiments, the information-processing appliance is a storage medium (e.g., a disk drive or FLASH-type memory) that is designed to be connected to other electronics in order to provide its intended function.

As used herein, the terms processor, microprocessor, controller, computer and the like are circuits that process data or control operation of a device. Each term refers to a device that may contain one or more units that process instructions and/or one or more logic circuits configured to perform one or more functions. In various embodiments, these terms include tightly or loosely coupled multiprocessors as well as networked processors that each performs different portions of one or more overall functions. These terms are to be interpreted in the broadest sense unless specifically narrowed by modifying adjectives (e.g., an "electronic processor" is a processor that operates on electronic principles, while a "processor" is not so confined and may include one or more electrical, optical, magnetic, acoustic, quantum-spin, and/or other components). In some of the various embodiments described herein, the described processor includes one or more electrical, optical, magnetic, acoustic, quantum-spin, and/or other components.

The present invention provides an apparatus and method wherein user-selected content is, in effect, "installed" on a storage medium by copying an installed superset of available content (i.e., many more assets than would ever be selected for purchase by a typical purchaser) to the storage medium and culling non-selected portions of the available content to leave the selected content. This subtractive installation to sideload content is efficient and lends itself particularly well to automation. By using such sideloading, all the complexities of additive installation need be performed only once, thus creating an optimized universe of available content from which extraneous content can be removed easily (manually or automatically), allowing customized selections of content to be conveniently distributed. Sideloading content enables customized, ready-to-use devices.

What seems counterintuitive in the subtractive installation choose-and-remove approach—namely, initially writing extraneous content during manufacturing only to remove it later—produces real and significant benefits not achievable with conventional approaches. With such sideloading of content, an end-user can quickly and conveniently receive a built-to-order (BTO), inexpensively mass-produced device, customized to the user's unique preference and ready-to-use. Furthermore, the selection available on the storage medium from the superset of available content (herein referred to as a panoplex) can be orders of magnitude greater than the choice found in an average retail store, yet adds virtually no additional inventory-carrying cost. For example, a typical retail computer store may only stock an inventory on the order of hundreds of software titles, since the store cannot afford to devote shelf space and financial resources to maintain a large inventory of titles that sell infrequently. On the other hand, a commonly available 300-GB disk drive could hold several thousand titles in a preloaded panoplex, and terabyte drives are forthcoming.

As used herein, a "disk drive" is an exemplary storage medium having one or more rotating disks that store data and one or more transducers that read data from and write data to, the one or more disks (which use magnetic, optical, both magnetic and optical, or other suitable technologies). Disk drives typically include a mechanical frame and enclosure (these are sometimes merged as a single unit), one or more circuit boards and/or flexible substrates having surface-mount components soldered thereto, and disk(s) and transducer(s) inside the enclosure. The circuit-board components typically include one or more processors, buffers, coder/decoders (CODECs), transducer interfaces (handling signals to and from the disk transducers), upstream interfaces (handling signals to and from external components such as personal-computer processors or music-player controllers, and using protocols such as IDE, SCSI, SATA, serial SCSI, and the like) and the like, used to provide the functionality of the disk drive. In various embodiments described herein, the term "disk" will be used for brevity, and from the context, one of skill in the art will recognize that the disk may be the disk itself, removable and exchangeable from the drive described and other drives (such as, for example, a DVDRW disk that can be removably inserted into a DVDRW drive) or may be the disk drive itself, with its disk(s) permanently integrated within the drive (such as, for example, the one or more magnetic disks in a hard-drive unit). For the embodiments that describe either a disk drive or a disk as the storage medium, the inventor contemplates, and one of skill in the art will recognize, that other embodiments can substitute (in place of, or in addition to, the disk or disk drive) any other suitable storage medium, such as a solid-state memory unit (e.g., a FLASH drive) or a storage disk itself (i.e., a removable rotating medium such as a floppy disk, CDRW, DVDRW, and the like), which is designed to be removably inserted into a drive.

For brevity, the description herein may describe duplicating or copying a disk drive, and from the context, one of skill in the art will recognize that it is some or all of the data on the disk that is being duplicated or copied. Further, during such a copy, in some embodiments, the data is rearranged and/or compressed (e.g., in some embodiments, by doing file copying through the operating system, which may place a file onto the destination disk drive in a different location than that file was on the source disk drive), while in other embodiments, the data is copied "bit-by-bit" to form a exact duplicate disk drive with exactly the same panoplex data, partition information, directory information and the like in identical locations on the destination disk drive as it was on the source disk drive. Disk-drive-data replicaters are well known in the art, and may be obtained, for example, from ICS (9350 Eton Ave., Chatsworth, Calif. 91311), which makes an Industrial High-Speed Multiple-Hard-Drive Duplicator used for hard-drive cloning, copying data, upgrading computers and sanitizing hard drives on the production line of major PC Manufacturers, as well as other large- and middle-size corporations. Such equipment provides ease of use for multiple-hard-drive duplication in an industrial environment. It can copy data in different modes, image hard drives of different size and models, erase data, copy hidden partitions, format hard drive, use an SATA adapter to copy Serial ATA Drives and has additional different optional software and hardware features for disk-drive cloning.

Another benefit is that erasing content from a storage medium such as a disk, in general, is significantly faster than writing the same content to the same storage medium. Thus, if the transfer to storage of the superset of available content is performed ahead of time, customization by culling of the storage medium (in order to store primarily only the selected content) can be accomplished relatively quickly and with relatively little additional data transfer. This combination of speed and the ability to prepare panoplex copies out-of-sequence relative to the rest of the manufacturing process is a significant factor for relieving throughput bottlenecks when using sideloading to manufacture BTO devices.

Another benefit is that writing content to a storage medium frequently requires much human guidance, while erasing of content from the storage medium typically does not. Thus, erasure lends itself to automation much more so than does writing. Writing of content to a storage medium typically requires selection as to where, within a file system implemented on the storage device, the content is to be stored. If the content is a computer program or other content requiring some configuration, additional information is usually required. Erasure of content typically requires no more than accurate identification of the content to be erased. Since only the exact assets requested remain after gryphing, no storage space is wasted (no space is consumed by content initially on the storage medium but not requested or usable by the end-user). In some embodiments, erasure of various assets can also be accomplished by simultaneously launching multiple erase threads.

Yet another benefit is the higher overall system quality achieved from the greater operational stability of content that remains as installed after removal of the culled content. In storing the panoplex on the storage medium, the creator of the panoplex has the opportunity to control the computer environment and the order of installation, and optimize the various elements of content for interoperability. One form of optimization is in the exclusion from the panoplex of soft assets likely to interfere with proper functioning of the other soft assets of the panoplex. Another form of optimization is to offer programs constructed using side-by-side isolation technologies. Other forms of optimization include ensuring proper installation, registration, and unregistration of shared resources.

Another Problem

A user inexperienced in software installation can introduce system instability by installing a new program that is not entirely compatible with those already installed on the computer. For example, if the user is installing a program that includes a DLL file that is older than another version of the same DLL file already installed by a previously added program, the user must choose between overwriting the newer DLL and risk impairing the operation of the previously added program, or keeping the newer DLL and risk impairing the program now being installed. However, if the various programs in a panoplex are properly characterized by experts who make astute choices for installation, organization, interoperability and compatibility of the entire set of software, and test the removal process, then the various subsets will be compatible. When programs are removed from the tested set of programs that has been predetermined to be compatible and not to cause catastrophic failure when any particular program is removed from the system, the remaining software is unlikely to become unstable. Thus, the practice of sideloading can put an end to DLL Hell.

More Advantages

One synergy that the present invention provides is the ability to provide fine-grained customization of mass-produced computer equipment, including BTO devices, whereby a storage medium, used in conjunction with a device, becomes the vehicle for distributing content appropriate for that device. The panoplex, once created and optimized, may be replicated many times (and potentially in many locations) to produce an inventory of computer storage media "blanks"—blank, in the lithic-reduction sense, the same way a large block of marble is a "blank" statue until the extraneous marble is removed. In various embodiments, a panoplex can be designed by one or more various parties, including industry specialists, disk jockeys, movie critics, chefs, corporate IT departments, school administrators, and software reviewers, on behalf of equipment manufacturers.

This potentially extensive virtual inventory takes up no additional room or cost, over and above the otherwise required storage media. Likewise, the inventory never goes stale, as it can be recycled at negligible cost simply by overwriting it with a new panoplex. Upon receipt of an order for a computer with customized software installed, extraneous, non-selected soft assets are removed from a replicant blank of the panoplex to produce the customized memory—disk, flash, optical or other—for installation into a device, quickly and in a manner amenable to automation.

Furthermore, due to the efficiencies and automation enabled by the dispensing system described herein, the removal of the extraneous soft assets to form the customized memory can be performed in any of a variety of manners and sequences to effect dispensing of customized content to the customer, depending on the embodiment. In various embodiments, the content removal can be performed before, after, or concurrently with assembly of the hardware into which the customized disk is to be installed. In various embodiments, the content removal can be performed by a variety of entities, including the original equipment manufacturer (OEM) of the hardware and their contractors, by a value-added reseller, by an enterprise IT (information technology) organization, by a retailer, or by the customer. In some embodiments, content removal may be done by a separate computer. In some embodiments, culling is done by the device into which the storage medium is installed. Content removal may be controlled locally or remotely via a network, depending on the embodiment. Likewise, copies of a panoplex can be alternatively manufactured by various parties in the supply chain prior to content removal.

Removal of the non-selected content from a panoplex within a storage medium enables dispensing the selected soft assets from the panoplex by the same methods and apparatus by which the storage medium itself is dispensed—e.g., as an integral part of a device or system sold through hardware sales and delivery channels, or as a part sold through hardware sales and delivery channels for direct inclusion in an appropriate device or system, as with an upgrade to a new operating system. In effect, the software hitchhikes for much of the distribution channel along with the hardware being distributed.

Benefits to Energy Conservation

Widespread adoption of sideloading provides significant, cumulative environmental advantages through extensive resource and energy conservation. By reducing the use of "shrink-wrap" packaged software, fewer trees are needed to make packaging, less oil feedstock and processing energy consumed to produce polycarbonate CD-Rom and DVD disks and their associated transparent, polystyrene "jewel box" containers or the opaque polypropylene DVD-style cases, and less solid waste will bloat U.S. landfills.

Additionally, as time is saved by not having to run multiple, time-consuming individual installation programs each year, thousands of expensive megawatt hours (MWH) of electrical power will be conserved. This reduction in energy usage lowers national fossil fuel consumption and reduces greenhouse gasses and particulate emissions having deleterious environmental and health impacts.

Mass Customization

Traditionally, custom products and low cost are mutually exclusive. While mass production provides identical products at low cost, uniquely individual products require craftsmen and specialists whose costly skills generally make such products affordable only to the wealthy. Today, technology, like the Internet, provides customers direct interaction with a company to specify their unique requirements for goods and services. Properly modularized designs with appropriate flexible, computer-assisted manufacturing systems can achieve the low unit costs of mass production processes with the flexibility of individual customization. Subtractive installation is a perfect platform for mass-customizing devices. It provides an economical lot size of one; i.e., meeting an individual customer's specific personal needs with mass-production efficiency and premium, valuable, and varied choices.

Using subtractive installation to manufacture products tailored to individually specified needs provides manufacturers with a number of important advantages. Manufacturers can broaden markets and deepen customer relationships. Manufacturers can differentiate their mass customized digital appliances from competitor's low margin, commodity-type computer devices. Manufacturers can reap higher profits by making comparison shopping more difficult and shifting customer attention from price to benefits. A manufacturer can provide exceptional value for money achieved through economies of scale while charging a premium margin. This pricing flexibility can balance and achieve higher sales, net income, and unit growth targets.

This inexpensive means of distributing mass customized selections of soft assets is a particularly timely benefit for personal computer manufacturers. Many types of popular consumer electronics devices are routinely sold below cost. Products exhibiting such market behavior include game consoles, cell phones, pagers, cable TV boxes, and printers that are subsidized by games sales, network usage, or ink and other consumables. As PC manufacturers have not been able to sell subsidized hardware, their computers appear relatively expensive to printers and subsidized consumer electronics. However, extensive sideloading allows the potential of raising average unit pricing and use software and upgrade margins to subsidize hardware sales.

Any time devoted to unnecessarily uploading or downloading soft assets into a new device is a waste of energy and time. Hardware is useless without software. Software is useless without hardware. Hardware needs both a storage medium and software loaded onto that storage medium in order to be useful. Therefore, making the storage medium the functional delivery package for dispensing content to the eventual user and sideloading the software into the user's device is a highly overdue and welcome development.

An Example of Practical Benefit

Marketing channels that benefit from the present invention include, for example, direct-to-customer Internet sales BTO OEMs. An order to a personal-computer vendor (e.g., Dell), for a desktop computer having a 120-GB disk drive, includes the option to choose assets from a panoplex installed thereon.

Rather than the limited choices previously available, the present invention provides a vast selection of possible software, games, and/or music preinstalled and operable when the computer is delivered. In some embodiments, a separate assembly line parallel to the hardware assembly line is provided at the vendor for gryphing disk drives plugged into a controller alone (i.e., without the final device hardware, for gryphing according to each purchaser's order) and the gryphed disk drive for a particular customer is later inserted into a personal computer as it is assembled. In some embodiments, the gryphing is accomplished during the hardware test and burn-in cycle. In some embodiments, the choices for various soft assets from a particular user are analyzed to determine which panoplex of a plurality of possible pre-built panoplexes best matches the user's choices, and a disk drive having that selected panoplex is gryphed for that particular user and delivered in a finished ready-to-use device.

In some embodiments, various panoplexes are provided for different customer segments (e.g., small business/home office, hobbyists, gamers, music-lovers, dry cleaners, engineers, architects, and the like). In some embodiments, different pricing formulae are tied to different customer segments, different time periods, different offerings available from competitors, the overall state of the national economy, and/or different corporate internal financial requirements. In some embodiments, customer-unique customization is also performed, such as inserting (to the proper locations in storage) the end user's name, address, time zone, company and department name, and/or the like. In some embodiments, the computer is ready to run as soon as it is unloaded from the shipping box. In other embodiments, some or all of the gryphing process is automatically run in the customer's home or place of business when the computer is first plugged in, with little or no input required from the customer, such that when this gryphing process completes, the computer is ready to run.

An exemplary but hypothetical scenario of some embodiments is as follows: Bill is tired of figuring out his income taxes by hand. He has a computer he can use at work, but does not want to bring into the office his sensitive financial files. He browses the Dell web site and sees that they sell TurboTax for $15. He is happy because it costs twice that at the Intuit web site and the best price he could find on Froogle was five dollars more. He decides he only needs a simple office suite, so he picks StarOffice 11 Office Suite for $20, figuring a $300 savings over Microsoft Office. He realizes that he would like to research his family's history. Dell offers a choice of thirteen products. After reading the accompanying reviews, he chooses Legacy, the cheapest at $15. Feeling good, he splurges and buys a $200 copy of Adobe Illustrator ($500 list) for his artistic daughter to use. He has the software preloaded onto a Dell Dimension 2900 priced at $500 with free 15" flat panel monitor, free inkjet printer, and free two-day shipping. Were Bill an avid music buff, he can order an additional entire drive containing the music he enjoys most. As he reviews his order, he realizes that his savings on software paid for the entire computer plus he got free à la carte software integration. Bill does not have to spend hours erasing undesired trial software. Dell is happy because offering the software drove a $750 sale, added a half to the selling price and doubled their profit margin, while boosting their customer experience. Dell is also able to market appropriate software upgrades to Bill. Should Bill damage his computer, depending on Bill's service contract, Dell will gryph the same panoplex and duplicate the machine and software configuration in Bill's original purchase. In some embodiments, a gryphed storage medium is delivered for Bill to swap into his machine. In other embodiments, the machine or device with the gryphed storage medium is delivered to Bill. In some embodiments, these forms of unique re-creation of the customized storage medium or device can substitute for drive space that otherwise may be needed to maintain backup data on a disk hidden "recovery" partition.

Sideloading

FIG. 1A is a block diagram of a sideloading process 189 for dispensing soft assets into a personal computer 104 or similar information-processing device, for example, a new device being purchased by its initial user. Conventional methods for dispensing soft assets into a personal computer 104 occasionally include downloading 192 of soft assets from a network 191. For example, network 191 could be a manufacturer's internal network used to preload soft assets into a device being assembled. Further, software and music are commonly available for purchase (or even for free, in some cases) and immediate download from the internet 191 via a process of "downloading." Further, some assets are available as downloads from proprietary wireless networks 191, such as those operated by cell-phone carriers.

Conventional methods also include uploading, media-installing 194 of soft assets from physical media 193 (e.g., CDROM, diskette, FLASH memory, and the like), sometimes also requiring substantial amounts of manual input 196 from a user via an interactive input device 195 (such as a manual keyboard). It takes a considerable amount of the user's time and mental energy (the drain on the user from the concentration needed to perform the various unfamiliar tasks, as well as the boredom from waiting for the process to complete), as well as power from the electrical grid needed to download and install a large selection of soft assets from the internet 191, or to install soft assets from media 193 and/or manual input device 195.

In contrast, one aspect of sideloading process 189 of the present invention provides sideloading 198 of soft assets, wherein a large chosen set (an "ipselecta") of soft assets are in effect loaded en masse onto a storage medium 150 that is operatively coupled to computer 104, either before or after the ipselecta are in effect loaded onto the storage medium. For example, in some embodiments, storage medium 150 includes a disk drive and/or FLASH card or chip (e.g., a SanDisk®, TransFlash® or microSD® card) or any other suitable storage medium that is preloaded (for example, as described below for FIG. 2A or FIG. 2B below), then plugged into an appropriate slot or cradle and connected by appropriate signal and power cabling to other hardware in computer 104, resulting in an operational, ready-to-use device (computer 104), also known as "awesome out-of-the-box."

Sideloading 198 saves a considerable amount of time (thus increasing manufacturing throughput and/or reducing the time spent by the user waiting for his or her purchase to become usable) and electrical energy for the manufacturer and/or end-user by avoiding much or all of the downloading, manual, and/or media installing of soft assets. In some embodiments, however, the sideloading of the present invention is supplemented also by downloading and/or manually installing and/or media installing soft assets that were not in the ipselecta.

Figure 1B:
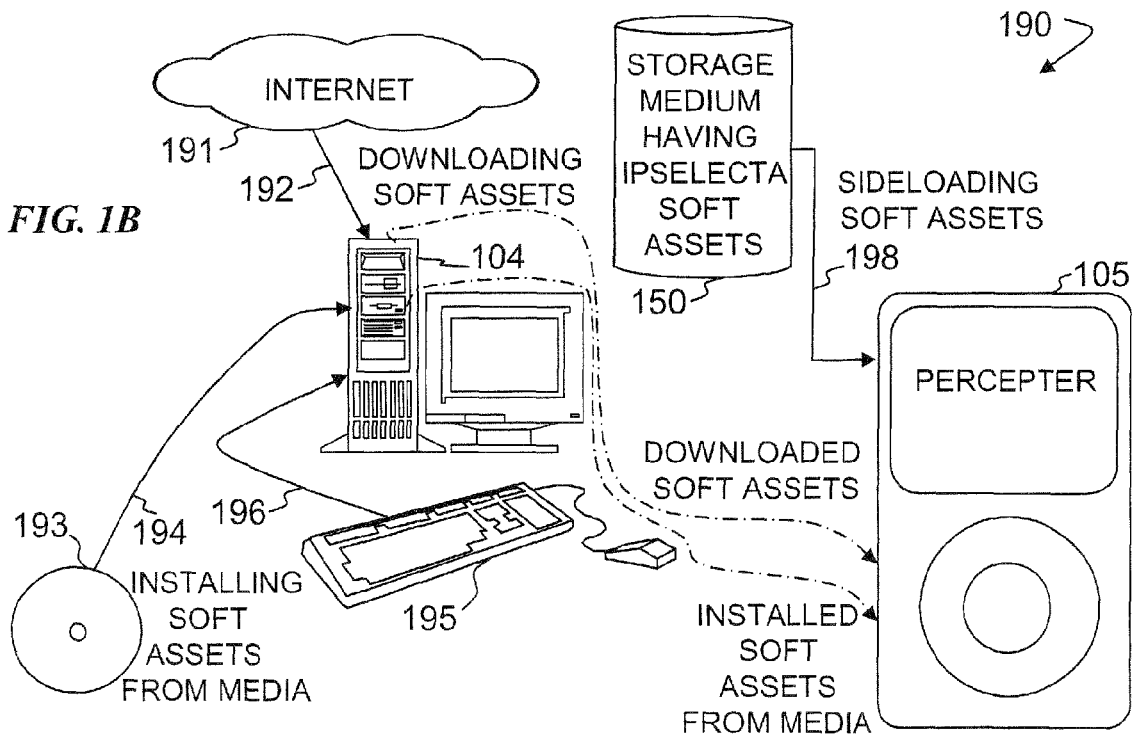
FIG. 1B is a block diagram of a sideloading process 190 for dispensing soft assets into a percepter or similar device.

FIG. 1B is a block diagram of a sideloading process 190 for dispensing soft assets into a "percepter" 105 or similar device. Percepters are devices that process percepta, including but not limited to MP3 players, multi-function cell phones, video players and the like, and thus receive and output sensory stimulation to a user's senses (i.e., sight and sound, as well as touch, smell, temperature, and the like). Process 190 is similar to process 189 of FIG. 1A, except that often an intermediate device such as computer 104 is typically required as a download intermediary between network 191 and percepter 105 for downloaded "percepta" (such as songs or other audio and/or video files) or other soft assets. An intermediate device such as computer 104 is also frequently required as a media-install intermediary between physical media 193 and percepter 105 for manually installed soft assets (such as songs that are read from a music CD, compressed (or "ripped"), and loaded into an MP3 player).

In contrast, one aspect of sideloading process 190 of the present invention provides direct sideloading 198 of soft assets, wherein a preloaded storage medium 150 is operatively coupled to percepter 105, either before or after the ipselecta are chosen and made available. For example, in some embodiments, storage medium 150 is preloaded (for example, as described below for FIG. 2A or FIG. 2B), then plugged into an appropriate slot and connected by appropriate signal and power cabling to other hardware in percepter 105 (which is, in some embodiments for example, a cell phone and/or music player), again resulting in an operational, ready-to-use device. In some embodiments, the sideloading into a percepter 105 is supplemented by also downloading and/or manually installing soft assets that were not in the ipselecta.

Dispensing Assets Via Subtractive Installation

FIG. 1C is a flow diagram of a process 130 for dispensing soft assets into a storage medium 150. In some embodiments, some or all of process 130 is called a subtractive installation process or method. In some embodiments, process 130 includes obtaining one or more compliance definitions 131 (that define the standards, interfaces, and other requirements to make software or other soft assets compatible with process 130) by independent software vendor (ISV) 132. ISV 132 produces a set of soft assets 133 (including, e.g., software programs, data, and percepta content) that is compatible due to ISV conforming to the compliance definitions 131 during the process of producing soft assets 133. In some embodiments, a panoplex-creation program or process 134 aggregates a plurality of soft assets 133 from one or more ISVs 132 and installs the soft assets to create a panoplex master 135. Replication process 136 obtains a plurality of blank storage media 235, and onto each stores a copy of panoplex 211 from the panoplex master to create intermediate workpiece storage medium 230. A purchaser or user 99 indicates to gryphing process 140 her or his choice of soft assets that are to be retained (the ipselecta 255), and gryphing process 140 performs a selective uninstall to customize the storage medium 230 and thus create storage medium 150 having the customized and/or user-selected set 255 of soft assets.

FIG. 1D is a flow diagram of subtractive installation using a gryphing process 152 for processing a first storage medium having a prewritten plurality of installed soft assets. In some embodiments, the gryphing process 152 includes OBTAINING SELECTION DATA 153, and AUTOMATICALLY MODIFYING THE FIRST STORAGE MEDIUM 154 based on the selection data such that, in place of those assets not relevant to the selected assets, erased space becomes available for storage of other data, and selected assets are available as installed. In some embodiments, the installed assets are unavailable to the end user of the device that ultimately uses the storage medium unless and until the modifying operation is run (in contrast to a conventional system that might allow a user to delete multiple files after selecting those files, in which case those files would have been available to the user before the delete operation, and would have remained available if the delete operation were not to be performed).

The terms "selection data" or "selection information" in association with the gryphing process and apparatus refer to any information that can be used to distinguish "ipselecta" (i.e., a first subset of the plurality of installed soft assets that are to be retained, also called "selected assets") from "relicta" (i.e., a second subset of the plurality of installed soft assets that are not to be retained, also called "non-selected assets"). As such, in some embodiments, the selection data can list or otherwise identify the selected assets that would be kept and made available to the user, while substantially all other assets would be implied to be non-selected assets to be culled, erased, uninstalled, made unavailable, and/or otherwise removed. In other embodiments, the selection data can list or otherwise identify the non-selected assets, and substantially all those assets would be assets to be culled, erased, uninstalled, made unavailable, and/or otherwise removed, while all other assets would be implied to be selected assets to be kept and made available to the user. The selection data can include names of assets, coded data associated with assets (e.g., product identifiers (such as universal product codes), serial numbers, indices, tables, databases, or the like), addresses where the assets are located, or any other suitable information usable to identify assets to be kept, assets to be culled, or both assets to be kept and assets to be culled. In certain circumstances, the selection data may be inferred, such as when a component (such as a spell checking program) may be shared, and only when all the possible using programs of that component (such as word processors, spreadsheet programs, and databases) are non-selected, then the shared component would then be a non-selected asset.

In some embodiments, the unavailability is accomplished by software encrypting, directory unavailability or obscuring, file-allocation-table-linked-list reordering, or other techniques. In such embodiments, the assets on the storage media would not be readily available to a user who obtained possession of a storage medium having a panoplex, even before gryphing is performed, in order to prevent unauthorized release of the assets to the public. Some operation performed in conjunction with the culling operation of the gryphing (such as creation of a working directory structure, decrypting of the soft assets, or other data manipulation operation) is required before one or more of the assets became available. These protections for the panoplex are termed data security.

In other embodiments, the storage media are kept in locked or physically secure locations or vehicles (also called supply-chain quarantine), wherein the corporations and/or other entities having possession of the storage media that hold panoplexes are not released to a user until gryphing of the assets is performed. These protections for the panoplex are termed physical security.

In still other embodiments, a residue of the panoplex and the gryphing operation(s) performed on it are left on the storage medium (e.g., a permanent serial number or other code(s) associated with such data, or one or more hidden sectors or other indicia of which panoplex was once stored, and/or which assets were culled or made available), in order to provide evidence of unauthorized reconstruction or use of assets that were not selected and/or paid for, to allow for legal prosecution of perpetrators of such unauthorized reconstruction or use. In some embodiments, legal contracts (such as click licenses) supplement such information. These protections for the panoplex are termed forensic security. In some embodiments, data security, physical security and/or forensic security are provided in the storage medium, the end-user device with which it is intended to operate, and/or its supply chain.

FIG. 1E is a flow diagram of a network-activated gryphing process 155 for processing a first storage medium having a prewritten plurality of installed soft assets. In some embodiments, the network-activated gryphing process 155 includes obtaining 153 selection data, sending 157 gryphing commands and selection data across a network (parts of which, in some embodiments, are wireless) to a gryphing program and automatically gryphing 158 the first storage medium 154 based on the selection data such that, in place of those assets not relevant to the selected assets, erased space becomes available for storage of other data, and selected assets are available as installed.

In some embodiments, a dispensing computer (see, e.g., dispensing computer 102 in FIG. 4A or FIG. 4D) is called or includes a grypher or gryphing device. In some embodiments, the present invention provides an apparatus having a grypher that includes that dispenses a customized set of soft assets chosen for installation to a device of a particular user) is coupled to a network. In some embodiments, the dispensing of soft assets includes gryphing of a panoplex, which is controlled across the network. In various embodiments, the network is any suitable network, such as a LAN (local-area network), SAN (storage-area network), or WAN (wide-area network) including the Internet, for example. Some or all of such a network may be wireless, as with a cellular phone, Wi-Fi, Wi-Max network, or the like, and is accessed from the dispensing computer using network-access circuitry (see, e.g., network-access circuitry 409 in FIG. 4D) that sends and receives data through such a network. In some embodiments, the network-access circuitry includes Ethernet circuitry and controls the gryphing process across a wired network across a local-area network; while in other embodiments, the local network is also attached via a suitable router or modem to a wide-area network such as the Internet. In some such embodiments, the purchaser effectively connects the newly purchased or ungryphed device to an internet connection and the gryphing process is controlled from a remote or centralized computer facility while the new device is in the user's possession.

For example, in some embodiments, a purchaser connects a new personal computer (e.g., purchased from a vendor such as Acer) to an internet connection at the purchaser's home or place of business, and gryphing occurs in the personal computer in the purchaser's home or business. In other embodiments, the network-access circuitry includes wireless connectivity. As another example, in some embodiments, a purchaser connects a new cellular telephone, optionally including a MP3 music player (e.g., purchased from a vendor such as Sprint) to a cellular network (e.g., by making a telephone call to a particular special telephone number) from anywhere (e.g., a local coffee shop), and gryphing occurs there. As yet another example, in some embodiments, a purchaser connects a new laptop, optionally including a Wi-Fi connection (e.g., purchased from a vendor such as HP) to a Wi-Fi network from a Wi-Fi hotspot (e.g., a local internet-café or airport), and gryphing occurs there. Thus, in some embodiments, control of culling the extraneous content is exercised across a network. In some embodiments, at least a portion of the network is wireless.

Figure 2B:
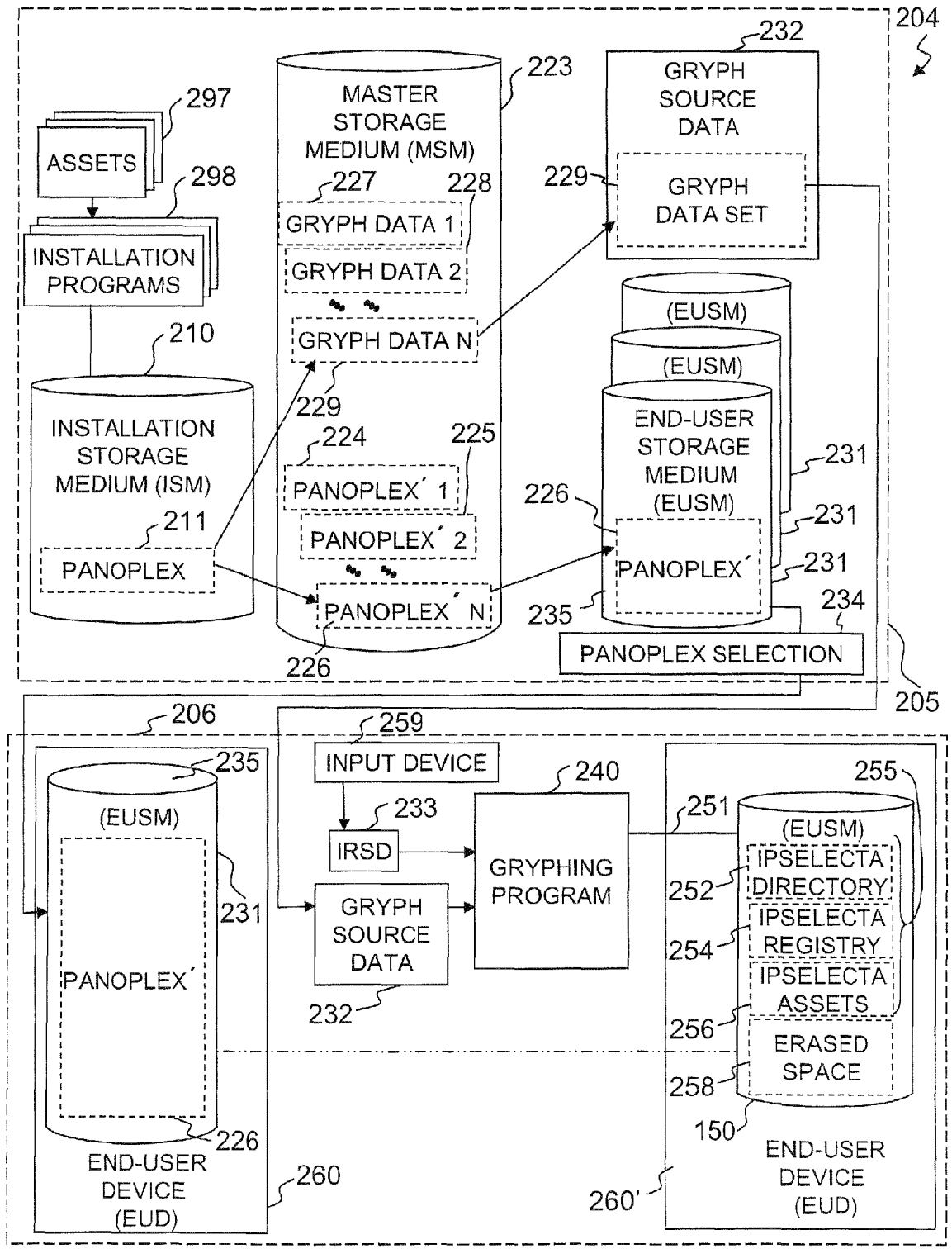
FIG. 2B is a block diagram of another panoplex-generation and panoplex-gryphing process 204 for creating a storage medium 150 having a customized and/or user-selected set of soft assets.

FIG. 2A is a block diagram of a process 200 for creating a storage medium 150 having a customized and/or user-selected set of soft assets 255. In some embodiments, storage medium 150, once completed, is sideloadable according to the descriptions for FIG. 1A and FIG. 1B above. In some embodiments, process 200 includes a panoplex-generation process 201 and panoplex-gryphing process 202. In some embodiments, a plurality of soft assets 297 is installed into an installation storage medium (ISM) 210 using one or more installation programs 298. In some embodiments, this operation is performed with ISM 210 coupled to and controlled by a device that is similar to the final device 260 (see FIG. 2B). The result of installations is a panoplex 211 stored on ISM 210. In some embodiments, ISM 210 is an initially blank, formatted storage medium onto which a plurality of soft assets (e.g., software programs or MP3 songs) is installed using one or more installation programs 298. In some embodiments, panoplex 211 is then copied to a master storage medium (MSM) 220 (for example, a large-capacity disk drive having one or more other panoplexes (e.g., panoplex 221 and panoplex 222) stored thereon. In some embodiments, ISM 210 is then reformatted and again used to create a different panoplex having a different set of soft assets.

In some embodiments, an inventory of at least one blank end-user storage medium 235 is converted to intermediate workpiece 230 by copying into it the data for panoplex 211 (e.g., the software portion) from MSM 220. For example, blank end-user storage medium 235 is, in some embodiments, a disk drive or FLASH card that is part of the complete hardware 260 for the final user device (i.e., it is a complete hardware combination 260 with an embedded blank storage medium as described in FIG. 2B). In other embodiments, it later becomes part of the complete hardware 260 (i.e., it is a stand-alone storage medium 235 (hardware) that is to be first loaded with panoplex 211 (software) and is then later connected to the rest of the device hardware). Individual ones of the inventory of intermediate workpieces 230 are supplied, as needed, to panoplex-gryphing process 202. That is, a blank end-user storage medium 235 becomes, by copying a panoplex 211 onto it, an intermediate workpiece 230, and this becomes, after gryphing to remove relicta data, gryphed storage medium 150.

In some embodiments, panoplex-gryphing process 202 includes obtaining a set of gryph source data 232 from the panoplex 211 on an intermediate workpiece 230, obtaining ipselecta-relicta selection data (IRSD) 233 that indicates the selections of soft assets of a particular user, and gryphing the panoplex 211 by using gryphing program 240 to achieve subtractive installation. The subtractive installation accomplished by gryphing program 240 culls the relicta (the soft assets that are to be removed), leaving erased space 258 in the place of the culled soft assets, and retaining the ipselecta 255 (the soft assets selected to be retained) to obtain a gryphed storage medium 150. In some embodiments, for example, the gryph source data 232 includes the data for the directory and the registry, and the gryphing program removes the directory entries and the registry entries for the relicta, and then writes the resulting directory and registry to their respective locations (i.e., the locations on the storage medium where the operating-system software expects to find this data) on intermediate workpiece (storage medium) 230, thus forming the gryphed storage medium 150. That is, a blank end-user storage medium 235 becomes, by copying a panoplex 211 onto it, an intermediate workpiece 230, and this becomes, after gryphing to remove relicta data, gryphed storage medium 150.

Microsoft Windows Installer (aka MSI)

Microsoft Windows Installer software technology (referred to as MSI) is used by modern Microsoft operating systems to install and uninstall applications, and generally manage the installed state of applications. Because MSI provides APIs to enumerate the resources and assets in setup files (MSI files) and enumerate the applications on the system, it is especially useful in management and creation of the panoplex. The resources in MSI files can be compared against resources in other MSI files and on a computer to ensure that they do not conflict with each other if these MSI files were to be used to install their respective applications. An example of some of these are the conflicts are checked for in the scripts in section [284] and similar code can be used to confirm that no two MSI files install services with the same name, as another example of a potential conflict of resources in an MSI file that is to be avoided.

MSI can uninstall products without user interaction, and this fits well with the idea of populating a computer with a collection of soft assets or software products using an MSI installation that may require a user interface, and later removing unwanted products by uninstalling using a method faster than the installation process and without any user interaction. Products are identified to MSI by Globally Unique Identifiers (Guids), and these are unique for every product because the implicit definition of a Guid is that it is unique. A computer that is populated with products installed with MSI technology can be queried for all those product Guids, with the query returning a list of these Guids. The products that are required to remain on the computer (for example because the customer has purchased them) are among these products identified by the returned Guids. When a user looks at a list of product names and chooses which ones are to be retained on the computer, a list of Guids is effectively being chosen. (In some embodiments, a table lookup or other suitable mechanism is used to convert between the list of Guids returned by the query and the list or display of product names presented to the user for selection of the user's desired soft assets to keep, and a corresponding reverse lookup is used to generate the list of Guids to be removed or the list of Guids to be kept.) In some embodiments, the computer can be put into its ipselecta state of installed products with the following pseudocode algorithm:

---

Array ProductsToKeep is defined as a list of the Guids corresponding to products that the customer wishes
 to retain i.e., the ipselecta
Array ComputerProducts is a list of the Guids corresponding to all the products in the panoplex -continued for each productGuid in ComputerProducts {
 if productGuid is not in the list of ProductsToKeep then Uninstall productGuid }

---

In Microsoft Windows, the MsiEnumProducts API enumerates the list of product Guids installed on the computer. To uninstall a product, the MsiConfigureProduct API is called passing the Guid and specifying the resultant state to be absent. In some embodiments, using a properly written product setup, an MSI setup uninstalling a product will leave no evident traces on the system, no files and no registry entries. Residue remains only as "dirty" sectors holding data of the erased assets.

In some embodiments, the following is sample code for reading the installed programs (without needing a manifest) and list-driven uninstalling. This is provided for illustrative purposes and can be used by someone of skill in the art to show how to design a gryphing routine for a Windows-based computer.

The first program code shows that you do not, in every embodiment, really need the .ppx manifest to determine what programs are installed. The second code shows a method for bulk uninstall of the relicta. The text preceded by a single quote is comment text for the code.

'The following first code (listallproducts) creates a text file listing of the products on the system that were installed with Windows Installer. It writes the identifying Guid and name to the file. This just illustrates how to produce a list of the Guids. This Visual Basic-type script, when run, generates as its output, a file called prods.txt. In some embodiments, from a display (e.g., a nicely formatted video display of product names, descriptions, graphics, popularity reviews, and/or prices that is generated based on Guids in the prods.txt file, optionally including, e.g., selection mechanisms such as buttons usable by the user to choose among the soft assets), the user can choose which soft assets to retain and/or which to remove.

---

```
Option Explicit
Public installer, fullmsg, comp, prod, a, fso, pname, ploc
Set fso = CreateObject("Scripting.FileSystemObject")
Set a = fso.CreateTextFile("prods.txt", True)
'       Connect to Windows Installer object
Set installer = CreateObject("WindowsInstaller.Installer")
on error resume next
For Each prod In installer.products
        pname = installer.productinfo (prod, "InstalledProductName")
        ploc = installer.productinfo (prod, "InstallLocation")
        a.writeline (prod & "   " & pname)
Next
```

---

'The following second code is the script that uninstalls the list of products in a file called test.txt that has the same layout as the file prods.txt produced by the listallproducts script above. This script should not be run on a typical personal computer (i.e., one not set up for gryphing), since it will uninstall all listed files, in some embodiments. If one were to run this script and test.txt equaled prods.txt, it would uninstall everything listed in that file. Rather, soft assets selected to retain are removed from prods.txt to create test.txt. The functional part is the Installer.ConfigureProduct call. That is what does the uninstall, and the preceding line that sets UILevel can be tailored to show as much or as little user interface as required.

```
Option Explicit
Public installer, fso, a, stream, prod
Set fso = CreateObject("Scripting.FileSystemObject")
Set a = fso.GetFile("test.txt")
set stream = a.OpenAsTextStream (1)
' Connect to Windows Installer object
Set installer = CreateObject("WindowsInstaller.Installer")
do While Not stream.AtEndOfStream
    prod = stream.ReadLine( )
    prod = left (prod, 38)
    installer.uilevel = 3
    installer.ConfigureProduct prod, 0, 2
loop
```

In some embodiments, the culling includes a "fast secure erase" that clears or obscures the directory entry (e.g., zeroing or overwriting the directory-entry information with other data that makes it difficult to identify the name, identity, and/or location of the asset that was erased, and/or zeros or reorders the order of sectors of a file (e.g., in a file-allocation table or NTFS data structure), in order to make much more difficult any attempt to access or reconstruct the data that makes up the asset. See FIG. 16, below.

In some embodiments, the ipselecta-relicta selection data 233 is data that is interactively elicited and received from the end user (e.g., the purchaser of the final device). In some embodiments, the IRSD 233 specifies each soft asset in the panoplex and whether that respective asset is to be kept or culled. In other embodiments, the IRSD 233 specifies only the soft assets in the relicta, wherein the non-specified assets are retained as selected assets by default. In some embodiments, the IRSD specifies the particular order in which the relicta are to be uninstalled.

In some embodiments, IRSD 233 specifies which soft assets in the panoplex are to be kept (i.e., specifying the ipselecta), implicitly specifying that the relicta are all other soft assets on the panoplex (i.e., in these cases, IRSD 233 specifies only the soft assets in the ipselecta, wherein the non-specified assets are culled as non-selected assets by default). In some embodiments, the gryphing program 240 or a table that it uses specifies the particular order in which the relicta are to be uninstalled.

In still other embodiments, the IRSD specifies some or all of the selected assets and some or all of the non-selected assets, and the other assets are implied to be selected assets to be kept or non-selected assets to be culled. For example, in some embodiments, the monetary amount of a purchaser's order could imply certain assets (e.g., bonus assets) would be provided for free, while those assets would otherwise need to be separately selected and paid for. In other embodiments, a user could specify a price limit (e.g., "sell me all songs that are available for $0.99 or less each," or "give me all free songs that will fit on the storage medium but still leave me 200 GB of erased, empty or available space").

In some embodiments, IRSD 233 specifies to financial invoice/charging program 241 which soft assets in the panoplex are to be charged for, and financial invoice/charging program 241 charges (in some embodiments, based on pricing rules 244) for the selected content by either generating an invoice for, or deducting from an account (e.g., the account of the purchaser of this set of assets), an amount based, at least in part, on which soft assets are retained in the ipselecta 255. As used herein, "charging" includes any mechanism or facility to transfer, obtain, or ask for payment from a purchaser; "invoicing" includes any mechanism or facility to ask for payment or create a debt, such as, for example, creating an invoice that is mailed or electronically transmitted to a purchaser and that requests or demands future payment or otherwise debits a credit-card account; and "deducting" includes any mechanism or facility for transferring money at substantially the present time from a purchaser's account to an account for the benefit of the seller.

In some embodiments, each intermediate workpiece 230 includes, as part of panoplex 211, sufficient gryph source data 232 (e.g., directory and registry data) to provide the information needed by gryphing program 240 to cull the undesired/unselected relicta portion of panoplex 211, under control of the IRSD 233. In some embodiments, each intermediate workpiece 230 includes the program code of gryphing program 240, such that alone or with the assistance of external operating-system code, the gryphing can be accomplished (either in the final device 260, or by a dedicated gryphing system).

FIG. 2B is a block diagram of another panoplex-generation and panoplex-gryphing process 204 for creating a storage medium 150 having a customized and/or user-selected set of soft assets 255. In some embodiments, process 204 includes a panoplex-generation process 205 and panoplex-gryphing process 206. As described above for process 201, in some embodiments, a plurality of soft assets 297 is installed into an installation storage medium (ISM) 210 using one or more installation programs 298. In some embodiments, panoplex 211 is then copied in two parts (panoplex' 226 (the panoplex less a certain amount of gryph data) and gryph data set 229) to a master storage medium (MSM) 223. In some embodiments, MSM 223 has one or more other panoplexes (e.g., panoplex' 224 and panoplex' 225) and corresponding gryph data sets (e.g., gryph data set 227 and gryph data set 228) stored thereon. By separating the gryphing data 229, the panoplex' 226 becomes more secure against theft of the soft assets therein. In some embodiments, an inventory of one or more intermediate workpieces 231 (which are each, e.g., a hardware/software combination) is created by copying the data for panoplex' 226 (e.g., the software portion) from MSM 223 to a corresponding number of blank end-user storage media 235 (the hardware portion, e.g., a disk drive or FLASH card). An individual one of the inventory of intermediate workpieces 231 is supplied, as needed, to panoplex-gryphing process 206. Separately, the gryph data set 229 is transmitted, transported, and/or supplied as gryph source data 232 that is input to gryphing program 240.

In some embodiments, panoplex-gryphing process 206 includes obtaining a set of gryph source data 232 from the gryph data set 229, using a user interface and/or input device 259 to present choices and/or prices to a purchaser and elicit responses and receive selections (and, in some embodiments, receiving a credit-card number, bank information for a virtual check (an internet-carried order directing a bank to pay money as instructed), or other information regarding the financial transaction corresponding to the selections) from the purchaser and thereby obtaining ipselecta-relicta selection data (IRSD) 233 that indicates the selections of soft assets of a particular user. In some embodiments, a panoplex-selection program 234 is used to select, from among the storage media having different panoplexes, one storage medium 231 having the panoplex' 226 that has the best match of its installed soft assets to the soft assets specified in the IRSD 233. In some embodiments, the particular storage medium 231 selected by the panoplex-selection program 234 is presented to panoplex-gryphing process 206, which performs the gryphing of the panoplex' 226 by using gryphing program 240 to achieve subtractive installation based in the IRDS 233. In some embodiments, gryphing program 240 executed in a computer having an interface 251 (e.g., serial ATA, USB2, or other suitable interface) to the storage medium. The subtractive installation performed by gryphing program 240 culls the relicta (the soft assets that are to be removed), leaving erased space 258 in the place of the culled soft assets, and retaining the ipselecta 255 (the soft assets selected to be retained) to obtain a gryphed storage medium 150. In some embodiments, the set of ipselecta 255 include the ipselecta directory 252, the ipselecta registry 254, and the ipselecta asset data 256. The remaining space on the gryphed storage medium 260' is erased space 258.

In some embodiments, each intermediate workpiece 231 omits from panoplex' 226, sufficient gryph source data 232 (e.g., directory and registry data) to make the soft assets of panoplex' 226 substantially useless unless rejoined with gryph source data 232 (obtained or received from a different source) and gryphed by gryphing program 240. This separation of key data (e.g., gryph source data 232) from panoplex' 226, and not placing that key data on the storage medium 231 provides increased security and helps ensure that the soft assets of the panoplex' 226 are not available to a user unless the storage medium 231 is gryphed. In some embodiments, the non-availability to a user is also enforced by one or more security measures such as physically locked facilities, obscuring data, hidden segments, programs that run on first power-up, encryption, passwords and the like, used in conjunction with splitting the data. In other embodiments, where the complete panoplex data is on the storage medium, security is provided by other processes, such as, for example, encrypting or obscuring some or all of the data, or physically securing the storage media in locked facilities. Non-availability of the panoplex, or of the relicta, to a user includes having the data, if it exists, being not available to the end user, even if it is available to the manufacturer or retailer of the device. In some embodiments, a temporal lock is also provided, such that the user might have some access to the soft asset for a short period of time after taking possession, but that the gryphing program would erase the soft asset at a predetermined time unless the user made the required purchase(s). In some embodiments, intermediate workpiece 231 is operatively coupled to end-user device 260 before the gryphing program executes. In some embodiments, once gryphing program 240 completes its operation, end-user device 260 is substantially or completely ready-to-use and functional for its end user. In some embodiments, each intermediate workpiece 231 includes the program code of gryphing program 240, such that alone or with the assistance of external operating-system code, the gryphing can be accomplished in and by the final device 260.

FIG. 2C is a block diagram of a rotating-media storage device 260 (e.g., embodied on a disk drive 261) having a self-contained gryphing program 240. In some embodiments, most or all of process 202 (see FIG. 2A) is performed in the storage device 260. In some embodiments, disk drive 261 has one or more rotating disks 269 having data stored thereon, wherein the data is written and read by transducer 259 that is moved to selected data positions by actuator 257. In some embodiments, disk drive 261 also includes various electronics including processor or controller 263, a data/instruction store 265, one or more buffers 264, and an external-device interface (also called a system interface) 262 used to accept data-transfer requests from an external device, and to send data to and receive data from the external device such as the electronics of a personal computer 104 (see FIG. 1A) or percepter 105 (see FIG. 1B) through connector 256 (e.g., a serial ATA (SATA), serial SCSI, universal serial bus (USB), IEEE 1394 Firewire™ connector, or other suitable interface). In some embodiments, the data on disk(s) 269 is divided into two or more subsets, including a user-data subset 258 and the disk drive's reserved-area subset 268.

In some embodiments, when disk drive 261 is powered up, store 265 is loaded with control program 266 and access-control program 267. In some embodiments, control program 266 and access-control program 267 are used to control operation of disk drive 261, and to translate or map system addresses (e.g., logical-block addresses (LBAs) used by the external system to access disk-drive data) into disk-drive addresses (e.g., cylinder-head-sector (CHS) addresses used by controller 263 to access data on disk drive 269). In some embodiments, developer-tools available for the high-level operating systems (OS) are used to more directly access specific functions of the storage medium (e.g., full access to manipulate directory entries and other metadata needed for gryphing and fast-secure erase). In other embodiments, perhaps the high-level OS do not readily allow direct access to the hardware, so in some embodiments, some embodiments use a basic low-level operating system such as MS-DOS, which allows read and write access to any disk sectors, including those used by the high-level operating system for its directory (including the NTFS directory) and other metadata. See also the description of FIG. 16, below. In some embodiments, that mapping process is also used to reassign spare sectors for those sectors that have failed or have unreadable or uncorrectable data, and to prevent user access to reserved area 268. In the embodiment of FIG. 2C, a panoplex 211 (see FIG. 2A) is initially stored on disk drive 269, but access to the data in the panoplex 211 by external devices is blocked by access-control program 267 until gryphing program 240 has been run to cull the unselected soft assets (relicta) and/or to charge the user for the retained assets (ipselecta 255). In some embodiments, control parameters, authorization codes and/or decryption keys are sent to gryphing program 240 through system interface 262 by an external device (such as an ordering, customization and/or selection computer), in order to enable gryphing program 240 to perform its gryphing operation, which, once completed, provides full access to the ipselecta 255. Access-control program 267 prevents reading the panoplex data before gryphing, and prevents reading the relicta data after gryphing. In some embodiments, if disk drive 261 is used (e.g., attempting to read data from the user-data area before gryphing is complete), the access-control program 267 will allow such normal use but will present zeros or some other data pattern instead of the panoplex data if any user-data sector is read before the system writes data to it. This allows the same disk drive 261 to be used as a gryphable panoplex (if interfaced to a gryphing-program controller before first use) or as a normal blank drive (if accessed first by any other program), thus providing economies of scale and reducing inventory requirements to the system manufacturer.

FIG. 2D is a block diagram of a solid-state device 270 (e.g., embodied on a flash or other type of solid-state memory device or drive 271, or in some embodiments, the solid-state memory is an embedded part of a percepter 105) having a self-contained gryphing program 240. In some embodiments, the operation of device 270 is substantially the same as described for device 260 of FIG. 2C, and most or all of process 202 (see FIG. 2A) is performed in the storage device 270. In some embodiments, solid-state drive 271 has one or more memory chips 279 having data stored thereon (e.g., using non-volatile memory such as FLASH, or memory that uses a thin-film battery embedded in device 270). In some embodiments, solid-state drive 271 also includes various electronics including processor or controller 263, a data/instruction store 265, zero or more buffers 264, and a system interface 262 used to accept data-transfer requests and to send and receive data from an external device such as the electronics of a personal computer 104 (see FIG. 1A) or percepter 105 (see FIG. 1B) through connector 256 (e.g., a USB connector). In some embodiments, the data on chip(s) 279 is divided into two or more subsets, including a user-data subset 258 and a reserved-area subset 268.

In some embodiments, when solid-state drive 271 is powered up, store 265 is loaded with control program (CP) 266 and access-control program (ACP) 267. In some embodiments, control program 266 and access-control program 267 are used to control operation of solid-state drive 271, and to translate or map system addresses (e.g., logical-block addresses (LBAs) used by the external system to access disk-drive data), into chip-sector addresses used by controller 263 to access data on chip(s) 279). That mapping process is also used to reassign spare sectors for those sectors that have failed or have unreadable or uncorrectable data, and to prevent user access to the reserved area 268. In the embodiment of FIG. 2D, a panoplex 211 (see FIG. 2A) is initially stored on chip(s) 279, but access to the data in the panoplex 211 by external devices is blocked by access-control program 267 until gryphing program 240 has been run to cull the unselected soft assets (relicta) and/or to charge the user for the retained assets (ipselecta 255). In some embodiments, control parameters, authorization codes and/or decryption keys are sent to gryphing program 240 through system interface 262 by an external device (such as an ordering, customization and/or selection computer), in order to enable gryphing program 240 to perform its gryphing operation, which, once completed, provides full access to the ipselecta 255. Access-control program 267 prevents reading the panoplex data before gryphing and the relicta data after gryphing.

FIG. 2E is a block diagram of a gryphing process 280 used on a storage device 231. In some embodiments, gryphing process 280 obtains intermediate workpiece 231 having a copy of the data for panoplex' 226 (e.g., the software portion) stored on a blank end-user storage media 235 (the hardware portion, e.g., a disk drive or FLASH card). In some embodiments, ipselecta-relicta selection data (IRSD) 233 indicates the selections of soft assets of a particular user, and in some embodiments as shown here, includes pointers to the individual ipselecta members 281 (the soft assets to be retained that together form the ipselecta 255), such that culling process 283 removes or erases the relicta 282 (note the dash-dot-dot arrows on FIG. 2E from culling process 283 to the storage areas 282 of the soft assets not selected and other data not relevant to the ipselecta 255). In some embodiments, a decryption process 285 is run (based on the IRSD 233) to decrypt one or more of the ipselecta assets (note the dash-dot arrows from decryption process 283 to the storage areas 281 of the soft assets selected and other data relevant to the ipselecta 255 that are to be kept). In some embodiments, not all soft assets are encrypted, so decryption process 285 need not decrypt those assets. In some embodiments, the resulting storage medium 150 having the customized and/or user-selected set of soft assets (for example, a collection of software and/or audio and/or video files) is then ready for use. In other embodiments, the IRSD 233 specify the individual relicta members that the culling process 283 is to remove or erase. In some embodiments, a defragmentation process 284 is also run to optimize the locations of the stored ipselecta 255 and the performance of the device that will use the ipselecta 255 (e.g., by moving certain separated data to consecutive sectors on a disk drive), and/or to provide additional assurance that the relicta cannot subsequently be reconstructed or unerased and later used (e.g., by flagging the sectors of the relicta as sectors that are to be overwritten with zeros or other obliterating data patterns, for example, by a program that automatically runs, in the background or during idle periods of time of the processor after the device is delivered to the user, until all the relicta have been overwritten). In some embodiments, the panoplex (e.g., panoplex' 226 or other variations such as panoplex 211) contains the universe of selectable soft assets that have been installed (e.g., all software programs, multimedia assets, and other soft assets from which the user can choose a subset to keep and/or be charged money for).

FIG. 2F is a block diagram of intransient signal carrier 290 used for a storage device 231. Intransient signal carrier 290 is any mechanism that can deliver soft assets to a device at an arbitrary future time. In contrast, transient signal carriers (such as radio waves and network signals on a wire or fiber) are transmitted, and once the signal has passed, it is gone. If information from a transient signal carrier is stored for future retrieval or re-transmittal, then the information has been moved to an intransient signal carrier. As used herein, soft assets are stored data or information (which include software, programs, audio, video, or other assets, whether in digital, analog, or any other form). In some embodiments, intransient signal carrier 290 is a storage medium 150 having soft assets stored thereon that can be coupled to a computer 104 or percepter 105. In some embodiments, intransient signal carrier 290 can be gryphed to remove non-selected assets, enable selected assets, and/or provide available space to place other information in place of the removed non-selected assets.

In some embodiments, some or all of the device's operating system 293 is stored elsewhere, but is used to access information from the intransient signal carrier 290, using such structures as the program registry 292, the file directory 294, and/or MSI installer database 295. In some embodiments, the operating system 293 is completely maintained within the intransient signal carrier 290. In some embodiments, a set of user-specific data that customizes the device for a particular user, called insignification, 296 is stored on the intransient signal carrier 290. In some embodiments, parts of insignification 296 are contained within the program registry 292. In some embodiments, an asset-security program or device 297 (such as an "Ultimate Packer for Xecutables" (UPX)-derived protection system) is used to protect the assets from unauthorized use. Panoplex 226, in some embodiments, includes a plurality of atomic assets (assets that are to be treated indivisibly-either entirely there as ipselecta 281 or entirely removed as relicta 282). In some embodiments, a manifest 298 is provided, which tracks which assets are on the panoplex, and provides a preferred order for removal. In various embodiments, some or all of the data of file directory 294, registry 292, MSI installer DB 295, insignification data 296, manifest data 298, gryphing API 242, and/or other data are stored on the intransient signal carrier 290, while in other embodiments, some or all of these data are stored elsewhere and brought together with intransient signal carrier 290 as and when needed. In some embodiments, the manifest 298 is embodied as a Windows.ppx or other type file in a suitable format (e.g., XML). In some embodiments, manifest 298 includes the order for the un-installations to occur. In some embodiments, manifest 298 is a ready-to-go subtraction program and/or database that includes UUID data, GUID data, tags, playlists, and/or other metadata or program code or instructions to assist in the gryphing process.

FIG. 2G is a block diagram of a process 288 to process a blankoplex 253 stored on a storage device 236. In at least some of the embodiments described above, the process of gryphing reads at least some program(s) (such as the gryphing program itself) and/or data (such as file directory data, registry data, manifest data and the like) in order to perform the gryphing process. In contrast, in some embodiments such as shown in FIG. 2G, no data need be read from storage medium 236. Rather, a directory structure 237 (and/or registry data, partition data, manifest data) is provided at the location(s) expected by the operating system, wherein this initial directory 237 is blank or substantially blank (i.e., indicating that all or substantially all of the storage space (other than the directory itself) is available for storage of user data. If used as is, without gryphing process 243, blankoplex 236 acts as a normal blank storage medium (e.g., a blank disk drive or blank solid-state drive). If, instead, gryphing process 243 operates and writes directory data and/or registry data and/or the like, then storage medium 236 will end up with ready-to-use ipselecta. In some embodiments, a process, such as process 204 of FIG. 2B, separates a panoplex 211 into certain gryph data 229 and the remaining panoplex' 226.

In some embodiments, the separated gryph data 229 is the total panoplex directory and registry (TPDR) data 238 (which, in some embodiments, also contains other data) shown in FIG. 2G, and is input to selector-charger process 243, along with ipselecta-relicta selection data (IRSD) 233 obtained from choices made by a user or purchaser. In some embodiments, selector-charger process 243 includes a gryphing API (application programming interface) that operates on TPDR data 238 to generate the gryphed ipselecta directory-registry 239 (containing only data relevant to the ipselecta, and indicating all other storage space is available for storing of other data) and a pricing-charging API (in some embodiments, this API is also part of block 243, or separately (such as pricing rules 244 of FIG. 2A) which, in some embodiments, is as described in FIG. 13) that based on pricing options that were presented to the user and the selection data based on the choices and prices selected by the user. In some embodiments, selector-charger process 243 debits an amount (based on the selections made and ipselecta kept) from the user's account 245 (either directly or by invoice presented to the user). In some embodiments, selector-charger process 243 causes the ipselecta directory-registry 239 to be written on top of the blank directory area 237 to convert blankoplex 253 into a ready-to-use storage medium 150 (see FIG. 2B) having the customized and/or user-selected set 255 of soft assets and erased space 258. In some embodiments, storage medium 150 is coupled to the device that will use its soft assets after the gryphing process 243 operates, while in other embodiments, blankoplex 236 is coupled to the device first, and gryphing process 243 operates afterward. In some embodiments, the individual files and assets of panoplex' 226 are broken into pieces and stored in a scattered manner, in order to make reconstruction and/or use of the assets more difficult unless provided with the gryphed ipselecta directory-registry 239.

Soft Assets

FIG. 3A is a Venn diagram of a set of various intangibles referred to as soft assets 300. Soft assets set 300 can include soft digital assets (e.g., programs, data sets, or digitized music and the like), analog assets (audio or video recordings in analog format) and/or other types of intransient signals. In some embodiments, the "universal" set 300 of possible soft assets (i.e., all the soft assets available offered by one or more vendors) includes a plurality of overlapping types of assets including programs 310, percepta 320, OS and/or middleware components 309, interactive games (which may include both percepta 320 such as audio and video storage as well as stories and programs 310), music or other audio 324 (e.g., digitized and compressed files in MP3 format, synthesized-music-specification files such as MIDI-type music files, and the like), video 326 (e.g., digitized and compressed files in an MPEG format, cinema, animation, simulations, and the like), photos and other images 328 (e.g., digitized and compressed files in JPEG format, drawings, paintings, illustrations, fonts, symbols and the like), and databases (such as data and vector data for geographical or geological maps, engineering specifications, architectural features or plans, numerical-control data for automatically building or fabricating parts, statistical data, financial information, and the like).

FIG. 3B is a Venn diagram of a universal set of soft assets 350, some of which are grouped and installed into one or more of a plurality of panoplexes (in FIG. 3B, these are denoted as the diagonal boxes labeled as panoplexes 331, 332, 333, and 334, although in other embodiments, a greater or fewer number of panoplexes may be used). In some embodiments, one or more of the panoplexes is loaded onto each one of a plurality of end-user storage media (e.g., in some embodiments, one inventory or set of one or more storage media 335 each has panoplex 331, another set 336 has panoplex 332, another set 337 has panoplex 333, another set 338 has panoplex 334, and yet another set 339 has both panoplex 332 and panoplex 333).

In some embodiments, the panoplex-selection program 234 (See FIG. 2B) would examine the asset selections of each purchaser (e.g., from the data on a purchase order or data transmitted via the internet from a web interface) and select a storage medium having the panoplex(es) with the best fit with a particular purchasers selected set of assets. For example, upon examining the purchase order of a first user X' who selected the five individual assets labeled X, the panoplex-selection program would select a storage medium 338 having panoplex 334 from the inventory of storage media 338 (panoplex 334 happens to include all five of the assets labeled X). The selected storage medium 338 is then gryphed in order to uninstall all other assets and leave just the five individual assets labeled X.

As another example, upon examining the purchase order of a second user Y' who selected the nine individual assets labeled Y, the panoplex-selection program would select a storage medium 339 having both panoplex 332 and panoplex 333 (panoplex 332 happens to include four of the selected assets labeled Y, panoplex 333 happens to include six of the selected assets labeled Y (five of which are not in panoplex 332, while panoplex 331 has three of the selected assets Y). The selected storage medium 339 is then gryphed in order to uninstall all other assets and leave just the nine individual assets labeled Y. Since three of the selected assets are in panoplex 331, panoplex 331 would not be selected, since a better fit is found in panoplex 332 with four of the selections labeled Y and panoplex 333 with the remaining five, and better yet with both of these panoplexes that are stored on storage media 339.

As yet another example, upon examining the purchase order of a third user Z' who selected the eleven individual assets labeled Z, the panoplex-selection program would select a storage medium 339 having both panoplex 332 and panoplex 333 (panoplex 332 happens to include six of the selected assets labeled Z, panoplex 333 happens to include five of the selected assets labeled Z (three of which are not in panoplex 332), while panoplex 331 has four of the selected assets Z). The selected storage medium 339 is then gryphed in order to uninstall all other assets and leave just the nine individual assets labeled Z. Since two of the selected assets are not in panoplex 332 or panoplex 333, in some embodiments, those two assets would be installed in a conventional additive-installation manner, or those assets would be indicated as not available through the gryphing process and could be purchased and installed separately.

More Examples of Subtractive Installation in Practice

The mass copying of one or more panoplexes to each storage medium in an inventory is relatively quick, readily performed by automated equipment, and can be done in advance of actually coupling the storage medium to a device. As shown in the above-described Venn diagrams, a subtractive-installation apparatus (that operates by uninstalling the non-selected soft assets) provides an efficient platform for what is, in essence, installing those soft assets that were selected. Providing a panoplex on a storage medium (like a raw block of marble for a sculptor) and then removing certain of the installed soft assets to leave the selected assets (using a process that performs "subtractive installation" of the non-selected assets, which is like removing chips from the block of marble to leave the desired statue) dispenses the selected assets. In practice, gryphing is much faster and easier to do than additively "casting" a sculpture from scratch, at the time of order.

Conceptually, subtractive installation is as simple as a paper clip. However, as its forms, materials, and uses can differ widely, examining a few exemplary embodiments elucidates the variety and diversity of applications enabled by this platform.

In other exemplary embodiments, vendors of notebook computers (e.g., Toshiba) have their notebook computers designed and built by an original design manufacturer (ODM) (e.g. Compal Electronics) in a low-cost-of-labor country (e.g., China), and that ODM assembles laptop sans memory (DRAM) and/or disk drive. The vendor (e.g., Toshiba) receives shipments of these machines without the high value DRAM and storage. Upon a the receipt of a customer order, at its staging facility, Toshiba gryphs disk drives per the individual user's order, mates the disk drive into the rest of the laptop, adds the DRAM, and delivers to the user. In another embodiment, the ODM in Shanghai receives the software selection information, gryphs the storage medium, and ships a customized device per the specific customer order. With a minimum of new investment, Toshiba provides its customers with BTO laptops.

In still other exemplary embodiments, a personal computer manufacturer (e.g., Lenova) has, for example, a pharmaceutical manufacturer (e.g., Pfizer) as a large corporate account. In some such embodiments, the information-services (IS) department at the corporate customer (e.g., Pfizer) creates a master corporate panoplex having a variety of authorized software applications, and also having an authorization table linking location, language, division, function, and rank information within the corporate customer with various software applications both proprietary, specific-to-Pfizer software and generic software from outside software vendors. In some embodiments, an individual provides her employee number and/or other insignification information over an intranet link to the personal computer manufacturer (e.g., Lenova). When management approved, this data automatically determines the selection within the set of corporate software to include in the ipselecta, and provide the user-specific insignification information that is merged into the ipselecta. Lenova chooses a storage medium holding a duplicate of the master Pfizer corporate panoplex, decodes the information, selects the assets to include in the ipselecta, gryphs the Pfizer panoplex, insignifies the software with the user's particular data, and ships the appropriate computer hardware, coupled with the factory-gryphed storage medium, holding the correct insignified ipselecta, to the Pfizer employee and bills the Pfizer accounts payable department according to a pre-established corporate contract. Pfizer boosts IS productivity.

In yet other exemplary embodiments, a computer vendor (e.g., HP) ships a desktop computer with an embedded disk drive containing a panoplex to a big-box retailer (e.g., COMPUSA or Best Buy). In some such embodiments, the desktop computer uses BIOS extensions that create a protected environment (e.g. Phoenix Technologies' OCore Managed Environment (cME)) for soft assets and only allows an ordering-and-payment application to run. In some embodiments, the end-user purchases the desktop computer, takes it home, connects to internet, and a remote computer provides control information that elicits and receives selection indications from the user as to which soft assets are to be in the ipselecta, controls gryphing of the computer, charges the purchase to the user's account, and transmits encoded information (e.g., a decryption token and the like) back to the desktop computer in the user's home to unlock the extended function and storage of the desktop computer. Buying a new computer becomes hassle-free.

In still other exemplary embodiments, a big box retailer and its customer-assistance organization (e.g., a Best Buy Geek Squad), as an economical alternative to replacing an entire computer system, provides, customizes, and installs upgrade disk drives, containing a new OS (e.g., an operating system, such as Microsoft Windows Vista or the like) and new OS-capable soft assets. In some such embodiments, a customer goes to an in-store computer kiosk (that may in some embodiments be network attached) and selects and pays for applications and other soft assets. A panoplex on a disk drive coupled to the kiosk or to a network-attached grypher is gryphed according to the user's selections and payment. The customer-assistance organization (e.g., Geek Squad) swaps out the old disk drive from the customer's computer and installs the new upgrade disk drive with its soft assets into old machine. In some embodiments, the service includes transferring unique customer data and files to the new drive. In some embodiments, the panoplex-containing storage medium incorporates data obscuring and protection methods that allow the customer to perform the upgrade away from the store. Best Buy gains a new revenue stream.

In still other exemplary embodiments, a panoplex on a read/write (R/W) optical disk (e.g., a Blu-ray disc (BD)) for use with a gaming computer console (e.g., a Sony Playstation) is gryphed and supplied with the console (as an alternative to an embodiment installing the panoplex to the console's internal magnetic disk drive and gryphing the panoplex on the disk drive). In some embodiments, purchase and gryphing of the panoplex on the R/W optical disk can also happen independently of the sale of gaming console, wherein the gryphed R/W optical disk incorporating Digital Rights Management (DRM) software that allow loading onto one console or a designated console, while preventing loading on multiple or undesignated consoles, is then forwarded to the customer post device purchase. Sony captures more revenue for its games division.

In still other exemplary embodiments, a panoplex on a hybrid cell phone that also plays stored music and/or videos (e.g., a Nokia (Symbian OS-based) Music Phone designed for operation with the Cingular Wireless network) is shipped to retail stores with the intact panoplex in a micro-hard-disk drive (micro HDD) or FLASH drive. In some such embodiments, a customer uses an in-store terminal to select a phone plan, and one or more soft assets (e.g., ring tones, music, games, videos and the like), wherein substantially all assets are unavailable until phone is activated. Initially, the cell phone device is designed so that it can only call Cingular's switch for activation. When contacted, the switch receives the cell phone's electronic serial number (ESN), finds the user selection and payment information, links the assigned phone number to the ESN, and wirelessly sends a relicta list to the cell phone for use by the gryphing program, which then runs in the cell phone. When gryphing is successfully completed, the cell phone sends to the switch a completion-code handshake and the switch sends a key or decryption code to unrestrict internal phone functions, activate network phone service and release for customer use the ipselecta of soft assets. The gryphing and activation occurs anywhere within signal reach of the Cingular network. Sending the small relicta file does not tie up the network as would sending the selection of soft assets. Customers do not incur the high connect charges of downloading their tunes after activation or queue in stores to download assets.

In yet other exemplary embodiments, an educational institution (e.g., Duke University) mandates that each incoming freshman receives a certain new laptop personal computer (e.g. a Dell Latitude) and/or a media player (e.g., an iPod) whose cost is added to their tuition. The educational institution creates one or more panoplex for each school (for example, the law school, medical school, engineering school, and the liberal-arts college would each have its own panoplex for each device). In some embodiments, the panoplex of soft assets includes academically relevant commercial, proprietary, and freeware software programs (e.g. Corel WordPerfect Office, Wolfram Mathematica, Adobe Photoshop, Macromedia Freehand, Visual Basic, TeX, LaTex, and the like). In some embodiments, the panoplex of soft assets includes course-related materials (e.g. electronic textbooks (licensed or in the public domain), instructor course notes, instructional films, assigned readings, reference materials, virtual lab experiments, web links, quizzes, recorded lectures (in various embodiments, as audio, PowerPoint, and video presentations), and the like). In some embodiments, the panoplex includes the school-related materials (e.g. school calendar, class schedules, and contact information for the faculty, staff, emergency, and other university services). In some embodiments, Duke could also provide (and sell) legal copies of other soft assets (e.g. music, movies, or video) to discourage campus piracy. The educational institution creates software that creates an ipselecta and insignation for each student as they enroll, based substantially on the student's selected classes and major. Each matriculating student receives their gryphed (customized) devices with the materials appropriate for her own specific course load at orientation or the devices are sent to her home. In some embodiments, the educational institution outsources some or all of the work to a computer vendor or value added reseller (e.g., Dell, Apple, or the like). A student benefits from not having to spend a hectic day in a bookstore, buying at retail, expensive, heavy textbooks that clutter their dorm room. A student also gains the substantial advantages of having his course work organized and available electronically. Lured by such an customized, high-tech, high-touch offering, Duke captures higher-performing students, in a highly competitive educational environment.

In still other exemplary embodiments, a multimedia hardware company (e.g., Kaleidescape) or a manufacturer of personal video recorders (PVR) (e.g. TIVO) creates themed panoplexes (e.g. movie or video by era, genre, language, director, actor, studio, child-age rating, appropriateness level and the like). The company gryphs a selected panoplex (as in FIG. 3B) according to a customer's order (wherein the particular panoplex may be selected from a plurality of panoplexes based on a correlation to the customer's selections) and installs the storage medium with only the specified movies into the ordered player unit for shipment. A hypothetical example of how such usage could play out will be evident from this scenario: Rick is putting the finishing touches on his new 11,500 square foot home in McMansion, Va. His interior decorator suggests installing a central video server making his entire video collection instantly accessible from any room in his house. He builds-in a Kaleidescape Server with 45 terabytes of RAID storage that can house over 6600 DVDs. The storage is customized at the factory. He buys it loaded with the 71 MGM musicals made from 1929 through 1941, the seven Preston Sturges movies made at Paramount, and the twelve Garry Marshall movies that include Hector Elizondo in the cast. While spending a fortune on the video system, Rick saves 45 precious hours importing individual DVDs into his system.

Another Gryphing Embodiment

Figure 4A:
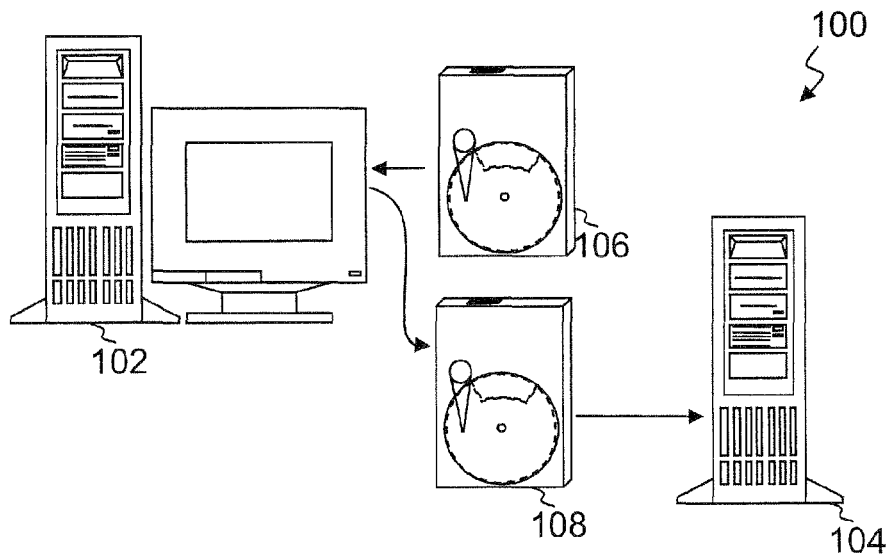
FIG. 4A is a block diagram of a process 100 for duplication of a master disk containing a panoplex to be customized and installed in a computer.

FIG. 4A is a block diagram of a process 100 according to some embodiments of the invention for creation and duplication of a panoplex (to be gryphed) on a master disk 106 containing ipselecta according to choices for a particular user, and installed in a computer or other information-processing appliance. In some embodiments, dispensing computer 102 is operatively coupled to at least one master disk 106 and at least one end-user disk 108. In some embodiments, a panoplex is created onto master disk 106 by installing the plurality of digital assets that together form the panoplex using dispensing computer 102, while in other embodiments, the panoplex is created on a different computer (i.e., an installation computer having an installation storage medium onto which the panoplex is created by installing a large number of soft assets) and copied to master disk 106. In some embodiments, the data from master disk 106 is copied to each of a plurality of end-user disk drives 108 (e.g., using a disk-copy program or other suitable method). Each end-user disk 108 is to be customized (by selecting content to be kept and gryphing to remove all other non-relevant data) for installation in/connecting to a corresponding end-user device (e.g., a personal computer) 104 for delivery to a particular end-user. In other embodiments, end-user disk 108 is already installed into computer 104 before panoplex copying and/or gryphing. In still other embodiments, computer 104 is used to provide gryphing for outside devices such as a music player to which the storage medium or end-user disk 108 is connected. Master disk 106 includes a panoplex (or a plurality of panoplexes), which is (are each) a complete collection of all functional content available for selection by the end user (or, in other embodiments, the selections are made for the end user, for example, when a corporation or enterprise customizes a computer for each employee). In some embodiments, the end-user has already selected a subset of the panoplex for installation in computer 104 and selection data representing that selection is provided to dispensing computer 102, which then culls the unselected content, leaving a substantially ready-to-use and functional end-user device (a combination of software and hardware, which herein is called a totum). One process for such selection is described more completely below.

Figure 4B:
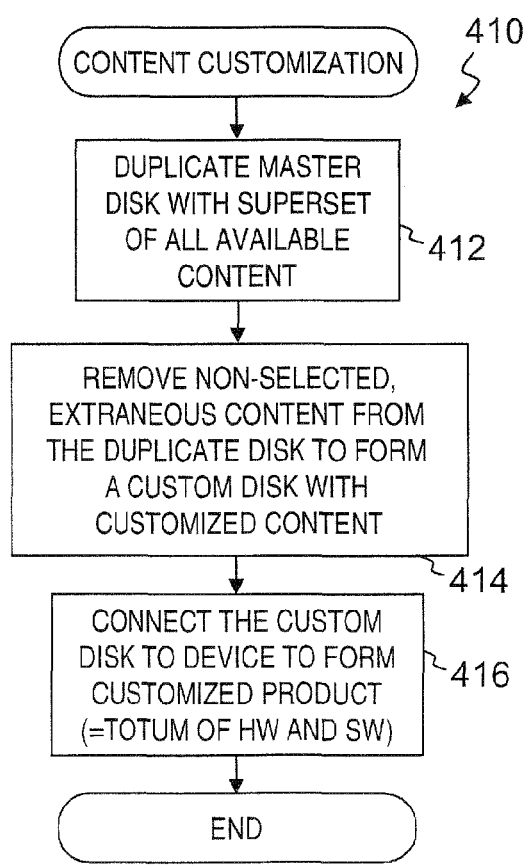
FIG. 4B is a logic flow diagram of one embodiment of the customization 410 of the duplicated panoplex.

FIG. 4B is a logic flow diagram illustrating a method 410 for customizing end-user disk 108. At block 412, dispensing computer 102 duplicates the data from master disk 106 onto new disk 108 to replicate the entire panoplex within disk 108. At block 414, dispensing computer 102 removes the non-selected, extraneous content from end-user disk 108 to leave the selected content. In some embodiments, end-user disk drive 108 is now customized to the specifications of the end-user. At block 416, end-user disk drive 108 is installed into computer 104 to form a customized product according to the specification of the individual end-user. The particular order of execution of these blocks can be varied in other embodiments, for example as described below.

What makes this approach attractive and efficient is the dispensing of available content by removal/culling/erasing of the non-selected soft assets. In particular, in many embodiments, erasing data from a non-volatile storage medium or other intransient signal carrier is much faster than writing the same data to the same storage medium or even reading the same data from the same storage medium. Even when most of the data is to be erased, it can take a shorter time to erase that large amount of data than it would take to install a few soft assets. Writing a file requires setting up information in a directory and writing the substantive digital content of the file to the physical locations of, for example, drive clusters or sectors of a disk drive or flash memory cells. Since storage medium and/or memory access is slow relative to typical processor speeds, writing a file is very time consuming relative to other tasks performed by a computer.

Reading a file requires reading such directory entries and moving a disk-drive arm, rotating a disk, and/or traversing the memory to access the substantive content of the file. Erasing a file requires as little as mere modification of one or more elements of the file system directory to decouple the physical bits of the file from the file information in the directory that is used to logically make files available to or through the operating system, in order that the previously physically stored data become inaccessible, out-of-order, and/or without proper context. Therefore, time required to read or write a file is roughly proportional to the size of the file; however, time to erase a file stays small and relatively fixed and is a fraction of the time to write or even merely read the file. Accordingly, time to erase multiple files is more closely related to the number of files than the size of individual files.

In addition, adding content to a storage medium generally requires some guidance, such as a particular hierarchical directory structure or multiple-program context into which to store the content. As a result, adding content often requires human intervention. In contrast, removal of content from a storage medium generally requires little more than accurate identification of the content within the storage medium. Further, an expert can design a removal program to automatically handle many instances where human intervention would otherwise be needed to properly remove programs. In either case, human intervention is substantially less important in removal of content from a storage medium. Accordingly, installation by removal lends itself particularly well to automation.

Consider the following as an illustrative example of the difference in some embodiments between installation by writing and installation by removal—i.e., additive installation versus subtractive installation. Suppose a music-retail store allows in-store filling of an Apple# iPod# or similar hard-drive- or flash-based digital music player with music selected by the purchaser at a discount, e.g., as a promotion. In this illustrative example, the digital music player has a capacity of 60 GB and is accessible through a USB 2.0 connection, supporting nominal data-transfer speeds of 480 Mb/s (which is about 48 megabytes per second). In practice, however, the attainable, sustained transfer rate is less than one third of the theoretical rate. Further in this illustrative example, each digital music player is preloaded (e.g., at a mass-copying facility) with a panoplex of digital music. In particular, block 412 (see FIG. 4B for this and the following reference numbers) has already been performed, for example, at a manufacturing facility. In addition, in some embodiments, block 416 has already been performed. Only block 414 remains to be done. In this example, block 414 is performed by one or more in-store computers at high speed.

The advantages of the present invention may be even more pronounced in the example of a cell-phone/music player, in which conventional approaches might require over-the-air activation and over-the-air downloads of perhaps hundreds of soft assets (e.g., songs, videos, or ringtones) at very low transfer rates (e.g., as low as 14 Kbits/sec).

If the purchaser wishes to keep all 60 GB of preloaded digital music, the digital music player is ready to go without further processing. On the other hand, if additive installation were used, writing 60 GB would take over 60 minutes, an eternity given that it may take only ten minutes to build an iPod in the first place, once its component parts are gathered together in the assembly plant. Were the purchaser to keep none of the preloaded digital music, approximately 20,000 files are erased—requiring just a few bytes for each file. Thus, to erase 60 GB of data, several kilobytes of data are written across a fast USB 2.0 connection, taking just moments.

Between these extreme scenarios are many variations. Using only additive installation to store digital music on the digital music player will take from several minutes, up to an hour. Over-the-air wireless transmission and additive installation of soft assets would take much longer. While a few minutes per device sold may seem like a minor inconvenience, these few minutes can accumulate into a very long queue of digital music players waiting for customization in busy times, and during the Christmas-shopping season in particular. Wireless downloading of songs into a cell phone may take minutes per song and thus present a very unpleasant circumstance for the user who has a long list of songs to acquire. In contrast, subtractive installation to provide store the same digital music on the same digital music player or cell phone will take no more than a few seconds, in some embodiments (even for wireless, over-the-air control of the gryphing process in a cell phone), and in many cases will appear instantaneous to the purchaser and, more importantly, to subsequent purchasers waiting in line to make their own purchase.

The asymmetry in efficiency is more striking for digital media players of larger capacities. The disparity derives largely from the difference in the respective amounts of data to be written in storing a soft asset and in removing the soft asset. In addition, removal of many individual files can be done in parallel (e.g., by multi-threaded processes)—it does not have to be a serial process of removing one file then another. Thus, in some embodiments, the advantages of erasure of files being more efficient than creation of files are amplified by performing erasure by a program or process that, for example, runs many threads of execution in parallel, each erasing files.

In the example of the digital music player, each soft asset represents about 3 to 5 MB. In an example that involves preloading of customized content in a networked video server and distribution system (such as the Kaleidescape™ system available from Kaleidescape, Inc. of Mountain View, Calif.), each individually selectable soft asset (e.g., a feature-length movie) represents three to five gigabytes or more. Every individual movie DVD disk takes one-half hour to upload. Thus, additive installation of a few hundred movies can literally take days, while customization by subtractive installation of a few hundred movies is just a matter of minutes. In some embodiments, a storage medium, as it is built and tested, writes one or more test-data patterns and then reads back that test data to verify correct operation of the storage medium. As a final operation in this process, a blank pattern is written (e.g., a default partition and directory, with the rest of the storage medium zeroed). Thus, when, instead of the conventional blank pattern of zeros, the panoplex data is written as the final test data of the manufacturing process and is left on the storage medium, there is substantially no time or cost penalty.

Figure 4C:
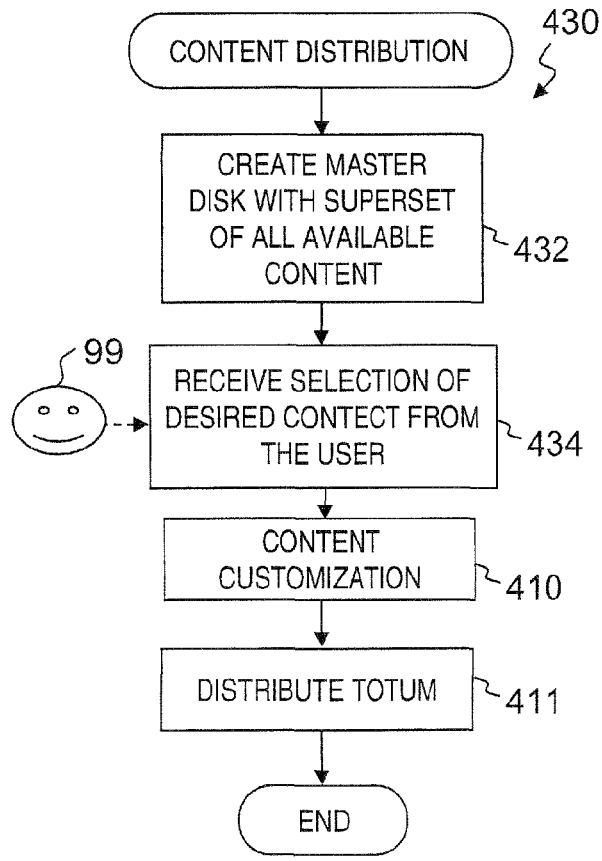
FIG. 4C is a logic flow diagram of content distribution 430, including customization in the manner shown in FIG. 4B.

FIG. 4C shows a block diagram of a process 430 that illustrates broader perspective of the customization system shown in FIG. 4A and the method shown in FIG. 4B. At block 432, master disk 106 is created, i.e., the panoplex is created within master disk 106. At block 434, the user 99 selects content to be included in the customized disk drive, e.g., disk 108. Generally, such selection can be made by any conventional user-interface mechanism involving physical manipulation of one or more user-input devices by the user. One useful user interface for conducting user selection of desired content is described below. Of course, selection of the desired content implicitly identifies the extraneous content. In an alternative embodiment, the user explicitly selects the extraneous content that is to be removed, thereby implicitly identifying the desired content.

At block 410, described above and shown in more detail in FIG. 4B as logic flow diagram 410, the content of disk 106 is copied to end-user disk 108 and customized in accordance with the user's selection received at block 434. As described above in conjunction with the illustrative example of in-store customization of pre-loaded music in a digital music player, the functions of logic flow diagram 430 can be performed in a different order than that shown and described. As a practical matter (referring back to FIG. 4B), the panoplex on master disk 106, in some embodiments, should be created at block 432 prior to copying of the master disk at block 412, and the removal of extraneous content at block 414 should be performed after the panoplex on end-user disk 108 has been copied from master disk 106 at block 412 and after the user has identified desired content, thereby implicitly identifying the extraneous content.

At block 411, the completed (or substantially completed) totum is distributed to the user (e.g., checked out at a retail store, or mailed to a user who ordered in the internet).

The panoplex creation of block 432 typically involves some human interaction. In the example of the digital music player for in-store customization in the example described above, someone chooses approximately 20,000 songs for preloading onto digital music players. The assets can be organized into an appropriate hierarchy, for example, genre, artist, and/or album, among other criteria. The songs and the particular organization is determined by the provider of the preloaded available content, i.e., by the provider of the panoplex. Digital music has the advantage of being fully self-contained. All the information and references required for playback of a particular song are included in the single file containing the digital version of the song. Removal of a file representing one song does not affect the ability of other songs represented by other files to be played back. Thus, interoperability of the content of the panoplex is generally not a significant concern when the soft assets are self-contained in this way.

In other contexts, i.e., when the panoplex includes computer programs that share resources such as DLLs, such interoperability of the constituent soft assets of the panoplex can be a significant concern. This concern is addressed below.

Duplication of the panoplex from master disk 106 at block 412 (see FIG. 4B above) onto end-user disk 108 can use the fastest copying available—disk-image software copying, bit-by-bit, or sector-by-sector copying, or file-by-file copying. In some embodiments, this copying of the panoplex data onto end-user disk 108 is done by the disk-drive manufacturer as the last step of assembly and testing (e.g., as the last test data pattern that is written to the disk drive and then read back to check that the writing operation performed correctly). Copying may be done by specialized media-duplication machines or regular computer hardware. Disk-to-disk copying via computer, as in the case where the panoplex is copied onto a bare drive already installed in a computer, may use a tool like Microsoft® WinPE to assist and use disk-cloning software, such as Symantec Ghost, to make copies. Since the entirety of the panoplex is duplicated at block 412, block 412 can be readily automated, creating many cloned disk copies of the data of master disk 106, without significant human intervention. In fact, as shown in the example discussed above, such cloned disks can be installed, packaged, and shipped for near instantaneous, in-plant, in-store, or in-home, as described below, customization.

A significant benefit of using disk-image copying in duplication of master disk 108 is that a disk image can be captured and stored in a larger disk, several spanned disks, or an array of disks. For example, a large, 300-GB disk can store several disk images of master disks of smaller capacities, e.g., 60 GB. In addition, a virtual disk can be used in lieu of an actual hard drive. Such a virtual drive can substitute for multiple smaller physical drives or enable creation of a panoplex that is larger than the capacity of a real physical drive.

Figure 4D:
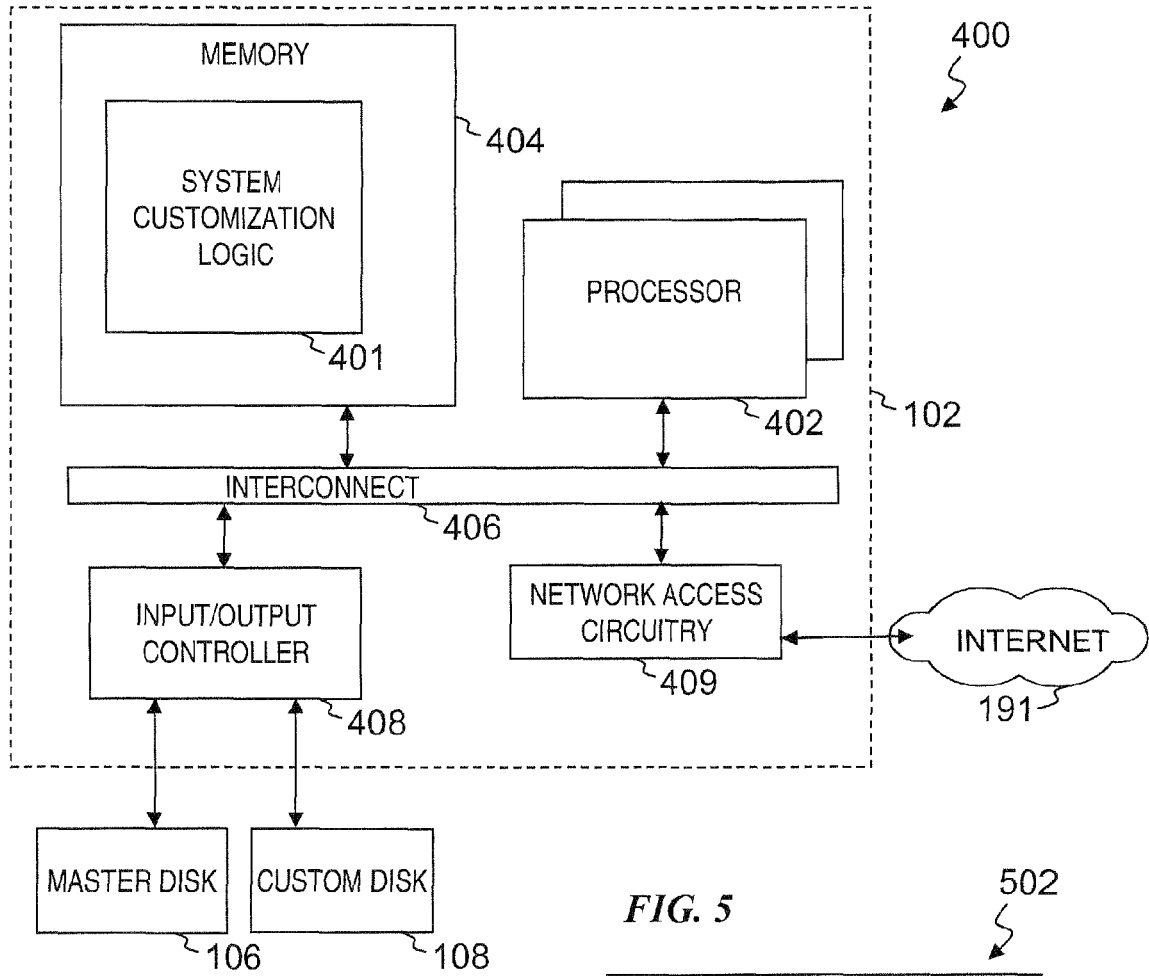
FIG. 4D is a block diagram illustrating some of the components 400 of the dispensing computer 102 of FIG. 4A.

FIG. 4D shows a block diagram of a system 400 having dispensing computer 102. In some embodiments, dispensing computer 102 includes one or more processors 402 that retrieve data and/or instructions from memory 404 and execute retrieved instructions in a conventional manner. Memory 404, in various embodiments, can include persistent memory such as magnetic and/or optical disks, ROM, and PROM, and volatile memory such as RAM. One or more processors or microprocessors 402 and memory 404 are connected to one another through an interconnect 406, which is a bus in this illustrative embodiment. Interconnect 406 is also connected to an input/output controller 408 and network-access circuitry 409. Input/output controller 408 can be coupled to one or more input and/or output devices including as input devices, for example, a keyboard, a keypad, a touch-sensitive screen, a proximity sensor, a motion sensor, a mouse, a microphone and including as output devices a display—such as a liquid crystal display (LCD)—and one or more loudspeakers. In addition, input/output controller 408 is coupled to master disk 106 and end-user disk 108 (e.g., one of a plurality of end-user disks to which a panoplex is to be copied and gryphed). Accordingly, processors 402 can cause input/output controller 408 to execute reading and writing operations on master disk 106 and end-user disk 108. As described briefly above, the panoplex on master disk drive 106 can be replaced with a disk image thereof stored in memory 404 or, alternatively, within another computer accessible through a computer network (e.g., within an array of disks in network-attached-storage (NAS) device).

In some embodiments, dispensing computer 102 is coupled to a network, such as a LAN, SAN, or WAN, including the Internet, for example. Some or all of such a network may be wireless, as with a cellular phone, Wi-Fi or Wi-Max network. Accordingly, network-access circuitry 410 can send and receive data through such a network. In some embodiments, network-access circuit 410 includes Ethernet circuitry.

System-customization logic 420 is all or part of one or more computer processes executing in processors 402 from memory 404, and performs the functions of logic flow diagrams 410 (FIG. 4B) and 430 (FIG. 4C) in one embodiment.

Computer Software—Content Involving Shared Resources

As described briefly above, some soft assets of master disk 106 can rely on the presence of shared resources stored on master disk 106. Such is particularly true if the soft assets include computer programs that depend on shared resources. In some embodiments, care is taken to promote stability in the panoplex as installed on master disk 106 and as customized on disk 108, particularly stability in execution of the constituent computer programs of the panoplex after one or more non-selected computer programs are removed. In some embodiments, stability is promoted by ensuring that programs are logically isolated in their operations so as not to interfere with the operation of other programs, that their required resources are included in the panoplex on master disk 106, and that resources used by removed programs are not removed from end-user disk 108 during customization, if they are still required by other programs remaining in the panoplex. Concerns regarding stability are addressed primarily in two phases: first, in the creation of the panoplex and, second, in the paring of the panoplex at block 414 (see FIG. 4B).

In creating the panoplex, stability is promoted by limiting the panoplex to only certain content meeting specific requirements and by ensuring proper installation of this content on to master disk 108. In one embodiment, content is required to include an installation script and a removal script. A script is a simple computer program, often expressed in a very high-level procedural scripting language or scripting environment. A removal script is sometimes referred to as an uninstall script. Preferably, both the install script and the removal script of a given soft asset should be executable without human intervention. However, human intervention during execution of the install script for creating the panoplex is tolerable since the panoplex is created once and used many times to create customized disks such as disk 108. Installation and removal scripts are well known and are only described briefly herein to facilitate appreciation and understanding of the described embodiments of the present invention.

Installation of a computer program often includes copying of numerous files to proper locations within a file system. A file system is an organization of a storage medium into files that can be accessed independently of one another. As an example of such installation, a primary executable file (e.g., with an ".exe" file extension in Microsoft operating systems) can be copied to a location in the file system set aside for the computer program. Dedicated resources, such as images, templates, etc., are similarly copied to a location in the file system set aside for the computer program. Other resources, those which may be used by other computer programs such as DLLs and fonts, are typically copied to shared resource locations within the file system and their presence registered and published for use by other programs. Installation of the computer program also typically includes storing data in a program registry, including information for graphical-user-interface (GUI) elements for invocation of the computer program to be made available to the user. In the context of a Microsoft Windows operating system, such data stored during installation can add an entry in the well-known "Start" menu and/or add an icon to the desktop for invocation of the installed computer program.

Execution of the installation script causes each of the files associated with installation of the computer program to be copied or moved to their respective proper locations within the file system. In addition, such execution stores the data in the appropriate registries and/or locations to render the computer program capable of easy invocation and proper execution.

Execution of a removal script, in some embodiments, causes removal of the subject computer program, dedicated resources, and the related data in the registries and elsewhere. In addition, execution of the removal script, in some embodiments checks to see if any other computer program requires each of the shared resources and removes each shared resource that is not required by another computer program.

With Microsoft operating systems, installation and removal functions can be implemented as an MSI package (a Microsoft® Windows® Software Installer having an ".msi" file-name extension). An MSI package provides self-describing database tables and the computer program, along with all dedicated and shared resources and the appropriate installation and removal instructions. In Unix and Linux and similar operating systems, installation and removal scripts, resources, and the computer program can be included in packages that can be installed and/or removed using such package management systems as the "dpkg" Debian package manager (a GNU General Public License or Linux software package available at www.debian.org) and/or the "rpm" or Red Hat package manager (available at www.rpm.org or www.redhat.com).

In some embodiments, the panoplex is constructed on master disk 106 by (i) installing an operating system and (ii) executing the installation scripts of each and every computer program to be included in the panoplex. Both the Debian and Red Hat package managers ensure that similar installation scripts for each and every required resource, generally referred to as a package dependency, are executed or fail. In addition, conflicts represented by incompatible dependencies of packages to be installed are detected and avoided by failing any installation that would result in such a conflict. An MSI package includes the required resources, as specified by the software publisher. Care should be taken, by conscientiously following Microsoft-recommended best practices, to avoid installing any required resource that would supersede any required resources of any other computer programs.

In some embodiments, removal of non-selected extraneous computer programs at block 416 (FIG. 4B) is accomplished by execution of removal scripts specific to the extraneous computer programs to be removed. Both the Debian and Red Hat package managers provide for removal of packages, including removal of any packages dependent upon the removed packages. An MSI package typically includes an uninstall script, execution of which properly removes the computer program of the MSI package. The installation and removal scripts can be provided by the producers of the various computer programs to be included in the panoplex.

In other embodiments, the installation and removal scripts can be constructed by a single entity, namely, the entity creating the panoplex, to ensure proper installation and removal of each computer program of the panoplex. In some such alternative embodiments, each computer program of the panoplex is installed onto a clean system on master disk 106, i.e., a system in which only the operating system has been installed onto an empty master disk 106. A clean system can be real or virtual, the latter created, in some embodiments, using a product like VMware Workstation. Comparison of the entire state of master disk 106 prior to and immediately after installation shows which files are changed and which registry entries are changed. MSI packages for installation and removal of the computer programs are created to accurately represent these changes.

In some embodiments, the operating system of the panoplex is the Windows XP operating system and its successors. In some embodiments, the installation and removal scripts are developed and managed by non-Microsoft tools (e.g. Wise Package Studio or Macrovision InstallShield). In some embodiments, the installation and removal scripts are Microsoft MSI packages that comport with Microsoft's guidelines for Component Object Model usage, to ensure backwards compatibility, embedding and maintaining correct resource version information, comparing of respective versions of a resource before overwriting one version of a resource with another, installing resources to a shared directory, and registration of files.

Figure 5:
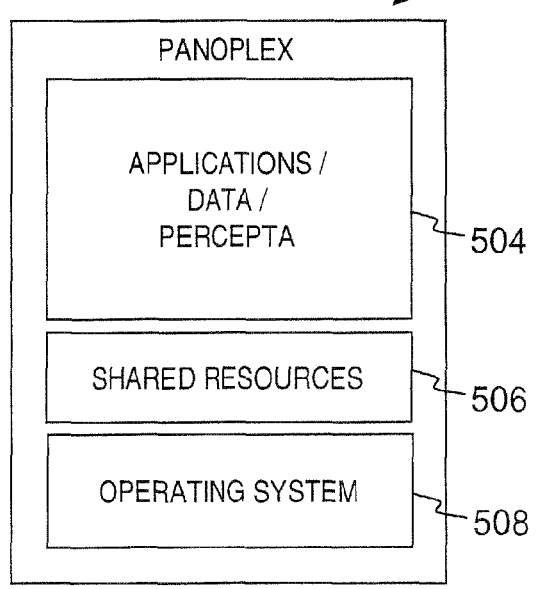
FIG. 5 is a block diagram of the panoplex 502 duplicated in FIG. 4A, FIG. 4B, and FIG. 4C in one illustrative embodiment.

FIG. 5 shows a panoplex 502 of some embodiments in diagrammatic form. In some embodiments, panoplex 502 is the panoplex stored on master disk 106. At its logical and functional foundation, panoplex 502 includes an operating system 508. Operating system 508 provides basic resources and provides general, basic functionality of a computer, e.g., computer 104. Applications 504 are computer programs that provide specific functionality. Examples of applications 504 include word-processor programs, spreadsheet programs, database programs, graphical-image-manipulation programs, music-creation, music-editing, and music-playback programs, and the like. As is well known, these are all end uses of a computer and are typically provided by applications 504. Shared resources 506 provide intermediate levels of functionality. Examples of shared resources 506 include libraries of executable modules that can be leveraged by applications 504 to provide such intermediate functionality as file management, window management, graphical-user-interface (GUI) tools, etc., as well as soft assets such as fonts, icons, sounds, graphics, etc.

Figure 6:
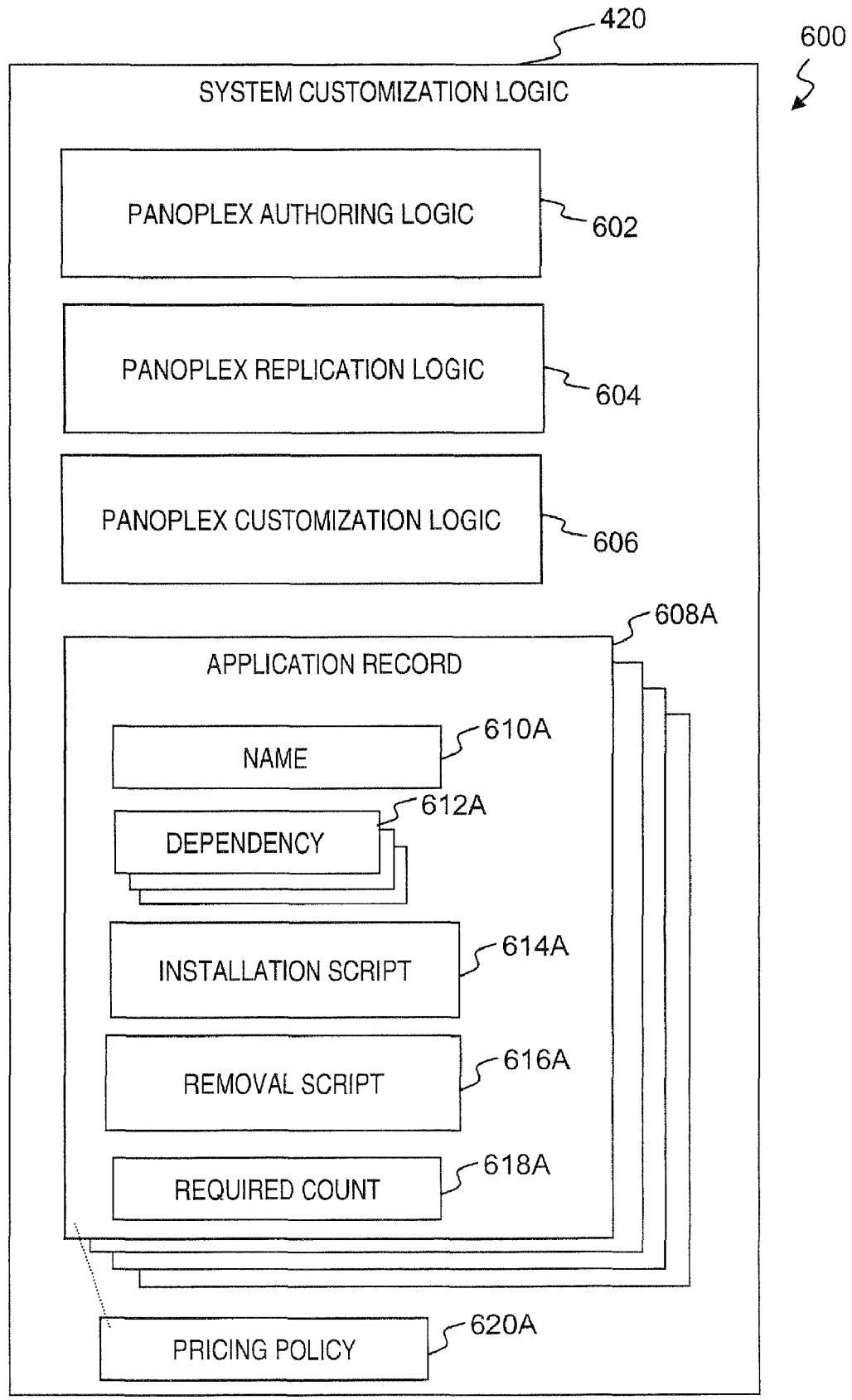
FIG. 6 is a block diagram of system-customization logic 600 of FIG. 4D in greater detail.

FIG. 6 is a block diagram of a system 600 having system-customization logic 420 (of FIG. 4D) in greater detail. System-customization logic 420 includes panoplex-authoring logic 602, panoplex-replication logic 604, panoplex-customization logic 606, and a number of application records such as application record 608A. While panoplex-authoring logic 602, panoplex-replication logic 604, and panoplex-customization logic 606 are shown to be part of system-customization logic 420 and therefore executing in a single computer system, it should be appreciated that in other embodiments panoplex-authoring logic 602, panoplex-replication logic 604, and panoplex-customization logic 606 can be implemented in separate respective computer systems and can execute independently of one another. In addition, application records such as application record 608A can be stored in a database accessible by panoplex-authoring logic 602, panoplex-replication logic 604, and panoplex-customization logic 606. In some embodiments, the database is stored within panoplex 502. In some embodiments, system-customization logic 420 includes an application record for each application included in panoplex 502 that can be removed by non-selection by the user. Application record 608A is representative of each of the application records included in some embodiments of system-customization logic 420.

In some embodiments, application record 608A includes a name 610A that is unique among the respective names of the application records of system-customization logic 420 and that, in some embodiments, serves as an identifier of application record 608A. Application record 608A includes data representing a number of dependencies, e.g., dependency 612A, each of which identifies another application record of system-customization logic 420. For proper functioning, the application represented by application record 608A requires that the application identified by dependency 612A is properly installed. Dependencies such as dependency 612A can be represented implicitly within installation script 614A and removal script 616A, which are described below. For example, installation script 614A can cause installation of a required resource and representation of the dependency in a registry, and removal script 616A can remove the dependency from the registry.

In some embodiments, application record 608A includes an installation script 614A and a removal script 616A, execution of which installs and removes, respectively, the application represented by application record 608A. In some embodiments, application record 608A also includes a required count 618A which represents the number of other applications for which the application of application record 608A is a prerequisite. Required count 618A can be omitted if a registry or other component of operating system 508 maintains similar information enabling determination that a particular resource is no longer needed when all dependent applications have been removed. In addition, in some embodiments, application record 608A includes a pricing policy 620A that determines the price to charge for the application of application record 608A. Pricing policy 620A is described more completely below.

FIG. 7 is a logic flow diagram 700 illustrating one manner in which panoplex-authoring logic 602 builds panoplex 502. At block 702, panoplex-authoring logic 602 installs operating system 508. Loop block 704 and next block 708 define a loop in which all available applications of panoplex 502 are processed according to block 706. In each iteration of the loop of blocks 704-708, the particular application processed is sometimes referred to as the subject application.

At block 706, panoplex-authoring logic 602 installs the subject application using the installation script of the subject application, e.g., installation script 614A. In some embodiments, installation script 614A is an MSI script, execution of which includes installation of any required resources such as DLLs and soft assets. In an alternative embodiment, panoplex-authoring logic 602 identifies and installs all required resources recursively in block 706.

Processing transfers through next block 708 to loop block 704 in which panoplex-authoring logic 602 processes the next application according to block 706. When all available applications have been processed by panoplex-authoring logic 602 according to the loop of blocks 704-708, processing according to logic flow diagram 700 transfers to block 710.

At block 710, panoplex-authoring logic 602 stores removal scripts, e.g., removal script 616A, for all applications in panoplex 502. This constitutes a preferred embodiment. In an alternative embodiment, removal scripts are maintained within system-customization logic 420 within memory 404 and not stored within panoplex 502. The advantage of storing removal scripts in panoplex 502 is that panoplex 502 contains all that is needed for removal of extraneous, non-selected content at block 414 (FIG. 4B), such that block 414 can be performed in an entirely different environment from that in which panoplex 502 is created.

At block 712, panoplex-authoring logic 602 cleans panoplex 502 by removing extraneous byproducts of installation. Such extraneous byproducts include temporary files and drivers for hardware components not expected to be used with panoplex 502, for example. In such embodiments, the hardware context of the ultimate operating environment of pared copies of panoplex 502 is known, e.g., computer 104. Drivers for hardware components not included in such an operating environment are extraneous and are removed at block 712.

At block 714, panoplex-authoring logic 602 optimizes panoplex 502 for improved performance. Block 714 can be performed in response to manual direction by a human systems administrator to adjust various performance settings of panoplex 502. Manual optimization is one of the surprising advantages achieved through content customization in the manner described herein. While each duplicated copy of panoplex 502 is ultimately customized to the specification provided by an end-user, each such copy starts as a direct duplicate of panoplex 502. Accordingly, any minor adjustments and improvements of panoplex 502 propagate to all customized duplicates of panoplex 502. In effect, optimized quality is mass-produced for customized goods.

At block 716, panoplex-authoring logic 602 performs regression testing by iteratively removing applications from panoplex 502 and testing for system operation and stability. Block 716 can be performed manually and over an extended period of time. Since panoplex 502 is to be mass-produced prior to customization, the sometimes tedious and expensive process of quality assurance is offset by economies of scale. After block 716, processing according to logic flow diagram 700 completes.

The result is panoplex 502 stored on master disk 106. Panoplex 502 represents a fully functional installation of operating system 508, shared resources 506, and applications 504. When used in a computer like computer 104, panoplex 502 is stable since proper versions of all required resources of applications 504 are properly installed. Master disk 106 is now ready for duplication at block 412 as described above (see FIG. 4B). In a particularly useful embodiment, block 412 is repeated many times to accumulate a large inventory of copies of master disk 106 as a "blank" for subsequent installation in a computer, such as computer 104. The term "blank" is used to indicate that the panoplex stored on each duplicate disk has not been pared and reduced to reflect customization in accordance with choices made by a particular user.

Consider a manufacturer of computers. In one instance, the business plan calls for build-to-order operation. Hard drives are components provided by a disk-drive manufacturer. In one method of this invention, the contract with the drive supplier can include preloading the selected panoplex into the drives and delivering these to the computer manufacturer. Alternatively the drives pass from the drive supplier to a contract manufacturer that loads the panoplex onto a disk. Alternatively, the original-equipment manufacturer (OEM), i.e., the brand-name manufacturer, loads the panoplex onto the drives.

When an order is received from a customer, the order includes an indication of the customer's selection of the desired content. On the production line, the necessary customization is accomplished and the finished machine with the desired programs installed is delivered. In another instance, a manufacturer who builds computers to place in their inventory will store the finished machines; each loaded with the selected panoplex, and will later customize the devices, as needed, before shipping. Further, as will be seen, customization can be carried out in a retail establishment or even at a home or place of business. In each instance, the time-consuming loading operation is done when time is most available, and delivery to a customer is effected more quickly than would be the case were the desired content added after specification.

For duplication at block 412, panoplex-replication logic 604 can perform a disk-image copy, a bit-by-bit or sector-by-sector copy, or a file-by-file copy of master disk 106 to end-user disk 108. For some embodiments in which end-user disk 108 is to be bootable and include computer programs, it is preferred that panoplex-replication logic 604 use a disk-image copy at block 412. As described above, in some embodiments, a disk image of the data on master disk 106 (i.e., the panoplex) is stored within memory 404 to enable disk-image copies to be made of the panoplex in the absence of master disk 106.

In some embodiments, storage media (e.g., end-user disk drives 108) having complete duplicates of the full, un-customized copy of panoplex 502 become parts for inclusion in computers manufactured to customers' specifications, and can be accumulated in an inventory and kept ready for such use. In some embodiments, customization of such a end-user disk 108 (a duplicate of master disk 106) begins concurrently with assembly of computer 104 into which the duplicate will eventually be installed, with receipt of a build order from a seller of customized computers. The build order, in some embodiments, includes hardware specifications, including computer case, processor type and speed; amount and configuration of RAM; and disk-drive type, speed, and capacity, for example. The build order also includes customer-specific information such as the customer's name and time zone, for example. In some embodiments, the build order also includes data identifying which of the available content of panoplex 502 is to be removed (or, alternatively, includes data identifying which content is to be retained, such that the content to be removed is implicitly all the other content).

To start customization of panoplex 502, a disk that includes panoplex 502, e.g., end-user disk 108, is retrieved and coupled to a customization computer while the other hardware of the customized computer is being assembled concurrently. In some embodiments, dispensing computer 102 is the customization computer. Of course, it should be understood that the customization computer can be different than the computer executing panoplex-authoring logic 602 and the computer executing panoplex-replication logic 604. Panoplex-customization logic 606 executes within the customization computer.

Panoplex-customization logic 606 customizes replicated panoplex 502 in a manner illustrated by logic flow diagram 800 (FIG. 8). At block 802, panoplex-customization logic 606 identifies content to be removed from panoplex 502. As described above, such information is included in the build order, in some embodiments. Loop block 804 and next block 808 define a loop in which all extraneous applications of panoplex 502 are processed according to block 806. In each iteration of the loop of blocks 804-808, the particular extraneous application processed is sometimes referred to as the subject application.

At block 806, panoplex-customization logic 606 removes the subject application using the removal script of the subject application, e.g., removal script 616A. In some embodiments, removal script 616A is an MSI script, execution of which includes de-registration of use by the subject application of any required resources such as DLLs and soft assets. In an alternative embodiment, panoplex-customization logic 606 identifies and removes those of the previously required resources no longer required by any remaining application recursively at block 806.

Processing transfers through next block 808 to loop block 804 in which panoplex-customization logic 606 processes the next extraneous application according to block 806. When all extraneous applications have been processed by panoplex-customization logic 606 according to the loop of blocks 804-808, processing according to logic flow diagram 800 transfers to block 810.

At block 810, panoplex-customization logic 606 customizes a registry in operating system 508 of panoplex 502. In particular, panoplex-customization logic 606 includes user-specific data in the registry to make the ultimate completed computer system specific to the user. Such information can include user names, user initials, company name, time zone, serial numbers, user accounts, initial passwords, network specifics, and the like. Block 810 represents another opportunity for optimization of the customized panoplex. In some embodiments, panoplex-customization logic 606 creates a unique initial password for an administrative account and creates a restricted account for casual use of the ultimately completed computer.

At block 812, panoplex-customization logic 606 cleans the registry, thereby removing unnecessary keys, files, file associations, and shortcuts, and checks for registry coherence. Registry cleaning is known and is not described further herein.

At block 814, panoplex-customization logic 606 verifies the presence of all expected files in panoplex 502 after customization in the manner described above.

At block 816, panoplex-customization logic 606 corrects file-type associations within the registry such that all file-type associations refer to applications that remain after removal of the extraneous applications. In one embodiment, the build order includes the user's preferred file-type associations; panoplex-customization logic 606 implements those preferences in the registry at block 816.

After block 816, processing according to logic flow diagram 800 completes. Thereafter, end-user disk 108 (which now contains only the ipselecta 255 of the original panoplex 211) is removed from the customization computer and installed in computer 104 to thereby provide the customized functionality to computer 104. In an alternative embodiment, end-user disk 108 is installed in computer 104 for customization within and by computer 104. In either embodiment, computer 104 is fully customized for, and deliverable to, the user after such customization.

By customizing the panoplex of end-user disk 108 concurrently with the assembly of the other hardware components of computer 104, such customization does not increase the overall build time of computer 104 yet renders computer 104 fully customized to the content choices of the user.

Figure 9:
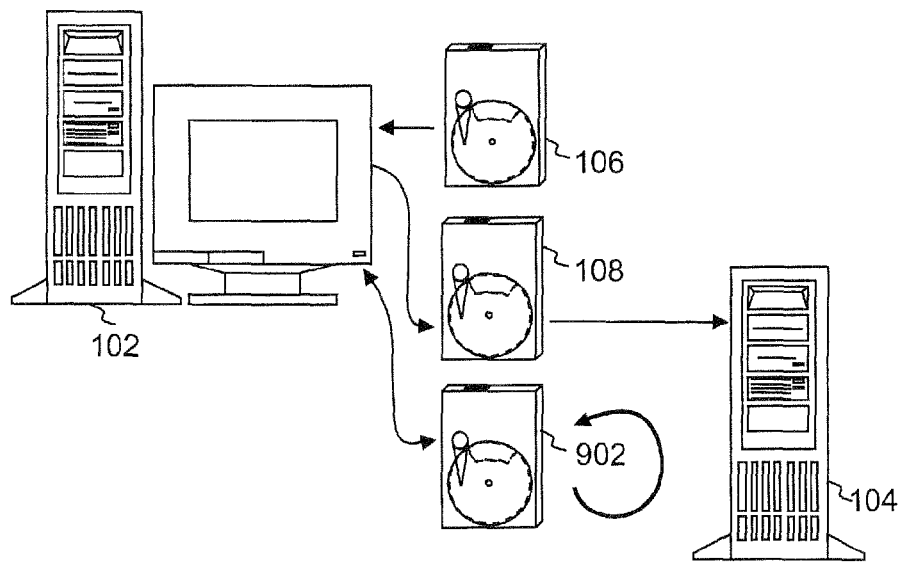
FIG. 9 shows, in diagrammatic form, the customization 900 of a panoplex for storage in a disk of insufficient capacity to store the panoplex in its entirety.

FIG. 9 is a block diagram of a process 900 that can be used for handling large panoplexes. In some embodiments, panoplex 502 can be larger than the capacity of end-user disk drive 108 onto which panoplex 502 is to be copied. FIG. 9 shows an embodiment in which such disparity in capacity between master disk 106 and end-user disk 108 is present. Panoplex-replication logic 604 (as shown in FIG. 6) duplicates panoplex 502 (as shown in FIG. 5) of master disk 106 (as shown in FIG. 9) on to an intermediate disk drive 902 of sufficient capacity to store the entirety of panoplex 502. Panoplex-customization logic 606 (as shown in FIG. 6) customizes panoplex 502 on intermediate disk drive 902 in the manner described above with respect to logic flow diagram 800 (as shown in FIG. 8) and/or with respect to block 414. After such customization, the amount of data in the customized panoplex is sufficiently small to be stored on end-user disk 108. In a manner similar to that described above with respect to block 412, panoplex-customization logic 606 duplicates the customized ipselecta from the original panoplex onto end-user disk drive 108. In general, a disk-image copy will not work when copying from a larger disk to a smaller disk. However, data-image copying, which copies only those sectors containing data, can work. In some embodiments, the duplication process includes media duplication systems, such as those from Logicube, that run software that dynamically scales an image to a different disk capacity (e.g., 190 GB of data from a 500-GB disk drive can readily fit on a 200-GB or 250-GB disk drive with space left over for other data). For file-allocation table (FAT) file systems, such supplication systems can defragment and compress on the fly. A file-by-file copy can ensure the most efficient use of storage capacity of end-user disk drive 108 by not copying unused portions of sectors containing data. In one embodiment, panoplex-customization logic 606 defragments the customized panoplex of intermediate disk drive 902 prior to copying the customized ipselecta to end-user disk drive 108.

Once the customized ipselecta are replicated in end-user disk drive 108, intermediate disk drive 902 can be reused, beginning with replication of data from master disk 106 in a subsequent customization of panoplex 502. In addition, end-user disk drive 108 (which now contains only the ipselecta of the original panoplex stored thereon), is installed in a computer to form a complete and functional, yet fully customized, product (e.g., computer 104 or percepter 105 after gryphing) called the totum.

In other embodiments, more than one panoplex will be customized and installed in computer 104. For example, the primary disk of a desktop machine might include a new-technology file system (NTFS) disk containing the operating system and customized programs while a secondary file-allocation table (FAT) disk holds other soft assets such as music, video, or text.

User Selection of Content of the Panoplex

As described above, the panoplex is customized as specified in user-supplied information. In short, the user chooses some content of the panoplex, thereby implicitly relegating the remainder for removal from the panoplex. In even a modest-sized 40-GB disk drive, thousands of digital soft assets can be installed. In the music-playing cell phone example above, some 20,000 songs could be included in the panoplex of a 60-GB drive. Disk drives of many times that capacity are now available—750 GB—with capacities expected to double almost every year. The problems in easily finding, manipulating, and selecting from such enormous volumes of information expose the weaknesses in current selection and purchase methodologies. In particular, navigation must be made clearer and easier, complex associations must be easier to express, long lists must be indexed better, numerous selections must be easier to remember, searching must enable dynamic and concurrent narrowing of available content, and typing requirements must be minimized. Accordingly, an improved user interface to assist the user in navigating the vast amount of data for selection is important. Those improvements are described below.

A word regarding the environment in which the user interface is used is helpful to understanding and appreciating the described content-customization system. In the previously described embodiment, in which the panoplex is customized by a computer manufacturer, the selections made by the user are included in the build order. In some embodiments, the selections are made through a conventional web browser used by the user and the user interface is implemented by a web-based application implemented by a server that collects data to construct the build order and to forward the build order to the manufacturer. It should be appreciated that selection of desired soft assets can also be made automatically on behalf of an enterprise customer making an order. Appropriate content can be selected for each respective end-user within the enterprise according to such characteristics as his or her organizational rank and/or the function within the enterprise.

In the illustrative example described above in which a customer makes an in-store selection of content to include on a newly purchased digital-music player or music-playing cell phone, the user interface can be implemented within in-store computers serving as kiosks. User selections can be stored on smart cards by the kiosks for subsequent reading and digital-music-player-content customization at the register. Alternatively, each user can manually enter her or his name at the kiosks and the user selections can be communicated along with each user's name through a local area network to the register for subsequent customization of digital-music-player content.

In another embodiment, the computer can be customized after purchase by the user himself or herself. In this embodiment, the user interface is implemented within the computer itself. A pre-selection boot program that forces user selection of desired content is included such that the computer is not usable by the user until selections are made. Payment for selected content can be effected through a network connection. In another embodiment, the device attaches to a network that provides the user interface and authorization for content selection.

In all these embodiments, the selector experiences a user interface through which the user indicates choices by manipulation of one or more input devices. The result is selection data that (i) can be included in a web order; (ii) can be used to generate end-user profiles in a large, enterprise order; (iii) can be sent to point-of-sale equipment for customization of a device at the time of purchase; or (iv) can be used to perform local customization after receipt of the panoplex by the end-user, for example.

Figure 10:
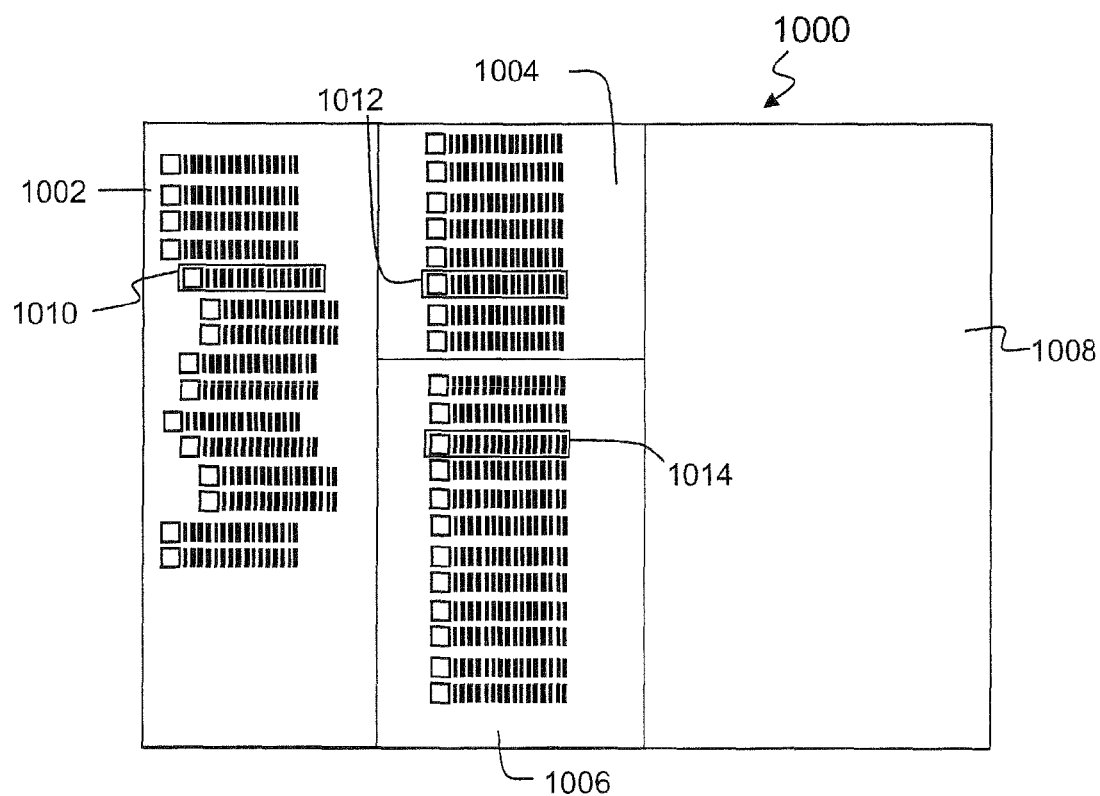
FIG. 10 and FIG. 11 illustrate various panes of a window 1000 and 1100 in a graphical user interface for selection of soft assets of a panoplex.

FIG. 10 illustrates various panes of a window 1000 (e.g., one that could be displayed on a video monitor or other display device) used in one exemplary graphical user interface for selection of soft assets of a panoplex. In some embodiments, window 1000 includes four (4) panes 1002, 1004, 1006 and 1008, each of which is independently scrollable. Scrolling panes of a window is known and not described herein. In this illustrative example, window 1000 implements a user interface for selecting video content of a panoplex. Panes 1002, 1004, 1006 and 1008 can generally be re-arranged, e.g., in accordance with user-specified preferences. However, in some embodiments, pane 1002 includes a checklist of categories; pane 1004 includes a list of instances of a selected category; pane 1006 includes a checklist of occurrences of a selected instance; and pane 1008 displays details of a selected occurrence.

In the context of selection of video content, categories listed in pane 1002 can include such things as genre, actor, producer, title, year of release, etc. Each category can have subcategories shown as indented items in a "tree" view similar to the tree folder structure in the ubiquitous Windows Explorer® included with all Windows® operating systems of Microsoft Corporation. For example, subcategories of the actor category can include male, female, and awards. The subcategory of awards can have further subcategories of winner, nominee, Oscar®, Golden Globe®, etc. In this illustrative example, category 1010 is highlighted as selected and represents the actor category.

Pane 1004 includes a checklist of instances of the selected category, e.g., category 1010. In this example, pane 1004 includes a checklist of actors listed alphabetically. Actor 1012 is shown as selected and highlighted in this illustrative example.

Pane 1006 includes a checklist of occurrences of the selected instance, e.g., actor 1012. In this example, pane 1006 includes a checklist of films and/or television shows in which the selected actor has appeared. Occurrence 1014 is shown as selected and highlighted in this illustrative example.

Pane 1008 includes general information regarding selected occurrence 1014. In this example, pane 1008 includes general information about the particular film represented by occurrence 1014. Such general information can include, for example, the title, appearing actors, producer, director, genre, year of release, a representative image (e.g., artwork from a poster or a DVD cover), a brief summary such as what appears on a DVD cover, and perhaps a review of the film. In some embodiments, pane 1008 or another pane shows an indication of price for each possible selection. In some embodiments, prices will change, depending on other selections that have been purchased (e.g., for example, providing a volume discount for purchasing more selections.

Selections made by the user in any of panes 1002, 1004, 1006 and 1008 can change the information represented in others of panes 1002, 1004, 1006 and 1008. However, in some embodiments, user choices persist. To fully appreciate the way in which choices persist, it is helpful to consider the choices provided to the user in this illustrative user interface.

Figure 11:
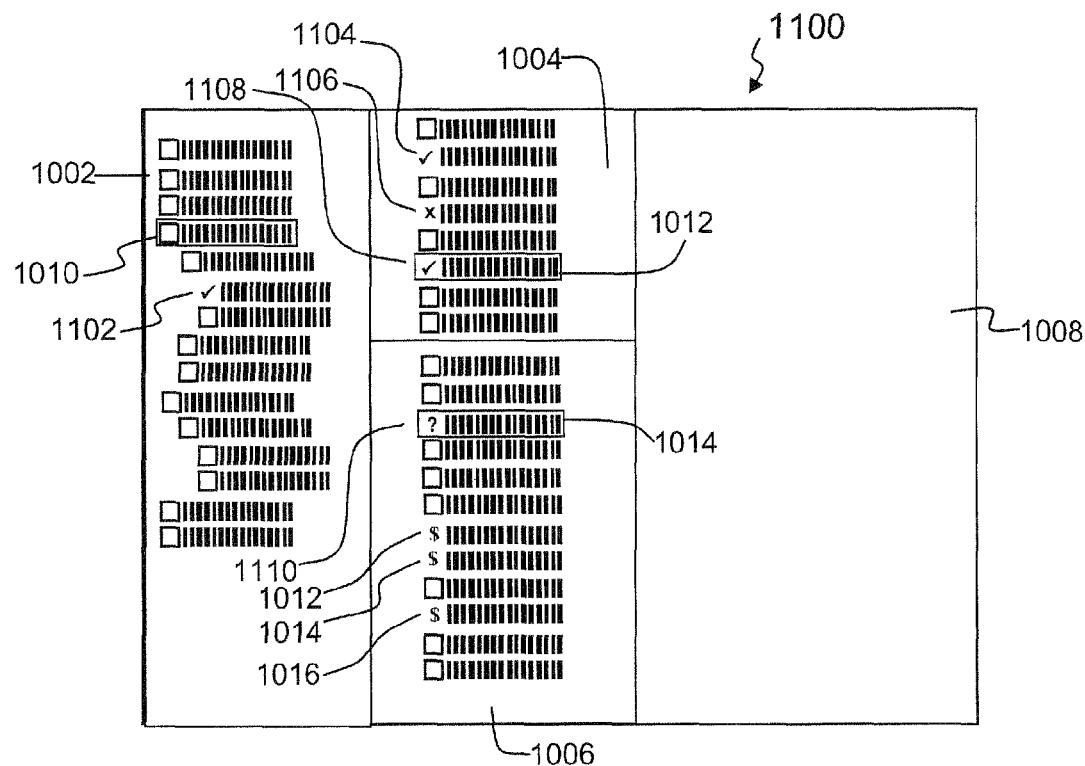

FIG. 11 shows a modified window 1100 (the result of window 1000 in which the user has made some choices). Unlike conventional check boxes, which toggle between two states, a checked state and an unchecked state, in response to actuation by a user, the check boxes of window 1000 cycle sequentially through more than two states, namely, six states in this illustrative example.

Figure 12:
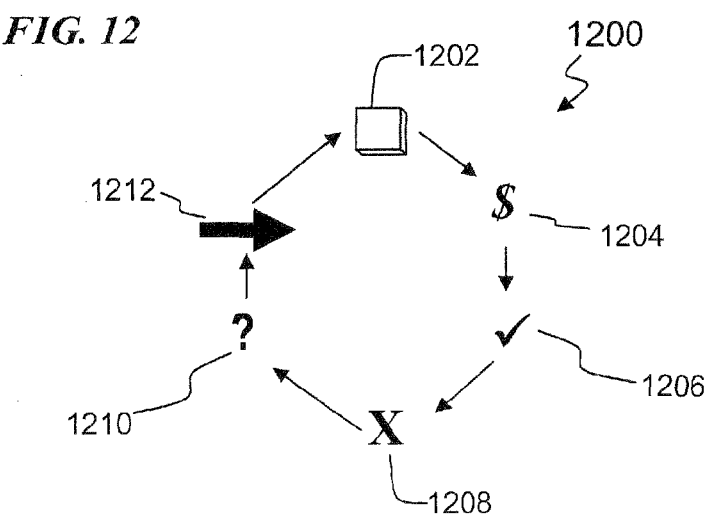
FIG. 12 is a state diagram of various selection states 1200 supported in the graphical user interface shown in FIG. 10 and FIG. 1.

FIG. 12 is a state diagram of state transitions 1200 that are obtained in response to actuation of a check box of window 1000 by the user. In state 1202, the check box is unchecked. This is the initial state of all check boxes in window 1000, in some embodiments. In state 1204, the check box is shown as a dollar sign to indicate that the user intends to purchase the associated item. Occurrences 1112 (FIG. 11), 1114, and 1116 are shown as selected for purchase by the user. In state 1206, the check box is shown as a selection check mark to indicate that the associated item is to be included in the selection criteria for occurrences shown in pane 1006. In the example of FIG. 11, check boxes 1104 and 1108 indicate that occurrences in pane 1006 should include films and/or television shows in which the two associated actors both appear. Check box 1102 indicates that occurrences in pane 1006 should belong to the category associated with check box 1102, e.g., films and/or television shows associated with awards.

In state 1208, the check box is shown as crossed out to indicate that the associated item is to be included as a negative selection criterion for occurrences shown in pane 1006. In the example of FIG. 11, check box 1106 indicates that occurrences in pane 1006 should exclude films and/or television shows in which the associated actor appears. In state 1210, the check box is shown as a question mark to indicate that the user is undecided with respect to the associated item. In some embodiments, the user is prompted to review all items designated as undecided prior to finalizing the selection. In essence, when designating an item as undecided, the user is asking to be reminded of the need to return to the item and make a final decision upon finalization of the entire selection process, as if to say, "Please don't let me leave this process without reconsidering this item." In the example of FIG. 11, check box 1110 indicates that the user is undecided about occurrence 1014 and would like to be reminded to reconsider this choice prior to finalizing all selections. In state 1212, the check box is shown as an arrow to indicate a change in perspective. This change in perspective within the user interface of FIG. 10 and FIG. 11 is sometimes referred to as pivoting and is described more completely below.

The user changes the state of a check box by simply clicking on the check box. On each clicking by the user, the state changes in the manner shown in state diagram 1200. As an alternative, the user can right-click on the check box to see a pop-up menu in which the states of state diagram 1200 are presented to the user for selection.

In some embodiments, pane 1008 includes active text, much like a hypertext link on a conventional web page. Clicking on such active text causes pivoting. Consider an example in which the user clicks on the director's name in pane 1008 with panes 1002, 1004, 1006 and 1008 in the states described above, with the actor category selected in pane 1002, pane

1004 listing actors, and pane 1006 listing films and/or television shows in which the selected actors have appeared. When the user clicks on the director's name in pane 1008, a new perspective is created around the director's name. The "actors" category is de-selected and the category of "directors" is now selected. Pane 1004 is changed to include a checklist of directors. The item of the list pertaining to the director whose name was clicked in pane 1008 is selected and highlighted, automatically scrolling to show the director's name in the list of pane 1004 if necessary. Pane 1006 is changed to include films and/or television shows directed by the selected director. The particular film or television show represented in pane 1008 shows as selected and highlighted, automatically scrolling to show the film or television show in the list of pane 1006 if necessary.

The user may also right-click on active text in pane 1008. In response, a pop-up menu allows the user to select from one of the states of state diagram 1200 (FIG. 12). The states can be represented by the icons shown in state diagram 1200 and/or by textual descriptions of the states, e.g., "Clear any actions for this director," "Buy all work by this director," "Show work by this director," "Hide work by this director," "Remind me to reconsider this director," and "Shift focus to this director" for start-anew state 1202, purchase state 1204, selection state 1206, de-selection state 1208, tentative state 1210, and shift-focus state 1212, respectively.

The states represented in modified window 1100 (FIG. 11) persist. In particular, the particular state of state diagram 1200 for a particular category, instance, or occurrence remains unchanged when the category, instance, or occurrence is no longer visible and subsequently becomes visible again.

In addition, the lists of panes 1002, 1004, 1006 and 1008 are dynamic in that changes in states of items in any pane are immediately and automatically reflected in others of panes 1002, 1004, 1006 and 1008. For example, if the user has previously selected (at selection state 1206) the category of awards and then selects (again at selection state 1206) the category of genres, pane 1004 immediately and automatically changes from a list of works that are associated with awards to a list of genres of works. If pane 1004 includes a list of actors and an additional actor is selected (yet again at selection state 1206), the works listed in pane 1006 are immediately and automatically pared down to include only those works in which the newly selected actor has also appeared. If a different work is selected in pane 1006, pane 1008 is immediately and automatically updated to show information regarding the newly selected work.

In addition to being able to change states of individual items, the user is presented graphical-user-interface elements to allow changing the state of all items in a particular pane, such as pane 1006. This allows the user to use the user-interface elements above to create a list in pane 1006 of all works meeting certain criteria, e.g., all romantic comedies in which Meg Ryan and Tom Hanks appeared. The user can then change all works listed in pane 1006 to a particular state, e.g., state 1204 indicating that the works are to be purchased.

As the user adds items to be purchased (at purchase state 1204), a running total is updated to reflect the cost to the user if the user were to finalize all selections at that time. In one embodiment, a second total is given that includes all uncertain items (items that have been checked as "uncertain" or "undecided" at tentative state 1210) and a difference between the two totals. This allows the user to compare various collections of content.

The interface also provides limitation via paired sliding controls that provide dynamic constraints to the otherwise-chosen search results. Such limitations can be placed on any ordered dimension, such as release date. By sliding to the extreme right, a user could constrain selection to new releases. By sliding in the other direction, she could limit the selection to classics. This versatile approach can be used with metrics such as price, popularity, audience, program length, and the like.

As long lists may need to be traversed to locate desired entries, a single sliding control can be used to alpha-numerically index into a table without need for keystrokes or mouse clicks. This locating tool acts as an electronic thumb index and can be integrated into the pane scroll bar.

Due to the abundant choice expected to be offered to the user, the user interface provides the ability to save a current selection and to re-load the saved current selection at a later time. This provides the user with the opportunity to carefully evaluate and research various options of the selection.

Goal-Driven, Dynamic Pricing

Hardware and software are economically complementary goods. Making software cheaper makes the hardware that runs it easier to sell. Hardware devices are more expensive than most individual software programs or percepta, but support lower profit margins. Options for a hardware device like a notebook computer, e.g., more memory, a larger drive, an extra battery, some cables, a carrying case and a printer are limited. However, the programs and other soft assets in a panoplex, as illustrated in the music-playing cell phone above, are virtually unlimited and support higher profit margins on both the immediate sale and on follow-on upgrades.

Selling a device with an accompanying selection of soft assets together provide a device manufacturer the benefit of considerable latitude pricing the total sale. Additionally benefits also incur, as the customer is already buying a new device, the marketing acquisition cost for the software is nil. As hardware sales dwarf software sales, the economies of scale are high compared to other software sales business models, whether based on clicks or bricks.

Pricing approaches can vary by cost, perceived value, or market rate. Pricing can provide signals as to quality of an item. Relative pricing can steer a purchaser from a low-margin product to higher-margin products. By dynamically pricing, a vendor can alter the likelihood, size, product mix, and profitability of a potential sale. Furthermore, by dynamically aggregating the flow of such sales along particular characteristics, a company can continuously steer towards attaining complex, and sometimes conflicting corporate goals. The general psychology of pricing favors setting a reference price and making reductions relative to that reference price, i.e., a "sale." Thus, prices in a broad sense includes sticker price, rebates, discounts, coupons, freebees, two-for-one offers, and the like. Reductions can be event-driven and time-limited to spur a customer to a desired action.

The total price is updated by applying sets of rules, "i.e. the pricing policies," to all selected content (those items that have been checked as "to purchase" at purchase state 1204). Each pricing policy, e.g., pricing policy 620A (FIG. 6) or pricing rules 244 (FIG. 2A) or pricing engine 1300 (FIG. 13), specifies conditions and associated pricing. A very simple pricing policy is fixed pricing, wherein the price of the associated content is fixed and remains the same regardless of other circumstances surrounding the selection. A slightly more complex pricing policy is bundling pricing, in which the price is one value if another item is not selected and another, lower value if the other item is selected. Consider as an example that the Microsoft Visio® drawing program is one price if the Microsoft Word® word-processing program is not selected and another, lower price if the Microsoft Word® word-processing program is selected. Consider as another example, that if every album by a particular musical artist is purchased, then those albums are priced at a 25% discount.

Another pricing policy that can be represented as pricing policy 620A is a hardware-bundling pricing policy. For example, a CD/DVD-burning application can be offered at a substantial discount, if computer 104 includes a CD/DVD drive capable of writing to disks. Similarly, photo-viewing, photo-editing, and photo-printing software can be discounted in price if the order were to include a digital camera, extra memory, and/or a color printer.

The conditions of a pricing policy are intended to be sufficiently flexible that the entity designing the pricing of the panoplex has great latitude in specifying conditions for various prices. For example, an office suite can have a default price and a much-lower price if a competing office suite is in an undecided state (at tentative state 1210) or, in an alternative pricing policy, if the competing office suite has been viewed for an appreciable amount of time in pane 1008. A "please come back" pricing policy can set a default price and a heavily discounted price if the content was selected (at purchase state 1204) and then subsequently de-selected (at tentative state 1210 or start-anew state 1202).

As another example, a subscription-service provider such as an internet-service provider can provide large subsidies for other content to ensure a long-term service contract—much like rebates sometimes offered by Internet service providers on retail computer equipment. A subscription service provider can offer up to some amount (e.g., $200) of free software in exchange for a long-term contract (e.g., 2 years). Likewise, software publishers can subsidize subscriptions for new releases and updates to be delivered automatically.

In some ways, the content of a panoplex is a time-limited resource like seats on an airline flight or rooms in a hotel. A computer shipped without content is an irrevocably lost opportunity to capture revenue. In addition to the temporal sensitivity of the content, the panoplex content has low variable costs, is a resalable, but perishable, inventory, and has fluctuating demand with known historical data (sales fluctuate with the start of the school year, holidays, release of new operating systems or a new class of high-speed processors). Accordingly, some yield-management pricing approaches used by airlines and the hospitality industry are applicable to sideloading.

Figure 13:
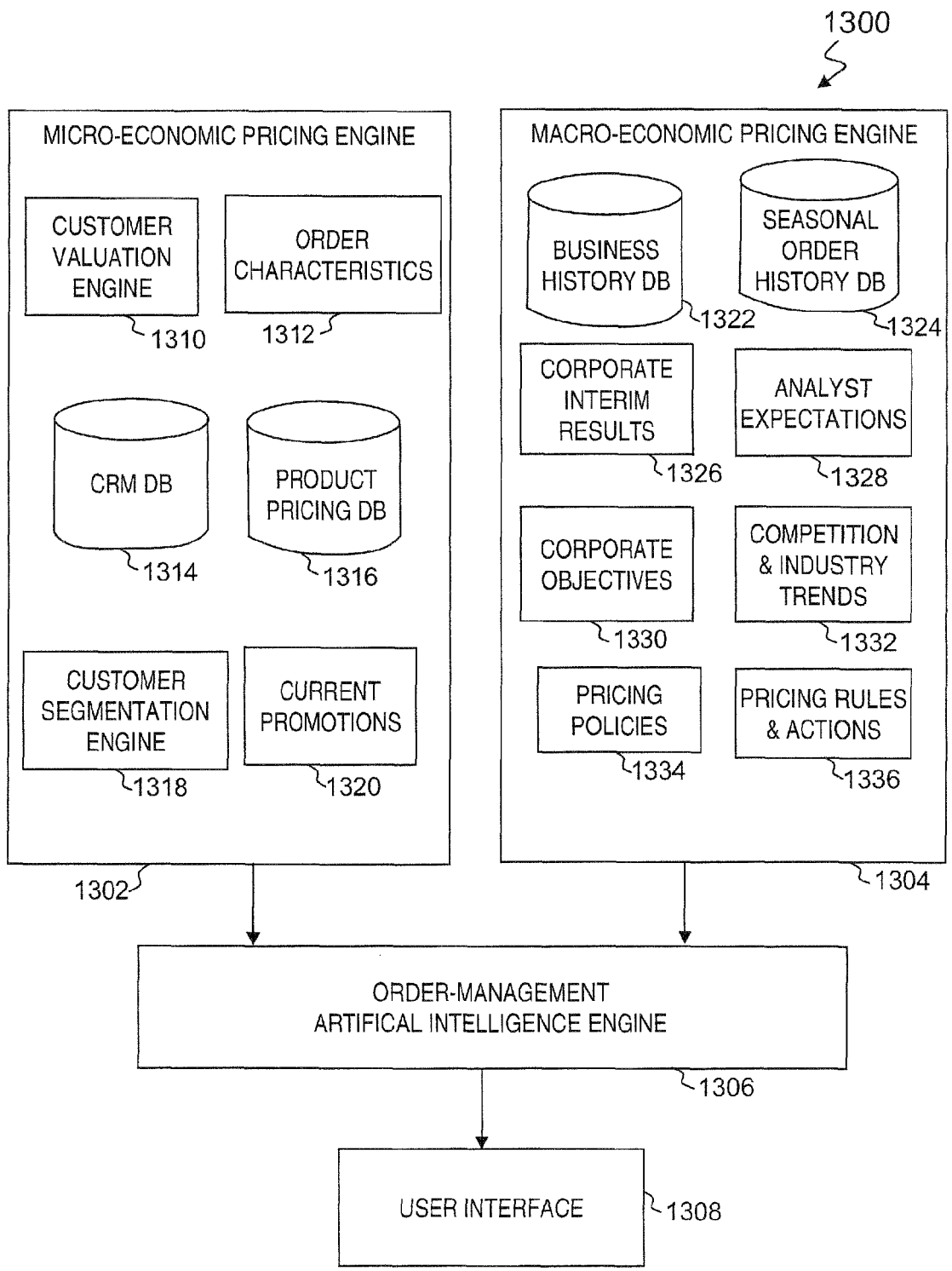
FIG. 13 is a block diagram of a pricing engine 1300 for determining a price of selected soft assets of the panoplex.

FIG. 13 shows a pricing engine 1300 used to implement panoplex pricing (e.g., such as pricing rules 244 shown in FIG. 2A) in some embodiments. In some embodiments, pricing engine 1300 includes a micro-economic pricing engine 1302 and a macro-economic pricing engine 1304, each of which monitors the state of the order and provides pricing information to an order-management artificial-intelligence engine 1306, which in turn provides pricing information to user interface 1308. User interface 1308 controls the user interface described above with respect to FIG. 10, FIG. 11, and FIG. 12.

In some embodiments, micro-economic pricing engine 1302 processes order-centric information specific to the particular user and to the particular selection being made by that user. Customer-valuation engine 1310 determines a particular value of the user-as-a-customer, based on such criteria as past ordering history and prospective future ordering history. In some embodiments, order characteristics 1312 include such information as the size of the current order (e.g., number of customized computers, value of customized computers—high-end versus bargain machines, etc.). Customer-relations-management database 1314 contains the customer history data used by customer-valuation engine 1310 in determining the value of the user-as-a-customer. Product-pricing database 1316 includes pricing information specific to the content of the panoplex and includes pricing policies such as pricing policy 620A (see FIG. 6). Customer-segmentation engine 1318 determines a value of the user as a customer from information other than the user's history as a customer—e.g., using the customer's address information to determine a level of affluence, determining from address information that the user is a business customer or is a private individual customer, etc. Current promotions 1320 represents current, short-term pricing policies and can be used to periodically fine-tune overall pricing policies.

Macro-economic pricing engine 1304 processes information independent of the particular order to influence pricing on a larger scale, e.g., for all sales from a given entity referred to herein as the seller. Business-history database 1322 includes information of various economic metrics of the seller and/or of the industry in which the seller participates. Seasonal-order-history database 1324 represents buying patterns over time—identifying patterns specific to holidays, the start of the school year, beginning/ending of fiscal quarters, and simply the four seasons of winter, spring, summer, and autumn. Corporate interim results 1326 include a recent history of economic performance of the seller. Analyst expectations 1328 include information regarding what financial-market experts expect from the seller and suggest consequent effects in the value of the seller's equity, based on success or failure in meeting those expectations. Corporate objectives 1330 represent large-scale economic objectives of the seller, as measured by, for example, Return on Invested Capital (ROIC) and the like, and may very closely correlate to, or diverge significantly from, analyst expectations 1328. Competition and industry trends 1332 represents tendencies of competitors and the industry and the overall economy generally—e.g., to promote growth at the expense of profit or to promote profit at the expense of growth, and the degree to which to promote one over the other. Pricing policies 1334 and pricing rules and actions 1336 allow for manually crafted adjustments in macro-economic pricing engine 1304.

Order-management artificial-intelligence engine 1306 combines the information, targets, and adjustments of microeconomic pricing engine 1302 and macro-economic pricing engine 1304 to provide an actual offering price to user interface 1308 for display to the user, in response to a change in the current selection. For efficiency, all criteria, independent of the particular details of the order being placed by the user, are evaluated and processed one time to form baseline-pricing properties, such as a base price and/or minimum acceptable margin. Thus, in response to any change in the selection being made by the user, only a fairly modest evaluation of the pricing policies of the specifically selected content is required. The price represented to the user can be updated and redisplayed relatively quickly, giving the impression of immediate response by the user interface.

Soft Assets

FIG. 14 is a flow diagram of a validation process 1400. In some embodiments, software is installed and validated that the install worked correctly. The validation process is used in some embodiments, to verify that a soft asset (such as one or more software programs) will function properly if installed onto a storage medium during a panoplex-generation procedure. In some embodiments, the content of the installation package is examined for items that can conflict with other applications in the superset of soft assets in a panoplex 211. This validation starts at block 1410 (operation v1) where the installation package is opened. At decision block 1412 (operation v2), a check is made for conflicts (some of the items that may cause conflict are Component Object Model (COM)

classes that may be shared with the other applications in the panoplex superset). In some embodiments, if such a conflict is found, the process moves to block 1414 where one requirement for this validation operation is that the program author must change the installation program to use side-by-side objects, and that the Class and SelfReg tables for the installation process contain no entries.

In some embodiments, a decision block 1420 is provided to check whether the installation program requires a reboot or schedules reboot entries as part of the installation, and if so, the process moves to block 1418, and the author (e.g., the software company that created the soft asset) must remove the requirement to reboot. In other embodiments, the requirement for no reboot is dropped and the program may ask for a reboot as part of installation. At decision block 1424, a check is made to determine whether installation of the soft asset creates "permanent components" that would not be erased if the soft asset were uninstalled or removed by gryphing. If so, the process moves to block 1422, and the validation program or its user would validate with the author whether or not the permanent data was unavoidably required to be permanent, and if not, the permanent aspect of that data would need to be removed by the author before the soft asset could be validated or certified to be usable in a panoplex. At decision block 1428, a check is made to determine whether installation of the soft asset is performed by "custom action entries" that would not be transparent as to what action was being performed (i.e., in some embodiments, the validation process requires that all actions performed by the installation program be visible and verifiable by the validation process. If custom actions were being used, the process moves to block 1426, where the validation program or its user would require the author to remove the custom actions and make all actions performed by the installation program be visible and verifiable in order to be validated or certified to be usable in a panoplex. If at block 1428, none of the validation decision blocks (1412, 1420, 1424, and 1428) caused a rebuild of the installation package by the author, then the end block is reached indicating that the soft asset and its installation process were validated to function properly. In the other cases, corrective action would be requested and at block 1416, the author would rebuild the installation package to meet the validation requirements, and the rebuilt installation package would re-enter the process 1400 at block 1410.

Figure 15A:
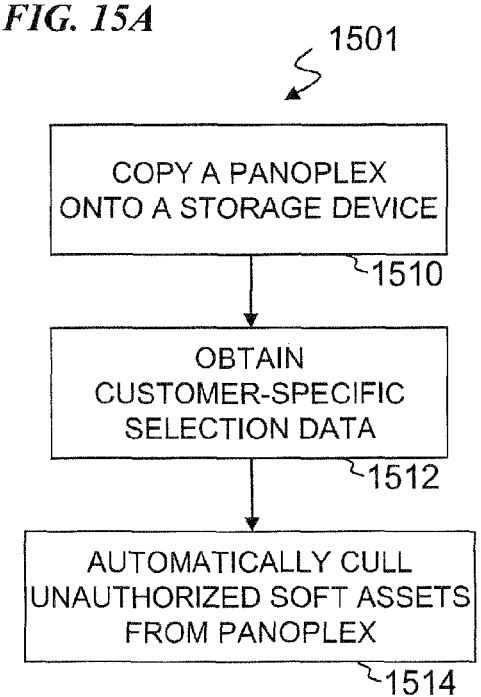
FIG. 15A is a flow diagram of a subtractive-installation method 1501.

FIG. 15A is a flow diagram of a subtractive-installation method 1501. In some embodiments, computer-implemented method 1501 includes copying 1510 a panoplex containing a plurality of soft assets onto a storage device; obtaining 1512 customer-specific selection data differentiating an ipselecta of authorized soft assets from a relicta of unauthorized soft assets; and automatically culling 1514 the unauthorized soft assets from the panoplex such that the storage device contains only the authorized assets and storage space is available in place of the unauthorized assets, and wherein the plurality of soft assets is unavailable to the user before the culling operation is performed.

Figure 15B:
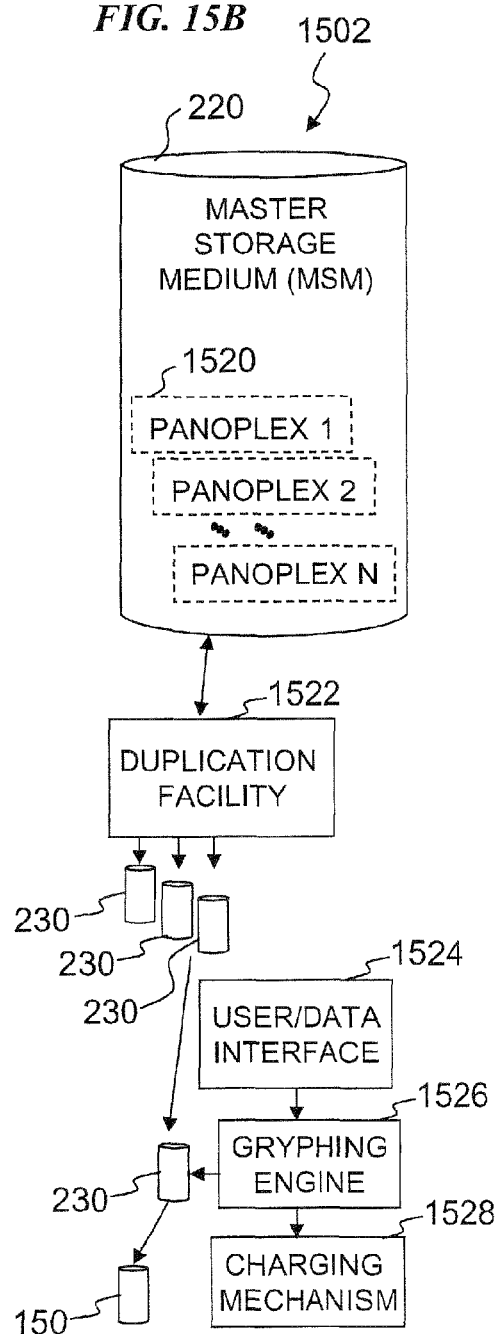
FIG. 15B is a block diagram of a system 1502

FIG. 15B is a block diagram of a system 1502. In some embodiments, system 1502 includes a managed set 220 of one or more digital master panoplex images 1520, each holding a set of soft assets, a duplication facility 1522 coupled to the managed set and operable to transfer an instance of a selected master panoplex image onto a storage device, a data interface 1524 eliciting and receiving selection data for a customized subset of soft assets in the selected master panoplex image, a gryphing engine 1526 operable to selectively remove certain assets from the storage medium based on the selection data, and a charging mechanism 1528 operable to charge a selected account an amount of money based on the selection data, and to authorize delivery of a device that uses the soft assets available on the storage medium to a consumer.

FIG. 15C is a flow diagram of a method 1503. In some embodiments, method 1503 includes a computer-implemented method including providing 1530 a computer-readable master storage medium having a plurality of panoplexes stored thereon including a first panoplex that includes a first plurality of installed soft assets and a second panoplex that includes a different second plurality of installed soft assets, providing 1532 a first computer-readable and computer-writable end-user storage medium, obtaining 1534 data that specifies a first selected one of the plurality of panoplexes, and writing 1536 the first selected panoplex to the first end-user storage medium, wherein the first plurality of installed soft assets are unavailable for use until a further operation uninstalls a subset of the soft assets. In other embodiments, this method is performed in a different order than that shown, for example, the providing 1532 a first computer-readable and computer-writable end-user storage medium, and the obtaining 1534 data that specifies a first selected one of the plurality of panoplexes, are performed in reverse order from that shown.

In some such embodiments, method 1503 optionally includes creating the first panoplex by installing the first plurality of soft assets. In some such embodiments, method 1503 optionally includes uninstalling 1535 a set of unselected soft assets from the first-selected panoplex before writing the first-selected panoplex to the first end-user storage medium.

FIG. 15D is a flow diagram of a computer-implemented method 1504. In some embodiments, computer-implemented method 1504 includes generating 1540 a panoplex that includes a universe of separately selectable installed soft assets, copying 1542 the panoplex to each one of a plurality of computer-readable and computer-writable end-user storage media, obtaining 1544 selection data that distinguishes ipselecta (a first subset of the plurality of installed soft assets that are to be retained) from relicta (a second subset of the plurality of installed soft assets that are not to be retained), gryphing 1546 a selected first end-user storage medium (erasing and/or uninstalling the relicta from the end-user storage medium as specified on the selection data), and delivering 1548 the gryphed end-user storage medium.

Example File System Structures

In some embodiments, a storage medium having a FAT32 volume is divided into four areas: the boot record, the File Allocation Tables, the root directory, and the data area. In some embodiments, the boot record is the first 3 sectors of a FAT32 volume. It defines the volume, as well as the whereabouts of the other three areas. If the volume is bootable, then the first sector of the boot record also contains the code required to enter the file system and boot the OS. The File Allocation Table is a series of addresses that is accessed as a lookup table to see which cluster comes next, when loading a file or traversing a directory. For example, if the system had just loaded cluster 23, it would look up offset 23 in the FAT and the address there would be that of the next cluster; typically 24. Because the FAT is such a vital data structure, there are typically two copies (i.e. FAT1 and FAT2) so that corruption of the FAT can be detected and, hopefully, intelligently repaired. The root directory is fixed in length and typically located at the start of the volume (after the FAT), but FAT32 treats the root directory as just another cluster chain in the data area. However, even in FAT32 volumes, the root directory will typically follow immediately after the two FATs. The data area fills the rest of the volume, and is divided into clusters (the size of which depend on the total size of the volume or storage medium); it is here that the file data is stored. Subdirectories are files with a particular structure that is understood by the file system, and are marked as being directories rather than files by setting the "directory" attribute bit in the directory entry that points to it. A file has at least one and usually three components: a directory entry that defines the file, a set of values in the FAT that define the data clusters, if any, and/or none or more data clusters that contain the actual data itself. If a file has zero length, then there are no data clusters or FAT entries associated with it.

In contrast, Microsoft's NTFS (new technology file system) includes several system files, all of which are hidden from view on the NTFS volume. A system file is one used by the file system to store its metadata and to implement the file system. System files are placed on the volume by the Format utility. One embodiment of NTFS directory metadata is shown in the following Table of Metadata Stored in the NTFS Master File Table:

| System File | File Name | MFT Record | Purpose of the File |
|---|---|---|---|
| Master file table | $Mft | 0 | Contains one base file record for each file and folder on an NTFS volume. If the allocation information for a file or folder is too large to fit within a single record, other file records are allocated as well. |
| Master file table 2 | $MftMirr | 1 | A duplicate image of the first four records of the MFT. This file guarantees access to the MFT in case of a single-sector failure. |
| Log file | $LogFile | 2 | Contains a list of transaction steps used for NTFS recoverability. Log file size depends on the volume size and can be as large as 4 MB. It is used by Windows NT/2000 to restore consistency to NTFS after a system failure. |
| Volume | $Volume | 3 | Contains information about the volume, such as the volume label and the volume version. |
| Attribute definitions | $AttrDef | 4 | A table of attribute names, numbers, and descriptions. |
| Root file name index | $ | 5 | The root folder. |
| Cluster bitmap | $Bitmap | 6 | A representation of the volume showing which clusters are in use. |
| Boot sector | $Boot | 7 | Includes the BPB used to mount the volume and additional bootstrap loader code used if the volume is bootable. |
| Bad cluster file | $BadClus | 8 | Contains bad clusters for the volume. |
| Security file | $Secure | 9 | Contains unique security descriptors for all files within a volume. |
| Upcase table | $Upcase | 10 | Converts lowercase characters to matching Unicode uppercase characters. |
| NTFS extension file | $Extend | 11 | Used for various optional extensions such as quotas, reparse point data, and object identifiers. |
| | | 12-15 | Reserved for future use. |

In some embodiments, other metadata is used in the directory structures. In some embodiments, Windows XP and Vista support File System Filter Drivers (FSFD) that layers over a file system driver. A filter driver has the potential to see all file system requests and optionally modify or complete them. A fast secure erase facility for gryphing can be implemented as such a FSFD such that a normal erase command is executed as a fast secure erase when appropriate. In some embodiments, such a FSFD would be activated during gryphing and disabled after gryphing completion. Because this can be implemented as a low-level function and optimized for speed, it can execute very efficiently. In an alternative embodiment, fast secure erase can be implemented using other file systems and directory structures that are known to those of skill in the art, and one of skill in the art, in some embodiments, can readily find and use information on any particular file system and directory structure, and optionally use a low-level operating system or program to directly access sectors, clusters, boot records, and other structures needed to create, read, modify, and/or write data needed in order to gryph a storage medium to erase non-selected soft assets according to the methods described herein for some embodiments of the present invention. Since Windows XP and perhaps other high-level operating systems provide certain "hooks" to access data on the hardware, some embodiments utilize those hooks to fully erase and uninstall non-selected soft assets. For operating systems that do not allow direct and full access to the hardware or which maintain backup copies of erased directory entries or other metadata that allow recovery after storage media failure, in some embodiments, the present invention uses a basic low-level operating system such as MS-DOS, which allows read and write access to any disk sectors on a disk-drive storage medium, including those used by the high-level operating system for its directory.

However, such low-level operating systems or programs can also be used to unerase files and reconstruct data structures (unerase programs are known and readily available with various features and capabilities. Thus, in some embodiments, a fast-secure erase is used by the present invention.

Figure 16:
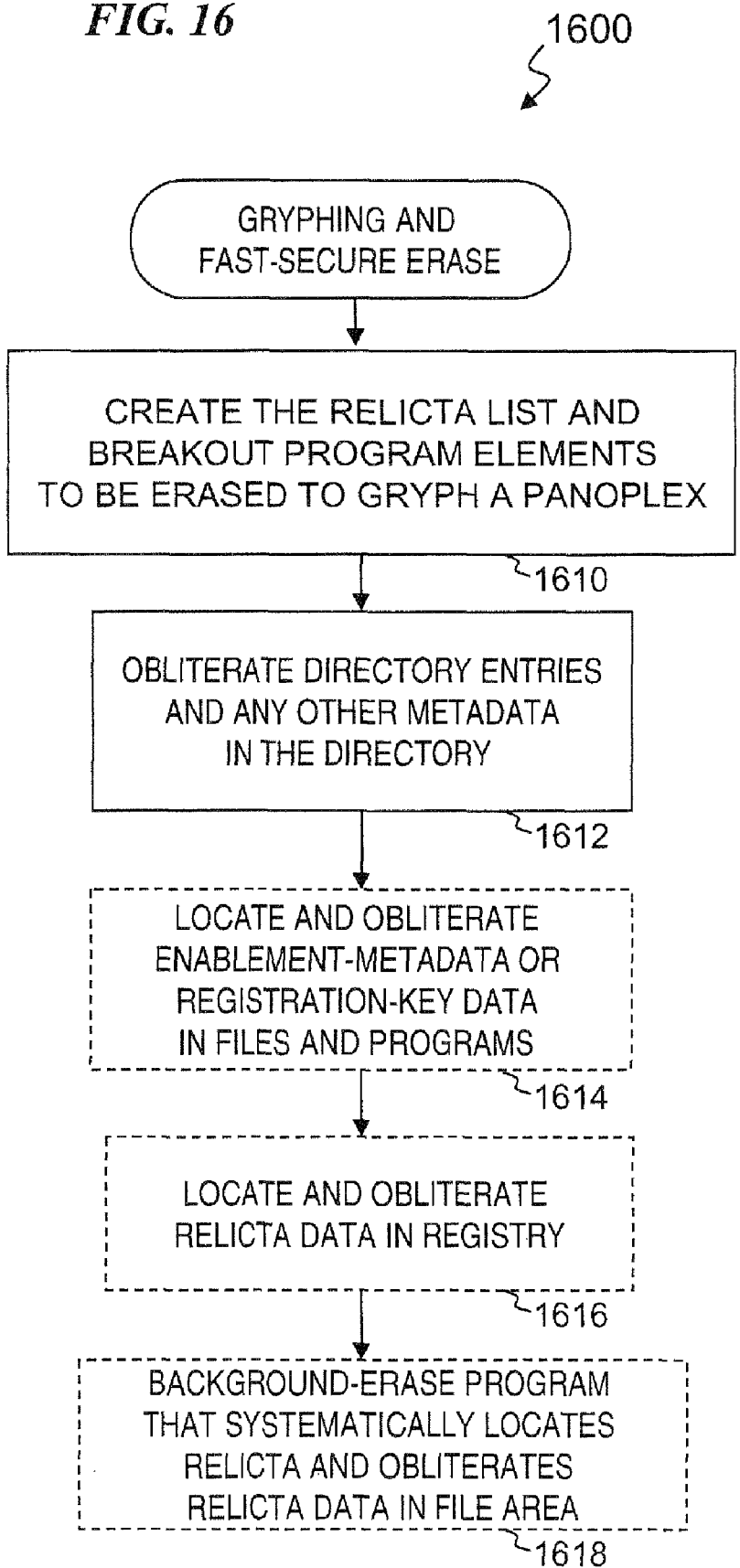
FIG. 16 is a flow diagram of a fast-secure erase method 1600.

FIG. 16 is a flow diagram of a fast-secure erase method 1600 used to enhance system security and make it more difficult to reconstruct erased relicta culled by gryphing. At block 1610, a storage medium having a panoplex is gryphed to remove non-selected soft assets. At block 1612, the process 1600 more fully obliterates directory entries, FAT table cluster linkages, NTFS MFT data, and/or any other metadata in the directory, in order to make it much more difficult to reconstruct erased soft assets that were culled from the panoplex. In some embodiments, the gryphing process creates a listing or table of entries to erase, and the fast secure erase in used instead of a less-secure erase in the first culling operation. In some embodiments, metadata to be culled includes one or more information fields such as file name, E5 erase flag, first cluster location, offsets, file size, data run information and the like. In some embodiments, such directory metadata is overwritten with zeros ("zeroed"), while in other embodiments, any other suitable data patterns (including, in some embodiments, pseudo-random or random data) are used. In some embodiments, the operating system (e.g., Windows XP or the upcoming VISTA) that will eventually run the device having the gryphed storage medium coupled to it may not be able or willing to directly allow such complete obliteration of directory data for the erased soft assets that were culled by the gryphing program (the relicta), and in some such embodiments, a low-level program and/or operating system, capable of directly or indirectly reading and writing to anywhere on the intransient signal carrier or storage medium, is used to provide the capability and function needed to implement the fast-secure erase function.

Further, in some embodiments, at block 1614, the fast-secure erase function also includes a "enablement-metadata-erase" function. Many programs, in order to run, require a specific key (enablement metadata) to be entered that enables functionality of some or all of the soft asset (e.g., Office Suite programs). In some embodiments, the enablement-metadata-erase function operates to locate and obliterate such enablement-metadata or registration-key data that may be located outside the directory metadata.

Further, in some embodiments, at block 1616, the fast-secure erase function also includes a "registry-key-erase" function. Many programs, in order to run, require one or more specific keys (registry metadata) to be entered that enables functionality of some or all of the soft asset. In some embodiments, the registry-key-erase function operates to locate and obliterate such registry-key that may be located outside the directory metadata. In some such embodiments, this function also compresses the remaining registry data or eliminates the spaces previously used for relicta registry data.

Further, in some embodiments, at block 1618, the fast-secure erase function also includes a "background-erase;" a background-running program or function that systematically locates storage-medium sectors or clusters of data which are not used for holding the ipselecta or the data added after gryphing (e.g., the user's new data or programs) and which can be assumed to have held files or other data structures of the relicta, and writes a predetermined data pattern (e.g., zeros, ones, patterns of ones and zeros, and/or pseudo-random or random data) onto those file sectors and clusters. In some such embodiments, a data structure is created during gryphing that specifically identifies the sectors and clusters holding relicta data, and that data structure is used (in conjunction with a checking function that verifies such clusters and sectors have not already been overwritten with new or user data) to direct the background erase.

Thus, in some embodiments, the fast-secure erase 1600 obliterates (e.g., overwrites with other data) all or substantially all the directory metadata associated with identifying and locating relicta (soft assets that were erased by the gryphing program). In some embodiments, the fast-secure erase runs a background-erase program that runs during idle or wait times of the processor, and systematically obliterates the file-data areas (e.g., sectors and/or clusters) where relicta were located. In some embodiments, the fast secure erase includes both obliterating directory metadata as well as obliterating, through a background-erase, the relicta file-data areas.

In some embodiments, because of the potential for conflict, COM classes must be installed in the side-by-side mode that makes them private to the using software application, not shared between all applications. This means that there must be no COM class registration in the installation package for the software application. A Class ID (CLSID) is typically a 128-bit number that represents a unique identifier for a software application or application component. The validation can be implemented using example Visual Basic script as follows, which tests for the presence of entries in the Class and SelfReg tables in the installation package:

```
Database = Installer.OpenDatabase(the MSI installation package)
View = Database.OpenView ('Select CLSID from Class')
View.Execute
Classdata = View.Fetch
If Classdata is Nothing ....there are no CLSID entries
View2 = Database.OpenView ('Select File from Class')
View2.Execute
SelfRegData = View2.Fetch
If SelfRegData is Nothing there are no entries in the SelfReg table
```

At decision block 1420 (operation v3), a check is made for an installation package that causes or would cause a reboot of the computer system, which interferes with the process of creating the superset. If the application in the package is removed from the superset during the CreateFinalSubset API call and causes a reboot, this delays the creation of the final subset and is a hold-up when used during a manufacturing process.

The requirement for validation at this operation is that the execute sequence in the installation package contains no Reboot or ScheduleReboot entries. A Visual Basic script example of this operation is as follows:

```
Database = Installer.OpenDatabase(the MSI installation package)
View = Database.OpenView (' Select Action from
InstallExecuteSequence where Action =
    'Reboot' )
View.Execute
RebootData = View.Fetch
If RebootData is not Nothing there are Reboots
View2 = Database.OpenView (' Select Action from
InstallExecuteSequence where Action =
    'ScheduleReboot'
View2.Execute
SchedData = View2.Fetch
If SchedData is not Nothing there are scheduled reboots in the package.
```

At decision block 1420 (operation v4)—Permanent components should not be added to the computer system when the installation package is installed. A permanent component is one that is not uninstalled when the application is uninstalled. This means that unnecessary files or registry entries would remain on the computer system. These will not be used by the software applications that remain after the CreateFinalSubset API is called, and they occupy disk space.

The requirement at this operation of validation is that none of the components are marked to be permanently installed. A Visual Basic script example of the validation is as follows:

```
Database = Installer.OpenDatabase(the MSI installation package)
View = Database.OpenView ('Select Attributes from Component')
View.Execute
Do
    AttributeRecord = View.Fetch
    AttributeValue = AttributeRecord.IntegerData(1)
    If AttributeValue and 0x0010 is non-zero, the component is
    permanent
Loop until AttributeRecord entries are processed for each component.
```

At decision block 1420 (operation v5)—Custom Actions are custom code that the author of the installation package has added to be run during the install or uninstall of the application. This custom code can break validation because it can violate the rules that prove that the installation package does not conflict with other applications in the superset. As an example, the custom code in a custom action can create a COM registration entry or cause the computer to reboot. The requirement for validation at this operation is that the installation package contains no custom actions.

```
Database = Installer.OpenDatabase(the MSI installation package)
View = Database.OpenView (' Select Action from CustomAction')
View.Execute
CaData = View.Fetch
If CaData is not Nothing there are custom actions
```

In some embodiments, an additional next stage of validation is performed, which includes:

Checking the candidate MSI against the others already in the superset:
Check that the productcode is not in the existing metadata,
Check that the upgradecode is not in the existing metadata,
Check Service names,
Check Environment variables, and
Check File extensions;
and Checking that the uninstall completely removes what is installed.

Security Issues

There are a number of security issues related to the digital-content-distribution system described herein. One has already been addressed, namely, that of protected selection and customization of the panoplex to prevent the user from accessing non-selected content without proper authorization. Another is the issue of secure, yet quick erasure of content from a digital-storage medium. A third, described below, is detection of stolen panoplexes.

Fast, secure erasure seeks a middle ground between ordinary erasure and high-security erasure. Ordinary erasure leaves enough of deleted files behind for reconstruction of such deleted files in a process generally referred to as "undeleting." An unsecure erasure is an undesirable circumstance, since a user could simply not select certain valuable content and thereafter "undelete" the erased valuable content. Defragmentation can defeat simple undelete/unerase programs but is relatively time-consuming. Some high-security erasure techniques typically involve several iterations of writing randomly selected bit values over the previously stored substantive data and metadata to prevent even close examination of magnetic patterns on the surface of the storage medium from revealing the data previously stored on the medium. These multiple iterations are much more time-consuming than either simple erasure or defragmentation.

In some embodiments, the present invention provides an erasure mechanism that is more expensive to defeat than the cost of the erased content. The cost of a conventional undeletion of a conventionally deleted file can be trivial. Accordingly, a more-secure mechanism should be used. The cost of defeating high-security erasure could be many times greater than the value of the erased panoplex content, but the use of high-security erasure exacts a toll on the manufacturer or retailer in terms of throughput (e.g., machines per hour) of the customization process. Accordingly, a more efficient erasure mechanism is needed.

In some embodiments, removal of extraneous content of the panoplex uses a secure, quick erase that overwrites file directory information that would otherwise allow file reconstruction. Such directory information includes any file-in-use flag, file length, file-folder location, and cluster-allocation pointers. Such an erasure foils normal undelete programs and makes any attempt to reconstruct the content more costly than the cost of acquiring the content.

In one embodiment, if the file system of the panoplex is a FAT (File Allocation Table) file system, secure, quick erasure includes making the following modifications to the file as represented in the file system directory structure: (i) marking (changing to a predetermined value) the first byte of the file name, (ii) zeroing data representing the file size, (iii) traversing FAT cluster entries and zeroing all cluster entries traversed, and (iv) zeroing the address of the first FAT cluster. In another embodiment, if the file system of the panoplex is an NTFS (New Technology File System) file system, secure, quick erasure includes making the following modifications to the file as represented in the file system directory structure: (i) zeroing the erase flag of the file, (ii) zeroing data representing the file size, (iii) zeroing all data attributes of the file, and (iv) zeroing the $Bitmap clusters of the file. Other embodiments are possible for other processing environments and other file systems, for example mainframe computing. Secure, quick erasure destroys data used in currently used undelete mechanisms and is far more time efficient than the high-security erasure mechanisms.

This secure, quick erasure can be implemented as a standalone module, a filter driver, or a patch to the conventional erasure routine included in the operating system of the panoplex. If the secure, quick erasure is implemented as a standalone module or as a filter driver, the respective installation and, more importantly, removal scripts of the various pieces of content of the panoplex are modified to use the secure, quick erasure mechanism rather than the conventional, recoverable erasure mechanism. If the secure, quick erasure is implemented by a patch to, i.e., modification of, the conventional erasure routine, it is preferred that the patch is removed following complete customization of the panoplex such that conventional, recoverable erasure is restored and the user's experience thereafter is conventional and as expected.

To detect stolen or otherwise unauthorized use of a panoplex, panoplexes are surreptitiously identified as such. In one embodiment, superfluous content is included in the panoplex and is never removed during customization of the panoplex, regardless of the selections made by the user. Such superfluous content is preferably disguised as required content such that the casual copyist would leave the superfluous content in place for fear of damaging the proper functioning of the panoplex. For example, the superfluous content can be disguised as a DLL and the registry can be modified to indicate that the DLL is required for at least one module of the operating system to prevent removal of the DLL. Another method is to create an unremovable, dummy or stub program for each panoplex, whose MSI table contents log the panoplex creation and software program removal from that panoplex. In some embodiments, masked identification elements are termed taggants.

In another embodiment, percepta, e.g., sound files, images, motion video, etc., are watermarked using a particularly efficient watermarking mechanism such as that described in U.S. Pat. No. 6,209,094 by Earl Levine entitled "Robust Watermark Method and Apparatus for Digital Signals." To identify the panoplex as such, percepta that are required by the operating system and/or valuable to one or more applications likely to be selected by the user are watermarked in this manner. Examples include computer desktop wallpapers, sounds played by the operating system on occurrence of system events such as startup or shutdown, and clipart used by popular office suites. In a panoplex without an operating system, e.g., a hard drive used in a digital music player, a substantial portion, if not all, of the soft content (typically digital music files) is watermarked.

Additional Ramifications

In some embodiments, the present invention provides a method for processing a first storage medium having a pre-written plurality of installed soft assets. The method includes obtaining selection data, and automatically modifying the first storage medium based on the selection data such that, in place of those assets not relevant to the selected assets, erased space becomes available for storage of other data, and selected assets are available as installed. In some embodiments, the installed assets are unavailable to the user unless and until the modifying operation is run (in contrast to a conventional system that might allow a user to delete multiple files after selecting those files, in which case those files would have been available to the user before the delete operation, and would have remained available if the delete operation were not to be performed). Some embodiments further include writing, to the first storage medium, data that includes the plurality of installed soft assets.

In some embodiments, the providing of the first storage medium having the prewritten plurality of installed soft assets includes providing the first storage medium, providing a second storage medium, installing a plurality of soft assets to the second storage medium, and writing, to the first storage medium, data from the second storage medium that includes the plurality of installed soft assets.

Some embodiments include operatively coupling the first storage medium to a device that has not been used by an end user in order that the device after the modifying operation is in an immediately useable state.

Some embodiments include charging a monetary amount to an account (e.g., at that time, deducting an amount from a bank account, debiting a debit account, or charging to a credit-card account) based on the selected content. Some embodiments include invoicing (e.g., creating an invoice that is sent to a user and that requests payment in the future) a monetary amount based on the selected content.

In some embodiments, the modifying of the first storage medium further includes reading directory information from an operating-system directory location, modifying the directory information, and writing the modified directory information to the operating-system directory location.

In some embodiments, the modifying of the first storage medium further includes reading directory information from a location on the storage medium other than an operating-system directory location, modifying the directory information, and writing the modified directory information to the operating-system directory location.

In some embodiments, the modifying of the first storage medium further includes reading directory information from a location other that the storage medium, modifying the directory information, and writing the modified directory information to an operating-system directory location on the storage medium.

In some embodiments, the present invention provides an apparatus that includes a computer-readable first storage medium having a prewritten plurality of installed soft assets, and instructions stored thereon for causing a suitably programmed information processor to execute a method including obtaining selection data, and modifying the storage medium based on the selection data such that, in place of non-selected assets, erased space becomes available for storage of other data, and selected assets are available as installed. Some embodiments further include a computer-run device operatively coupled to the first storage medium and configured to execute instructions obtained from the first storage medium and to write, to the first storage medium, data that modifies the plurality of installed soft assets based on the selection data. In some embodiments, the instructions stored on the first storage medium further cause the method to include charging a monetary amount based on the selected content.

In some embodiments, the present invention provides an apparatus that includes an interface configured to connect to a first storage medium having a prewritten plurality of installed soft assets, means for obtaining selection data, and means, coupled to the interface, for modifying the storage medium based on the selection data such that, in place of non-selected assets, erased space becomes available for storage of other data, and selected assets are available as installed.

Some embodiments further include means for writing, to the first storage medium, data that includes the plurality of installed soft assets.

Some embodiments further include means for installing a plurality of soft assets to a second storage medium, and means for writing, to the first storage medium, data from the second storage medium that includes the plurality of installed soft assets. Some embodiments further include a device that has not been used by an end user, and means for operatively coupling the first storage medium to the device in order that the device, after operation of the means for modifying, is in an immediately useable state. Some embodiments further include means for charging a monetary amount based on the selected content.

In some embodiments, the present invention provides an apparatus that includes an interface configured to connect to a storage medium having a prewritten first set of installed soft assets, an input device configured to receive selection data, and a grypher coupled to the interface and the input device, wherein the grypher is configured to control the interface in order to modify the storage medium based on the selection data such that, in place of non-selected assets, erased space becomes available for storage of other data, and selected assets are available as installed.

Some embodiments further include a storage-medium writer having the first set of installed soft assets stored thereon and operable to write substantially simultaneously to the first storage medium and to at least one other storage medium, substantially identical data that includes the first set of installed soft assets.

Some embodiments further include a storage-medium writer having the first set of installed soft assets and a second set of installed soft assets stored thereon and operable to write substantially simultaneously to the first storage medium and to at least one other storage medium, substantially identical data that includes the first set of installed soft assets, and to write substantially simultaneously to a plurality of other storage medium, substantially identical data that includes the second set of installed soft assets.

Some embodiments further include a mechanism that operatively couples the first storage medium to a device that has not been used by an end user in order that the device after operation of the grypher is in an immediately useable state.

Some embodiments further include a mechanism that charges a monetary amount based on the selected content.

Panoplex

In some embodiments, the present invention provides an apparatus that includes an end-user storage medium having a prewritten panoplex stored thereon that includes a plurality of installed soft assets, wherein the storage medium is configured to be gryphed before first availability of the plurality of installed soft assets, in order to retain an ipselecta that includes a first subset of the plurality of installed soft assets and to erase a relicta that includes a second subset of the plurality of installed soft assets such that only the first subset are available as installed on the end-user storage medium, and storage space from the second subset is available for storage of other data.

Panoplex with Gryphing Program

In some embodiments, the storage medium further includes instructions stored thereon for causing a suitably programmed information processor to execute a method that includes obtaining selection data, and modifying the storage medium based on the selection data such that, in place of non-selected assets, erased space becomes available for storage of other data, and selected assets are available as installed.

Panoplex with Gryphing Program and Charging Mechanism A

In some embodiments, the storage medium further includes instructions stored thereon for causing a suitably programmed information processor to execute a method that includes obtaining selection data, modifying the storage medium based on the selection data such that, in place of non-selected assets, erased space becomes available for storage of other data, and selected assets are available as installed, and reporting a status of the modifying operation to a central facility in order to charge a specified account.

Panoplex with Gryphing Program Inside Disk-Drive Storage Medium

In some embodiments, the storage medium is a disk drive that includes an enclosure, a disk-drive processor mounted to (or affixed to) the enclosure (either directly or indirectly, such as by attaching to a circuit board that is attached to the enclosure or to one or more other things that is/are attached to the enclosure), an external-device interface operatively coupled to the processor and operable to accept data-transfer requests from an external device, and to send data to and receive data from the external device, and at least one rotating disk housed in the enclosure, operatively coupled to the processor, and having stored thereon the panoplex and instructions for causing the disk-drive processor to execute a method that includes obtaining selection data, and modifying the storage medium based on the selection data such that, in place of non-selected assets, erased space becomes available for storage of other data, and selected assets are available as installed.

Panoplex with Gryphing Program Inside Disk-Drive Storage Medium Connected to, for Example, iPod Some embodiments further include an external device operatively coupled to the storage medium, the external device operable to transmit data-transfer requests to the storage medium, and to send data to and receive data from the storage medium, wherein the storage medium is a disk drive that includes an enclosure, a disk-drive processor mounted to the enclosure, an external-device interface operatively coupled to the processor and operable to accept data-transfer requests from the external device, and to send data to and receive data from the external device, at least one rotating disk housed in the enclosure, operatively coupled to the processor, and having stored thereon the panoplex and instructions for causing the processor to execute a method that includes obtaining selection data, and modifying the storage medium based on the selection data such that, in place of non-selected assets, erased space becomes available for storage of other data, and selected assets are available as installed.

Panoplex with Gryphing Program Inside Flash Storage Medium

In some embodiments, the storage medium is or includes a solid-state drive that includes an enclosure, a solid-state-drive processor mounted to the enclosure, an external-device interface operatively coupled to the processor and operable to accept data-transfer requests and to send data to and receive data from an external device, at least one solid-state memory (e.g., comprising one or more integrated-circuit chips) housed in the enclosure, operatively coupled to the processor, and having stored thereon the panoplex and instructions for causing the processor to execute a method that includes obtaining selection data, and modifying the storage medium based on the selection data such that, in place of non-selected assets, erased space becomes available for storage of other data, and selected assets are available as installed.

Panoplex with Gryphing Program Inside Flash Storage Medium Connected to, for Example, iPod Some embodiments further include an external device operatively coupled to the storage medium, the external device operable to transmit data-transfer requests to the storage medium, and to send data to and receive data from the storage medium, wherein the storage medium is a solid-state drive that includes an enclosure, a solid-state-drive processor mounted to the enclosure, an external-device interface operatively coupled to the processor and operable to accept data-transfer requests and to send data to and receive data from an external device, and at least one solid-state memory housed in the enclosure, operatively coupled to the processor, and having stored thereon the panoplex and instructions for causing the processor to execute a method that includes obtaining selection data, and modifying the storage medium based on the selection data such that, in place of non-selected assets, erased space becomes available for storage of other data, and selected assets are available as installed.

Terse Panoplex

In some embodiments, the present invention provides an article of manufacture that includes an intransient signal carrier having a data structure offering a selection of soft assets responsive to reduction.

Panoplex with Gryphing Program with Reporting

In some embodiments of the article of manufacture, the storage medium further includes instructions stored thereon for causing a suitably programmed information processor to execute a method that includes obtaining selection data, modifying the storage medium based on the selection data such that, in place of non-selected assets, erased space becomes available for storage of other data, and selected assets are available as installed, and reporting a status of the modifying operation to a central facility.

Panoplex with Gryphing Program and Charging Mechanism B

In some embodiments of the article of manufacture, the storage medium further includes instructions stored thereon for causing a suitably programmed information processor to execute a method that includes obtaining selection data, modifying the storage medium based on the selection data such that, in place of non-selected assets, erased space becomes available for storage of other data, and selected assets are available as installed, and charging a specified account an amount based on the selected assets are available as installed after the modifying operation.

Panoplex with Gryphing Program Inside Disk-Drive Storage Medium

In some embodiments of the article of manufacture, the storage medium is a disk drive that includes an enclosure, a disk-drive processor mounted to the enclosure, an external-device interface operatively coupled to the processor and operable to accept data-transfer requests and to send data to and receive data from an external device, and at least one rotating disk housed in the enclosure, operatively coupled to the processor, and having stored thereon the panoplex and instructions for causing the disk-drive processor to execute a method that includes obtaining selection data, and modifying the storage medium based on the selection data such that, in place of non-selected assets, erased space becomes available for storage of other data, and selected assets are available as installed.

Panoplex with Gryphing Program Inside Disk Storage Medium Connected to, for Example, an iPod®

Some embodiments of the article of manufacture further include an external device operatively coupled to the storage medium, the external device operable to transmit data-transfer requests to the storage medium and to send data to and receive data from the storage medium, wherein the storage medium is a disk drive that includes an enclosure, a disk-drive processor mounted to the enclosure, an external-device interface operatively coupled to the processor and operable to accept data-transfer requests from the external device, and to send data to and receive data from the external device, and at least one rotating disk housed in the enclosure, operatively coupled to the processor, and having stored thereon the panoplex and instructions for causing the processor to execute a method that includes obtaining selection data, and modifying the storage medium based on the selection data such that, in place of non-selected assets, erased space becomes available for storage of other data, and selected assets are available as installed.

Panoplex with Gryphing Program Inside Flash Storage Medium

In some embodiments of the article of manufacture, the storage medium is a solid-state drive that includes an enclosure, a solid-state-drive processor mounted to the enclosure, an external-device interface operatively coupled to the processor and operable to accept data-transfer requests and to send data to and receive data from an external device, at least one solid-state memory housed in the enclosure, operatively coupled to the processor, and having stored thereon the panoplex and instructions for causing the processor to execute a method that includes obtaining selection data, and modifying the storage medium based on the selection data such that, in place of non-selected assets, erased space becomes available for storage of other data, and selected assets are available as installed.

Panoplex with Gryphing Program Inside Flash Storage Medium Connected to, for Example, an iPod Some embodiments of the article of manufacture further include an external device operatively coupled to the storage medium, the external device operable to transmit data-transfer requests to the storage medium, and to send data to and receive data from the storage medium, wherein the storage medium is a solid-state drive that includes an enclosure, a solid-state-drive processor mounted to the enclosure, an external-device interface operatively coupled to the processor and operable to accept data-transfer requests and to send data to and receive data from an external device, and at least one solid-state memory housed in the enclosure, operatively coupled to the processor, and having stored thereon the panoplex and instructions for causing the processor to execute a method that includes obtaining selection data, and modifying the storage medium based on the selection data such that, in place of non-selected assets, erased space becomes available for storage of other data, and selected assets are available as installed.

Terse Means-Plus-Function Panoplex

In some embodiments, the present invention provides an apparatus that includes an intransient signal carrier having a data structure offering a plurality of selectable soft assets and means for subtractive installation of selected unwanted assets to leave a customized set of installed assets.

Panoplex with Gryphing Program that Asks User for Selection

In some embodiments, the storage medium further includes instructions stored thereon for causing a suitably programmed information processor to execute a method that includes presenting pricing information relevant to the plurality of selectable soft assets, eliciting and receiving from a user an indication of selection data, and modifying the storage medium based on the selection data such that, in place of non-selected assets, erased space becomes available for storage of other data, and selected assets are available as installed.

Panoplex with Gryphing Program and Charging Mechanism C

In some embodiments, the storage medium further includes instructions stored thereon for causing a suitably programmed information processor to execute a method that includes presenting pricing information relevant to the plurality of selectable soft assets, eliciting and receiving from a user an indication of selection data, modifying the storage medium based on the selection data such that, in place of non-selected assets, erased space becomes available for storage of other data, and selected assets are available as installed, and charging a specified account an amount that is based on the selection data.

Panoplex with Gryphing Program Inside Disk-Drive Storage Medium

In some embodiments, the storage medium is a disk drive that includes an enclosure, a disk-drive processor mounted to the enclosure, an external-device interface operatively coupled to the processor and operable to accept data-transfer requests and to send data to and receive data from an external device, at least one rotating disk housed in the enclosure, operatively coupled to the processor, and having stored thereon the panoplex and instructions for causing the disk-drive processor to execute a method that includes obtaining selection data, and modifying the storage medium based on the selection data such that, in place of non-selected assets, erased space becomes available for storage of other data, and selected assets are available as installed.

Panoplex with Gryphing Program Inside Disk-Drive Storage Medium Connected to, for Example, an iPod Some embodiments further include an external device operatively coupled to the storage medium, the external device operable to transmit data-transfer requests to the storage medium, and to send data to and receive data from the storage medium, wherein the storage medium is a disk drive that includes an enclosure, a disk-drive processor mounted to the enclosure, an external-device interface operatively coupled to the processor and operable to accept data-transfer requests from the external device, and to send data to and receive data from the external device, and at least one rotating disk housed in the enclosure, operatively coupled to the processor, and having stored thereon the panoplex and instructions for causing the processor to execute a method that includes presenting pricing information relevant to the plurality of selectable soft assets, eliciting and receiving from a user an indication of selection data, and modifying the storage medium based on the selection data such that, in place of non-selected assets, erased space becomes available for storage of other data, and selected assets are available as installed.

Panoplex with Gryphing Program Inside Flash Storage Medium

In some embodiments, the storage medium is a solid-state drive that includes an enclosure, a solid-state-drive processor mounted to the enclosure, an external-device interface operatively coupled to the processor and operable to accept data-transfer requests and to send data to and receive data from an external device, and at least one solid-state memory housed in the enclosure, operatively coupled to the processor, and having stored thereon the panoplex and instructions for causing the processor to execute a method that includes obtaining selection data, and modifying the storage medium based on the selection data such that, in place of non-selected assets, erased space becomes available for storage of other data, and selected assets are available as installed.

Panoplex with Gryphing Program Inside Flash Storage Medium Connected to, for Example, an iPod Some embodiments further include an external device operatively coupled to the storage medium, the external device operable to transmit data-transfer requests to the storage medium and to send data to and receive data from the storage medium, wherein the storage medium is a solid-state drive that includes an enclosure, a solid-state-drive processor mounted to the enclosure, an external-device interface operatively coupled to the processor and operable to accept data-transfer requests and to send data to and receive data from an external device, at least one solid-state memory housed in the enclosure, operatively coupled to the processor, and having stored thereon the panoplex and instructions for causing the processor to execute a method that includes presenting pricing information relevant to the plurality of selectable soft assets, eliciting and receiving from a user an indication of selection data, and modifying the storage medium based on the selection data such that, in place of non-selected assets, erased space becomes available for storage of other data, and selected assets are available as installed.

Further Ramifications

In some embodiments, the present invention provides a computer-implemented method that includes providing a storage medium having a prewritten plurality of installed soft assets, obtaining selection data indicative of a chosen set of soft assets, and automatically modifying the storage medium based on the selection data such that substantially all non-chosen assets are removed and only the chosen assets are available and installed to an appropriate hardware device, and wherein the plurality of installed soft assets are unavailable to the user before the modifying operation is performed.

In some embodiments, the present invention provides a computer-implemented method that includes providing a plurality of installed soft assets, and automatically modifying the installed soft assets based on selection data such that substantially all non-chosen assets are culled, and wherein the plurality of installed soft assets are unavailable to the user unless and until the modifying operation is performed.

In some embodiments, the present invention provides a computer-implemented method that includes instantiating a panoplex containing a plurality of soft assets within a storage device, differentiating an ipselecta of authorized soft assets from a relicta of unauthorized soft assets, and automatically removing the unauthorized soft assets from the panoplex such that the storage device contains only the authorized assets, and the authorized assets are substantially available without further network or media data loading and installation, and wherein the plurality of installed soft assets are unavailable to the user before the modifying operation is performed.

In some embodiments, the present invention provides a computer-implemented method that includes cloning a panoplex containing a plurality of soft assets onto a storage device, obtaining customer-specific selection data differentiating an ipselecta of authorized soft assets from a relicta having a plurality of unauthorized soft assets, and automatically culling the plurality of unauthorized soft assets from the panoplex such that the storage device contains only the plurality of authorized assets, plus storage space is available in place of the unauthorized assets, and wherein the plurality of soft assets is unavailable to the user before the culling operation is performed.

In some embodiments, the modifying/removing/culling is performed using a delivered device that will finally utilize the storage medium. In some embodiments, the modifying/removing/culling is performed using a program executed by a delivered device via a remote-activation process conducted across a network. In some embodiments, the modifying/removing/culling is performed when the storage medium is not connected to a delivered device that will finally utilize the storage medium. Some embodiments further include transferring the gryphed data to a final storage medium that will be utilized by a delivered device. In some embodiments, at least a portion of the panoplex is initially in a concealed storage region.

Some embodiments further include transferring insignating user-specific data onto the storage medium. Some embodiments further include transferring cleaning a registry of data relating to the unauthorized soft assets. Some embodiments further include transferring defragmenting the storage medium. Some embodiments further include transferring creating a removal log. Some embodiments further include transferring processing the storage medium such that all authorized assets are immediately usable without further user interaction. Some embodiments further include transferring installing additional soft assets after the modifying/removing/culling is performed.

In some embodiments, the present invention provides an apparatus that includes a computer-readable storage medium having instructions stored thereon for causing a suitably programmed information processor to execute a method that includes cloning a panoplex containing a plurality of soft assets onto a storage device, obtaining customer-specific selection data differentiating an ipselecta of authorized soft assets from a relicta of unauthorized soft assets, and culling the unauthorized soft assets from the panoplex such that the storage device contains only the authorized assets and storage space is available in place of the unauthorized assets, and wherein the plurality of soft assets is unavailable to the user before the culling operation is performed.

In some embodiments, the present invention provides an apparatus that includes an interface configured to connect to a storage medium having a prewritten plurality of installed soft assets, means for cloning a panoplex containing a plurality of soft assets onto a storage device, obtaining customer-specific selection data differentiating an ipselecta of authorized soft assets from a relicta of unauthorized soft assets, and means for culling the unauthorized soft assets from the panoplex such that the storage device contains only the authorized assets and storage space is available in place of the unauthorized assets, and wherein the plurality of soft assets is unavailable to the user before the culling operation is performed.

In some embodiments, the present invention provides an apparatus that includes an interface configured to connect to a storage medium having a prewritten plurality of installed soft assets, an input device configured to receive selection data, and an information processor coupled to the interface and the input device, wherein the information processor is configured to cull the unauthorized soft assets from the panoplex such that the storage device contains only the authorized assets and storage space is available in place of the unauthorized assets, and wherein the plurality of soft assets is unavailable to the user before the culling operation is performed.

In some embodiments, the present invention provides an apparatus that includes a computer-readable storage medium having a data structure stored thereon configured to require removal of unauthorized assets from the storage medium before other use of a plurality of authorized assets from the storage medium. Some embodiments further include a self-describing manifest stored on the storage medium. Some embodiments further include instructions stored on the storage medium for causing a suitably programmed information processor to execute a method that includes: obtaining selection data, and modifying the storage medium based on the selection data such that, in place of non-selected assets, erased space becomes available for storage of other data, and selected assets are available as authorized and installed. Some embodiments further include information useful for creating a directory of soft assets stored on the storage medium. Some embodiments further include information useful for creating a registry of installed programs stored on the storage medium. Some embodiments further include data specifying an order for uninstalling programs stored on the storage medium.

In some embodiments, the present invention provides an apparatus that includes a computer-readable storage medium having a data structure stored thereon containing an assemblage of operational soft assets individually chosen from a superset of such assets, wherein the assets were replicated from a superset of such assets and assets not chosen were erased from the storage medium. Some embodiments further include a log of assets that were erased. In some embodiments, the storage medium was defragmented after the assets not chosen were erased. Some embodiments further include obscured taggant data that maintains a permanent record of panoplex creation and gryphing removal of relicta.

In some embodiments, the present invention provides an apparatus that includes apparatus (e.g., a software sales establishment) that includes a managed set of one or more digital master panoplex images, each holding a set of soft assets, a duplication facility coupled to the managed set and operable to transfer an instance of a selected master panoplex image onto a storage device, a data interface eliciting and receiving selection data for a customized subset of soft assets in the selected master panoplex image, a gryphing engine operable to selectively remove certain assets from the storage medium based on the selection data, and a charging mechanism operable to charge a selected account an amount of money based on the selection data, and to authorize delivery of a device that uses the soft assets available on the storage medium to a consumer.

In some embodiments, the present invention provides a computer-implemented method that includes obtaining selection data, and modifying a storage medium having a prewritten plurality of installed soft assets based on the selection data such that substantially all non-selected assets are erased.

In some embodiments, the modifying of the storage medium includes erasing a plurality of data positions without supplying write data for any of the plurality of data positions. In some embodiments, the modifying of the storage medium includes erasing a plurality of data positions without supplying write data for all of the plurality of data positions. In some embodiments, the modifying of the storage medium includes erasing a plurality of data positions by supplying write data for all of the plurality of data positions.

In some embodiments, the present invention provides an apparatus that includes a computer-readable storage medium having instructions stored thereon for causing a suitably programmed information processor to execute a method that includes: obtaining selection data, and modifying a storage medium having a prewritten plurality of installed soft assets based on the selection data such that substantially all non-selected assets are erased.

In some embodiments, the present invention provides an apparatus that includes an interface configured to connect to a storage medium having a prewritten plurality of installed soft assets, means for obtaining selection data, and means, coupled to the interface, for erasing substantially all non-selected assets from the storage medium based on the selection data. In some embodiments, the present invention provides an apparatus that includes an interface configured to connect to a storage medium having a prewritten plurality of installed soft assets, an input device configured to receive selection data, and a grypher coupled to the interface and the input device, wherein the grypher is configured to control the interface in order to erase substantially all non-selected assets from the storage medium based on the selection data.

In some embodiments, the present invention provides a computer-implemented method that includes providing a computer-readable master storage medium having a plurality of panoplexes stored thereon including a first panoplex that includes a first plurality of installed soft assets and a second panoplex that includes a different second plurality of installed soft assets, providing a first computer-readable and computer-writable end-user storage medium, obtaining data that specifies a first selected one of the plurality of panoplexes, and writing the first selected panoplex to the first end-user storage medium.

Some embodiments further include creating the first panoplex by installing the first plurality of soft assets. Some embodiments further include uninstalling a set of unselected soft assets from the first selected panoplex before writing the first selected panoplex to the first end-user storage medium. Some embodiments further include uninstalling a set of unselected soft assets from the first selected panoplex after writing the first selected panoplex to the first end-user storage medium.

In some embodiments, the present invention provides a computer-implemented method that includes generating a panoplex that includes a universe of separately selectable installed soft assets, copying the panoplex to each one of a plurality of computer-readable and computer-writable end-user storage media, obtaining selection data that distinguishes ipselecta (a first subset of the plurality of installed soft assets that are to be retained) from relicta (a second subset of the plurality of installed soft assets that are not to be retained), gryphing a selected first end-user storage medium (erasing and/or uninstalling the relicta from the end-user storage medium as specified on the selection data), and delivering the gryphed end-user storage medium.

In some embodiments, the present invention provides a computer-implemented method for producing a computer-readable and computer-writable storage medium having a selected plurality of installed soft assets, wherein the method includes providing a computer-readable and computer-writable end-user storage medium having a prewritten panoplex that includes a plurality of installed soft assets, obtaining data that distinguishes a first subset of the plurality of installed soft assets that are to be retained from a second subset of the plurality of installed soft assets that are not to be retained, and erasing the second subset from the end-user storage medium such that the second subset are erased and the first subset are available as installed on the end-user storage medium.

In some embodiments, the present invention provides a computer-implemented method that includes providing a computer-readable and computer-writable end-user storage medium having a prewritten first panoplex that includes a first plurality of installed soft assets, obtaining data that distinguishes an ipselecta of the first panoplex from a relicta, and writing data to the end-user storage medium such that the relicta are erased and the ipselecta are available as installed.

In some embodiments, the present invention provides a computer-implemented method that includes providing an intransient signal carrier having a prewritten plurality of installed soft assets, obtaining selection data, and modifying the intransient signal carrier based on the selection data such that erased space is available in place of non-selected assets and selected assets are available as installed.

In some embodiments, the intransient signal carrier includes a rotating storage medium. In some embodiments, the intransient signal carrier includes a magnetic disk storage system. In some embodiments, the intransient signal carrier includes an electrically erasable solid-state memory. In some embodiments, the modifying of the intransient signal carrier includes erasing one or more blocks of data containing at least some of the non-selected assets.

In some embodiments, the present invention provides a computer-implemented method that includes providing a storage medium having a prewritten plurality of installed soft assets, obtaining selection data, and modifying the storage medium based on the selection data such that erased space becomes available for storage of other data in place of non-selected assets and selected assets are available as installed. In some embodiments, the modifying of the storage medium includes erasing one or more blocks of data containing at least some of the non-selected assets.

In some embodiments, storage space of the erased second subset becomes/is available for storage of other data. In some embodiments, the panoplex further includes a first data structure having digital-asset-identification information and location information configured to facilitate erasure of the relicta. In some embodiments, the panoplex further includes a directory data structure. In some embodiments, the first data structure is a directory. In some embodiments, the first data structure is a registry. In some embodiments, the first data structure includes data indicating an order in which the soft assets were installed. In some embodiments, the first data structure includes data indicating an order in which relicta of the soft assets are to be removed, erased and/or uninstalled.

In some embodiments, the providing of the medium further includes connecting a first installation storage medium to a computer, installing the first plurality of installed soft assets onto the first installation storage medium to create the first panoplex, copying the first panoplex to the first end-user storage medium.

In some embodiments, the copying of the first panoplex to the first end-user storage medium further includes copying the first panoplex from the first installation storage medium to a master storage medium having at least one other panoplex stored thereon, and copying the first panoplex from the master storage medium to the first end-user storage medium.

In some embodiments, the first panoplex further includes a directory data structure having identification information and location information of the plurality of installed soft assets, a registry data structure having operational information necessary to run a plurality of computer programs contained within the plurality of installed soft assets, and a gryphing-order data structure having information concerning an order for removing relicta information from the directory data structure and the registry data structure.

In some embodiments, the gryphing-order data structure is formed using an order of installation of the plurality of installed soft assets. Some embodiments further include reading directory information from the end-user storage medium, modifying the directory information to erase relicta, and writing the modified directory information to a directory area on the end-user storage medium. Some embodiments further include reading registry information from the end-user storage medium, modifying the registry information to uninstall relicta, writing the modified registry information to a registry area on the end-user storage medium.

Some embodiments further include reading directory information from a storage medium other than the end-user storage medium, modifying the directory information to erase relicta, writing the modified directory information to a directory area on the end-user storage medium. Some embodiments further include reading registry information from a storage medium other than the end-user storage medium, modifying the registry information to uninstall relicta, writing the modified registry information to a registry area on the end-user storage medium.

Some embodiments further include defragmenting at least a portion of the ipselecta. In some embodiments, the writing of data to the end-user storage medium includes writing identification information and location information of the ipselecta assets to a directory data structure on the end-user storage medium. In some embodiments, the writing of data to the end-user storage medium includes writing data that replaces at least a portion of each of a plurality of the relicta assets (in order to further disable usability of those assets/to provide evidence that those assets were relicta). In some embodiments, the writing of data to the end-user storage medium includes writing data that replaces at least a portion of each of a plurality of the ipselecta assets (in order to enable those assets).

In some embodiments, the writing of data to the end-user storage medium includes writing data to a directory data structure having identification information and location information of the ipselecta assets, and writing data to a registry data structure having operational information necessary to run a plurality of computer programs contained within the ipselecta assets. In some embodiments, the writing of data to the end-user storage medium includes writing identification information and location information of the ipselecta assets to a directory data structure, and writing operational information necessary to run a plurality of computer programs contained within the ipselecta assets to a registry data structure.

In some embodiments, the writing of data to the end-user storage medium includes writing data to a directory data structure to remove identification information and location information of the relicta assets, and writing data to a registry data structure to remove operational information useful to run a plurality of computer programs contained within the relicta assets.

In some embodiments, the writing of data to the end-user storage medium includes writing data to a directory data structure to remove identification information and location information of the relicta assets, and writing data to a registry data structure to remove operational information useful to run a plurality of computer programs contained within the relicta assets. In some embodiments, the ipselecta includes a plurality of available installed computer programs. In some embodiments, the ipselecta includes a plurality of available audio assets. In some embodiments, the ipselecta includes a plurality of available video programs. In some embodiments, the ipselecta includes a plurality of available installed computer games. In some embodiments, the ipselecta includes a plurality of available multimedia assets. In some embodiments, the ipselecta includes a plurality of available database assets.

In some embodiments, the present invention provides a computer-readable and computer-writable end-user storage medium having a prewritten panoplex that includes a plurality of installed soft assets and that is configured to be gryphed in order to retain an ipselecta that includes a first subset of the plurality of installed soft assets and to erase a relicta that includes a second subset of the plurality of installed soft assets such that only the first subset are available as installed on the end-user storage medium, and storage space from the second subset is available as blank/erased/available for storage and/or not used for storage.

In some embodiments, the panoplex further includes a directory data structure having location information of the plurality of installed soft assets. In some embodiments, the panoplex further includes a registry data structure having operational information necessary to run a plurality of computer programs contained within the plurality of installed soft assets. In some embodiments, the panoplex further includes a gryphing-order data structure having information concerning an order for removing relicta information from the directory data structure and the registry data structure.

In some embodiments, the panoplex further includes a directory data structure having identification information and location information of the plurality of installed soft assets, a registry data structure having operational information necessary to run a plurality of computer programs contained within the plurality of installed soft assets, and a gryphing-order data structure having information concerning an order for removing relicta information from the directory data structure and the registry data structure. Some embodiments further include a substantially blank directory that does not provide data for identifying or locating the plurality of installed soft assets, such that the end-user medium is usable as a substantially blank storage medium.

Some embodiments further include a substantially blank directory that does not provide data for identifying or locating the plurality of installed soft assets, such that the end-user medium is usable as a substantially blank storage medium, and a data structure having data therein for creating a directory of ipselecta assets. In some embodiments, the panoplex includes a plurality of installed computer programs. In some embodiments, the panoplex includes a plurality of audio assets. In some embodiments, the panoplex includes a plurality of video programs. In some embodiments, the panoplex includes a plurality of installed computer games. In some embodiments, the panoplex includes a plurality of multimedia assets. In some embodiments, the panoplex includes a plurality of database assets.

In some embodiments, the present invention provides a method that includes providing a computer-readable master storage medium having a plurality of panoplexes stored thereon including a first panoplex that includes a first plurality of installed soft assets and a second panoplex that includes a different second plurality of installed soft assets, providing a first computer-readable and computer-writable end-user storage medium, obtaining data that specifies a first selected one of the plurality of panoplexes, and writing the first selected panoplex to the first end-user storage medium.

Some embodiments further include providing a second computer-readable and computer-writable end-user storage medium, obtaining data that specifies a second selected one of the plurality of panoplexes, and writing the second selected panoplex to the second end-user storage medium.

In some embodiments, the providing of the master storage medium further includes connecting a first installation storage medium to a computer, installing the plurality of installed soft assets onto the first installation storage medium to create the first panoplex, copying the first panoplex to the first master storage medium.

In some embodiments, the present invention provides a computer-readable and computer-writable master storage medium having a plurality of prewritten panoplexes that each includes a plurality of installed soft assets, wherein each panoplex is configured to be gryphed in order to retain a first subset of the plurality of installed soft assets and to erase a second subset of the plurality of installed soft assets such that only the first subset are available as installed on the end-user storage medium, and storage space from the second subset is available as blank.

In some embodiments, the present invention provides a method for distributing customized content, the method including providing a storage medium having a collection of selectively available content installed therein, receiving selection data that distinguishes a first portion of the available content that is to be retained from a second portion of the available content that is to be removed, and automatically selectively culling the second portion of the selectively available content from the storage medium based on the selection data.

Some embodiments further include charging a monetary amount for the retained content. Some embodiments further include after culling the extraneous content, coupling the storage medium to a device so as to enable interaction of the device with the retained content.

Some embodiments further include coupling the storage medium to a device for subsequent utilization of the storage medium by the device, wherein the removing availability of the extraneous content is performed subsequent to the coupling of the storage medium to the device. Some embodiments further include after culling the extraneous content, distributing a device with the storage medium and selected content portion operative with the device to a user. Some embodiments further include coupling the storage medium to a device, eliciting and receiving the selection data by the device with the coupled storage medium, and preventing use of the collection of available content by a user pending the receipt of the selection data.

In some embodiments, control of culling the extraneous content is exercised across a network. In some embodiments, at least a portion of the network is wireless. Some embodiments further include incorporating data specific to the user into the selected portion of the available content. Some embodiments further include installing additional content that was not in the collection of available content previously installed on the storage medium.

In some embodiments, the collection of available content includes data in a registry stored on the storage medium, the removing availability further includes modifying the registry, and in some embodiments, the method further includes removal of extraneous data from the registry after the removing availability and the modifying of the registry.

In some embodiments, the culling of content includes modification of information stored in a registry. In some embodiments, culling includes erasing the extraneous portion of the available content and defragmenting the storage medium. In some embodiments, culling the extraneous content includes performing a fast secure erasure wherein substantially all relevant linkages between the logical content and the physical content are broken.

In some embodiments, the providing of the storage medium having a collection of available content installed therein further includes creating a master set of installed content, and replicating the master to the provided storage medium. In some embodiments, the providing of the storage medium having a collection of available content installed therein further includes executing at least one installation script associated with a respective portion of the available content.

In some embodiments, culling further includes executing at least one removal script associated with the extraneous portion of the available content. Some embodiments further include, after culling the extraneous portion of the available content, copying the desired portion from the storage medium to a storage medium coupled to a device. In some embodiments, the device storage medium has insufficient capacity to store the collection of available content entirely.

In some embodiments, the present invention provides an apparatus that includes a digital-asset dispenser that includes a digital-processing device, and a storage medium, having stored therein a predetermined collection of soft assets and capable of being operatively coupled to the digital processing device, such that the digital-processing device can process soft assets stored on the storage medium, a collection customizer that is operatively coupled to the storage medium and that is operable to cull the extraneous portions of the soft assets from the collection such that a retained portion of the collection of soft assets that is specified by a selector is retained within the storage medium in response to specific selection by the selector, and a dispensing mechanism to distribute to an end-user the digital processing device that includes the storage medium and the specified soft assets stored therein. In some embodiments, the selector is human. In some embodiments, the selector automatically selects the specified soft assets based on one or more characteristics of the end-user. In some embodiments, the one or more characteristics include one or more characteristics selected from the group consisting of an organizational rank, function, location, and language of the end-user.

In some embodiments, the present invention provides an apparatus that includes a functional container that includes a storage medium to which data can be written and from which data can be read, and configured to retain the data, and further having an interface operable to couple the storage medium to a functional device, a file structure mediating logical information to and from physical locations within the storage medium, a collection of individually accessible soft assets stored on the storage medium, and a manifest describing the soft assets, wherein the storage medium serves as both an inventory of selectable soft assets and a vehicle to deliver the selected soft assets. In some embodiments, the storage medium has been culled such that the selected soft assets are available and the non-selected soft assets are removed. Some embodiments further include a functional electronic device operatively coupled to the functional container, such that the device is customized and ready-to-use.

In some embodiments, the present invention provides a method that includes providing a data storage medium having a set of pre-installed assets, and subtracting a plurality of assets in a subset of the pre-installed assets from the storage medium before an initial delivery to an end user. Some embodiments further include presenting to a user a selection of the pre-installed assets and related pricing information, and eliciting selection indications from the user, wherein the subtracting of the plurality of assets in the subset is based at least in part on the selection indications. Some embodiments further include reporting, to a central facility, data that indicate a status of the subtracting operation. Some embodiments further include charging an account based on the reported data.

In some embodiments, the present invention provides an apparatus that includes a new (which is defined as having not been used by an end user) readable and writable digital storage medium device containing a plurality of installed soft assets selected from a set of soft assets, and residual indicia of other soft assets that are in an erased state, wherein the other soft assets are also selected from the set of soft assets. In some embodiments, the present invention provides an apparatus that includes a dispensing unit having a pre-installed plurality of soft assets and including a computer program to transform the assets into a first subset that is dispensed and a second subset that is not dispensed.

In some embodiments, the present invention provides a computer-readable medium having a computer program stored thereon for execution on a computer to cause the computer to perform subtractive installation by transforming a plurality of soft assets from their installed state into an erased state.

In some embodiments, the present invention provides a method that includes based on a user-selection indication, processing a digital data storage medium to leave on the storage medium a plurality of substantially installed soft assets and an erased space corresponding to a plurality of erased soft assets.

In some embodiments, the present invention provides a method that includes providing a plurality of digital data storage devices, and mass-customizing the devices by transforming a different selection of soft assets on each one of the plurality of digital data storage devices from an installed state into an erased state. In some embodiments, the mass-customization is performed in one or more manufacturing facilities and the devices are shipped to a purchaser of the devices.

In some embodiments, the present invention provides a computer-readable medium having a plurality of soft assets in an installed state and a computer program stored thereon for execution on a computer, to cause the computer to execute a method that includes collectively transforming the state of a subset of the soft assets to an uninstalled state. In some embodiments, a plurality of soft assets is selected at one time to be uninstalled by manufacturing personnel based on a selection designated by a purchase order.

In some embodiments, the present invention provides a computer instruction and architecture for a "KEEP" instruction or operation, where a plurality of items is specified, and all other items are erased upon execution of the KEEP command. In some embodiments, the present invention provides an article of manufacture that includes an information-processing appliance having a selected set of installed assets available in a substantially ready-to-use state and a residue of non-selected assets in an erased state.

In some embodiments, the present invention provides a method for modifying a storage medium that includes issuing a keep request including a specification of a plurality of soft assets that are to be kept, and erasing from the storage medium a plurality of soft assets not specified in the keep request, in response to the issuing of the keep request in order to leave as available and installed those soft assets that were specified to be kept. In some embodiments of this method, the issuing of the keep request is done using a single call.

In some embodiments, the present invention provides a computer architecture that includes a keep operation that includes a specification of a plurality of soft assets that are to be kept, wherein execution of the keep operation causes a plurality of soft assets not specified in the keep request to be erased from the storage medium such that space corresponding to the erased assets becomes available for storage of other data, and in order to leave as available and installed those soft assets that were specified to be kept. In some embodiments of this computer architecture, the keep operation is a single call.

In some embodiments, this invention provides methods and facilities: to safely and/or securely dispense and sell a broad range of soft assets; to erase to install soft assets; to arbitrarily install and remove software without engendering system instability; to manufacture the selected software prior to and out of sequence with building the device in which will operate it; to integrate software installation within normal manufacturing cycle times; to unify, what would be otherwise commodity hardware and software as an immediately functional device; to provide a new distribution channel economically offering a plethora of soft assets without uploading or downloading; to provide dynamically priced soft assets; to provide soft assets without taking up space for unused assets; to provide devices that are customized to the needs of specific individuals; and the like.

In some embodiments, the present invention provides a programmed method for erasing selected content, the method including providing a storage medium, and performing a fast secure erasure of the selected content. In some embodiments, substantially all relevant linkages between the logical content and the physical content are broken. In some embodiments, the fast secure erase includes obliterating directory metadata. In some embodiments, the fast secure erase includes obliterating registry metadata. In some embodiments, the fast secure erase includes both obliterating directory metadata as well as obliterating, through a background-erase, the relicta file-data areas.

In some embodiments, the present invention provides a programmed method that includes providing a device having an information processor, and sideloading selected content onto the device.

Some embodiments, in accordance with the present invention, are directed to a programmed method for distributing soft assets integrated within an appropriate device for processing such assets, while providing improved user convenience. The term "programmed method," as used herein, is defined to mean one or more process steps that are presently performed; or, alternatively, one or more process steps that are enabled to be performed at a future point in time. The term "programmed method" as used herein thus anticipates three alternative forms. First, a programmed method includes presently performed process steps. Second, a programmed method includes a computer-readable medium embodying computer instructions, which when executed by a computer performs one or more process steps. Finally, a programmed method includes a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

It will be understood that the above description of a method and apparatus for selectively dispensing digital content has been with respect to particular embodiments of the invention. While this description is fully capable of attaining the objects of the invention, it is understood that the same is merely representative of the broad scope of the invention envisioned, and that numerous variations of the above embodiments may be known or may become known or are obvious or may become obvious to one of ordinary skill in the art, and these variations are fully within the broad scope of the invention. For example, while certain storage technologies have been described herein, other such storage technologies with appropriate file systems may also be employed. Furthermore, while various types of digital devices have been mentioned, numerous other types may also be used in the embodiments of the invention, including general-purpose computers, special-purpose computers, embedded computers, enterprise computers, servers, percepters, appliances, machinery, vehicles, weapons, and so on.

It is to be understood that the above description is intended to be illustrative, and not restrictive. Moreover, it is not necessary for a device or method to address each and every problem sought to be solved by the present invention, for it to be encompassed by the present claims. Furthermore, no element, component, or method step in the present invention is intended to be dedicated to the public regardless of whether the element, component, or method step is explicitly recited in the claims. No claim element herein is to be construed under the provisions of 35 U.S.C. §112 paragraph 6 unless the element is expressly recited using the phrase "means for" or, in the case of a method claim, the element is expressly recited as a "step" instead of an "act."

Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A method comprising:
   providing a storage medium having a pre-written plurality of installed soft assets that include a plurality of installed programs and an operating system, the storage medium also having directory data having entries indicative of locations of the soft assets and registry data having entries used by the operating system to properly execute each of the plurality of installed programs;
   connecting the storage medium having the pre-written plurality of installed soft assets to an end-user information-processing device, wherein the end-user information-processing device is for use by an end user;
   receiving selection indications specific to the end user that distinguish a customized first subset of the installed soft assets to be kept from a second subset of the installed soft assets not to be kept; and
   automatically subtracting the second subset of the installed soft assets from the storage medium before an initial availability of the device to the end user such that after the second subset is subtracted and after the storage medium is connected to the device, the device includes the first subset of installed soft assets substantially ready to use.

2. The method of claim 1, wherein the receiving of selection indications includes eliciting and receiving the selection indications from the end user, and the subtracting of the second subset is guided by the selection indications from the end user.

3. The method of claim 1, further comprising reporting, to a central facility, data that indicate a status of the subtracting operation.

4. The method of claim 2, wherein the soft assets are digital assets and the subtracting includes erasing installed digital assets of the second subset and leaving the user-selected plurality of installed digital assets of the first subset.

5. The method of claim 3, further comprising charging an account based on the reported data.

6. The method of claim 1, wherein the providing of the storage medium includes forming a panoplex, wherein the forming of the panoplex includes installing the plurality of soft assets and validating that each of the plurality of soft assets do not conflict with others of the plurality of soft assets, and writing the panoplex onto the storage medium.

7. The method of claim 1, wherein the connecting of the storage medium to the end-user information-processing device is performed after the automatically subtracting of the second subset such that the connecting of the storage medium is performed when only the first subset of the pre-written plurality of installed soft assets remains on the storage medium.

8. The method of claim 1, wherein the connecting of the storage medium to the end-user information-processing device is performed before the automatically subtracting of the second subset such that the connecting of the storage medium is performed when both the first subset and the second subset of the pre-written plurality of installed soft assets are on the storage medium.

9. The method of claim 1, wherein the subtracting includes:
automatically obtaining the directory data and the registry data;
automatically removing the directory entries of the second set of soft assets from the directory data to form modified directory data;
automatically removing the registry entries of installed programs in the second set of soft assets from the registry data to form modified registry data; and
storing the modified directory data and the modified registry data to the storage medium.

10. The method of claim 1, wherein the providing of the storage medium having the pre-written plurality of installed soft assets further comprises:
a) collecting a plurality of supplied soft assets,
b) installing the collected plurality of soft assets and creating a data structure on a master storage medium such that the data structure contains the installed soft assets engaged and intertwined with an operating system such that the soft assets are functional with the operating system, and
c) storing a copy of the data structure onto the storage medium; and
wherein the method further comprises:
d) delivering the device to the specific end user.

11. A method comprising:
mass-customizing a plurality of individual devices by:
loading all of the plurality of individual devices with a common set of installed soft assets that include a plurality of installed programs and an operating system, each one of the plurality of individual devices also having directory data having entries indicative of locations of the soft assets and registry data having entries used by the operating system to properly execute each of the plurality of installed programs, and
after loading all of the plurality of devices with the common set of soft assets, then transforming differing subsets of the installed soft assets from an installed state into an erased state on each one of the plurality of individual devices.

12. The method of claim 11, wherein the mass-customization is performed in each of a plurality of manufacturing facilities to customize to a user's unique preference for each of a plurality of users, and performing the transformations of differing subsets based on user-specific selections.

13. The method of claim 11, wherein the mass-customization is performed before the devices are shipped to a purchaser of the devices.

14. The method of claim 11, wherein the mass-customization is performed in a plurality of manufacturing facilities and the devices are shipped to a purchaser of the devices.

15. The method of claim 11, wherein the devices are storage media that are each later attached to electronics of a personal computer configured to in order to provide the personal computer its intended function.

16. The method of claim 11, wherein the devices are storage media that are each later attached to electronics of a respective percepter in order to provide the respective percepter its intended function.

17. The method of claim 11, further comprising installing a plurality of soft assets and validating that each of the plurality of soft assets do not conflict with others of the plurality of soft assets in order to form a panoplex, and writing the panoplex onto the devices, wherein the common set of soft assets form the panoplex.

18. The method of claim 11,
wherein the loading of all of the plurality of devices with the common set of soft assets further comprises:
a) collecting a plurality of supplied digital assets;
b) installing the collected plurality of digital assets and creating a data structure on a master storage medium such that the data structure contains the installed digital assets;
c) intertwining the installed digital assets with an operating system such that the installed digital assets are functional with the operating system;
d) storing a copy of the data structure onto each one of the plurality of individual storage devices; and
wherein the transforming differing subsets of the installed soft assets further comprises:
e) selecting one of the individual storage devices that contain the data structure;
f) subsequent to the storing of the copy of the data structure onto each one of a plurality of individual storage devices, obtaining selection data that distinguish the selected set of the installed digital assets, which are to be retained, from others of the installed digital assets, which are not to be retained;
g) removing from the selected individual storage device the others of the installed digital assets that are not to be retained based on the selection data such that the selected set of the installed digital assets that are to be retained are in the device substantially ready-to-use and functional; and
wherein the method further comprises:
h) delivering the selected storage device to the specific end-user.

19. A computer-readable medium having a plurality of soft assets in an installed state, wherein the soft assets include a plurality of installed programs and an operating system, the computer-readable medium also having directory data having entries indicative of locations of the assets and registry data having entries used by the operating system to properly execute each of the plurality of installed programs and a computer program stored thereon for execution on a computer, to cause the computer to execute a method comprising transforming the state of a subset of the soft assets to an uninstalled state including removing entries from the registry data otherwise usable by the operating system to properly execute each of a subset of the plurality of installed programs.

20. The computer-readable medium of claim 19, wherein the method further comprises receiving selection data indicative of a plurality of soft assets that is selected at one time to be uninstalled by manufacturing personnel based on a selection designated by a purchase order.

21. The computer-readable medium of claim 19, wherein the storage medium includes the directory data in a structure stored on the storage medium, and the transforming of the state of a subset of the soft assets to the uninstalled state includes modifying the directory data.

22. The computer-readable medium of claim 19, wherein the storage medium includes the registry data in a structure stored on the storage medium, and the transforming of the state of a subset of the soft assets to the uninstalled state includes modifying the registry data.

23. The computer-readable medium of claim 19, wherein the method further comprises presenting to a user a selection of the installed assets and related pricing information; and eliciting and receiving selection indications from the user, wherein the transforming the state of the subset of the soft assets to an uninstalled state is based at least in part on the selection indications.

24. The computer-readable medium of claim 19, wherein the method further comprises reporting, to a central facility, data that indicate a status of the transforming the state of the subset of the soft assets to an uninstalled state.

25. The computer-readable medium of claim 19, wherein the collectively transforming of the state of a subset of the soft assets to an uninstalled state includes using a plurality of program threads executing substantially concurrently.

26. A new article of manufacture comprising an information-processing appliance having a selected set of installed soft assets available in a substantially ready-to-use state and residual indicia of non-selected assets in an erased state, wherein the information-processing appliance includes an operating system, and also having directory data having entries indicative of locations of the installed assets and registry data having entries that are used by the operating system to properly execute each of the plurality of installed assets and that include registry metadata that enables functionality of the selected set of the installed soft assets with the operating system;

wherein the operating software method implementing the information-processing appliance further comprises reporting, to a central facility, data that indicate a status of the transforming the state of the subset of the soft assets to an uninstalled state.

27. A method for distributing a selected set of installed digital assets to a specific end-user comprising:
  a) collecting a plurality of supplied digital assets;
  b) installing the collected plurality of digital assets and creating a data structure on a master storage medium such that the data structure contains the installed digital assets;
  c) intertwining the installed digital assets with an operating system such that the installed digital assets are functional with the operating system;
  d) storing a copy of the data structure onto each one of a plurality of individual storage devices;
  e) selecting one of the individual storage devices that contain the data structure subsequent to the storing of the copy of the data structure onto each one of a plurality of individual storage devices;
  f) obtaining selection data that distinguish the selected set of the installed digital assets, which are to be retained, from others of the installed digital assets, which are not to be retained;
  g) removing from the selected individual storage device the others of the installed digital assets that are not to be retained based on the selection data such that the selected set of the installed digital assets that are to be retained are in the device substantially ready-to-use and functional; and
  h) delivering the selected storage device to the specific end-user.

* * * * *